(12) United States Patent
Numako

(10) Patent No.: US 6,871,017 B2
(45) Date of Patent: Mar. 22, 2005

(54) LENS DRIVE CONTROL APPARATUS FOR ZOOM LENS SYSTEM HAVING A SWITCHING LENS GROUP

(75) Inventor: Norio Numako, Tochigi (JP)

(73) Assignee: PENTAX Corporation, Tokyo (JP)

( * ) Notice: Subject to any disclaimer, the term of this patent is extended or adjusted under 35 U.S.C. 154(b) by 116 days.

(21) Appl. No.: 09/961,186

(22) Filed: Sep. 24, 2001

(65) Prior Publication Data

US 2002/0037164 A1 Mar. 28, 2002

(30) Foreign Application Priority Data

Sep. 22, 2000 (JP) ........................................ 2000-289613

(51) Int. Cl.$^7$ .......................... G03B 17/00; G02B 15/14
(52) U.S. Cl. .......................... 396/72; 359/683; 359/689
(58) Field of Search .................... 396/48, 72; 359/683, 359/684, 685, 686, 689, 691

(56) References Cited

U.S. PATENT DOCUMENTS

| | | | |
|---|---|---|---|
| 4,227,792 A | 10/1980 | Rentschler | |
| 4,390,262 A | 6/1983 | Hirohata et al. | |
| 4,416,527 A | 11/1983 | Okura | |
| 4,426,145 A | 1/1984 | Hashimoto | |
| 4,484,800 A | 11/1984 | Tamura | |
| 4,576,446 A | 3/1986 | Kamata | |
| 4,595,081 A | 6/1986 | Parsons | |
| 4,662,241 A | 5/1987 | Edwards | |
| 4,834,514 A | 5/1989 | Atsuta et al. | |
| 4,839,680 A | 6/1989 | Amada et al. | |
| 4,917,482 A | 4/1990 | Ito | |
| 4,918,480 A | 4/1990 | Hori | |
| 4,922,274 A | 5/1990 | Yamamoto et al. | |
| 4,971,427 A | 11/1990 | Takamura et al. | |
| 4,975,725 A | 12/1990 | Morisawa | |
| 4,978,204 A | 12/1990 | Ito | |
| 4,984,877 A | 1/1991 | Ito | |
| 4,993,815 A | 2/1991 | Yamazaki et al. | |
| 5,037,187 A | 8/1991 | Oda et al. | |
| 5,126,883 A | * 6/1992 | Sato et al. | 359/687 |
| 5,144,352 A | 9/1992 | Shono | |
| 5,166,829 A | 11/1992 | Iizuka | |
| 5,177,638 A | 1/1993 | Emura et al. | |
| 5,196,963 A | 3/1993 | Sato et al. | |
| 5,222,407 A | 6/1993 | Sekiguchi | |
| 5,237,357 A | 8/1993 | Morisawa | |

(List continued on next page.)

FOREIGN PATENT DOCUMENTS

| | | |
|---|---|---|
| JP | 4-340907 | 11/1992 |
| JP | 8-146296 | 6/1996 |
| JP | 2000275518 | 10/2000 |

OTHER PUBLICATIONS

English Language Abstract of JP 4–340907.
English Language Abstract of JP 2000–275518.
English Language Abstract of JP 8–146296.

Primary Examiner—Rodney Fuller
Assistant Examiner—Arthur A Smith
(74) Attorney, Agent, or Firm—Greenblum & Bernstein, P.L.C.

(57) ABSTRACT

A lens drive control apparatus for a camera having a zoom lens provided with variable lens groups, at least one of the variable lens groups including a switching lens group having two sub lens groups, wherein one of the two sub lens groups serves as a movable sub lens group. The lens drive control apparatus includes a main drive device for moving the plurality of variable lens groups; and a sub lens group drive device for moving the movable sub lens group within the switching lens group to be positioned at a movement extremity on the object side or the image side, with respect to the other sub lens group, in accordance with a zooming zone from the short focal length extremity to an intermediate focal length position, or a zooming zone from the intermediate focal length to the long focal length extremity.

13 Claims, 38 Drawing Sheets

U.S. PATENT DOCUMENTS

| | | |
|---|---|---|
| 5,241,422 A | 8/1993 | Shimada et al. |
| 5,268,794 A | 12/1993 | Chan |
| 5,301,066 A | 4/1994 | Higuchi et al. |
| 5,313,244 A | 5/1994 | Arai |
| 5,461,443 A | 10/1995 | Nakayama et al. |
| 5,559,571 A | 9/1996 | Miyamoto et al. |
| 5,572,276 A | 11/1996 | Hirakawa |
| 5,589,987 A | 12/1996 | Tanaka |
| 5,646,790 A | 7/1997 | Kohmoto et al. |
| 5,671,449 A | 9/1997 | Shimizu |
| 5,701,208 A | 12/1997 | Sato et al. |
| 5,708,533 A | 1/1998 | Hamasaki |
| 5,739,962 A | 4/1998 | Asakura et al. |
| 5,774,266 A | 6/1998 | Otani et al. |
| 5,774,748 A | 6/1998 | Ito et al. |
| 5,812,889 A | 9/1998 | Nomura et al. |
| 5,842,057 A | 11/1998 | Nomura et al. |
| 5,870,232 A | 2/1999 | Tsuji et al. |
| 5,892,998 A | 4/1999 | Kodaira et al. |
| 5,933,285 A | 8/1999 | Sato et al. |
| 6,028,714 A | 2/2000 | Koyama |
| 6,069,745 A | 5/2000 | Fujii et al. |
| 6,089,760 A | 7/2000 | Terada |
| 6,118,666 A | 9/2000 | Aoki et al. |
| 6,125,237 A | 9/2000 | Park |
| 6,160,670 A | 12/2000 | Nakayama et al. |
| 6,176,627 B1 | 1/2001 | Suh |
| 6,195,211 B1 | 2/2001 | Iwasaki |
| 6,369,955 B1 | 4/2002 | Enomoto et al. |
| 6,424,469 B2 | 7/2002 | Hirai |
| 6,429,979 B2 | 8/2002 | Enomoto |
| 6,437,922 B2 | 8/2002 | Enomoto et al. |
| 6,437,924 B1 | 8/2002 | Azegami |
| 6,456,442 B1 | 9/2002 | Enomoto |
| 6,456,445 B2 | 9/2002 | Nomura et al. |
| 6,469,840 B2 | 10/2002 | Nomura et al. |
| 6,469,841 B2 | 10/2002 | Nomura et al. |
| 6,493,511 B2 | 12/2002 | Sato |
| 6,512,638 B2 | 1/2003 | Sato et al. |
| 6,522,478 B2 | 2/2003 | Nomura et al. |
| 6,522,481 B2 | 2/2003 | Nomura et al. |
| 6,522,482 B2 | 2/2003 | Nomura et al. |
| 2002/0012178 A1 | 1/2002 | Noguchi |
| 2002/0036836 A1 | 3/2002 | Hagimori |

\* cited by examiner

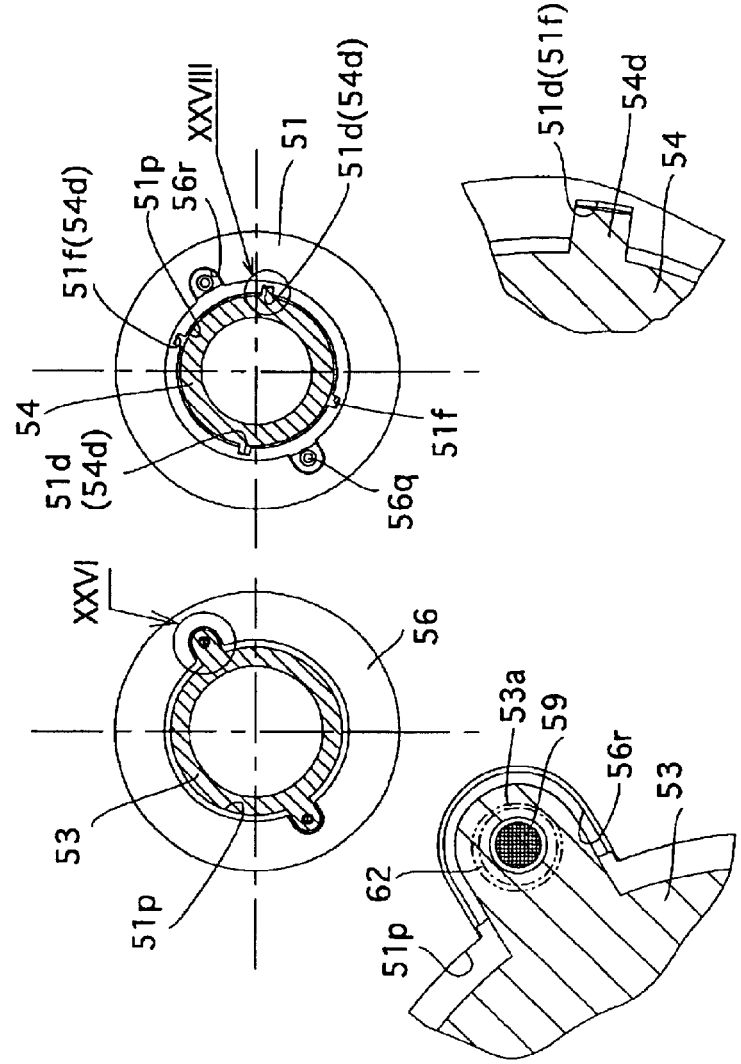

Focus Lens Initialization

LENS DRIVE CONTROL APPARATUS FOR ZOOM LENS SYSTEM HAVING A SWITCHING LENS GROUP

CROSS-REFERENCE TO RELATED APPLICATIONS

The present application relates to the following U.S. Patent Applications, all filed concurrently herewith on Sep. 24, 2001, and all of which are expressly incorporated herein by reference in their entireties: "ZOOM LENS MECHANISM" having application Ser. No. 09/960,309, "ZOOM LENS MECHANISM" having application Ser. No. 09/961,231, "ECCENTRICITY-PREVENTION MECHANISM FOR A PAIR OF LENS-SUPPORTING RINGS" having application Ser. No. 09/960,515, "REDUCTION GEAR MECHANISM" having application Ser. No. 09/960,521, "RING MEMBER SHIFT MECHANISM AND LENS GROUP SHIFT MECHANISM" having application Ser. No. 09/960,518, "LENS BARREL" having application Ser. No. 09/960,520, "LENS BARREL" having application Ser. No. 09/960,382, "LENS BARREL" having application Ser. No. 09/960,516, "LENS BARREL" having application Ser. No. 09/961,233, "ZOOM LENS BARREL" having application Ser. No. 09/961,185, and "LENS BARREL" having application Ser. No. 09/961,232, each naming as inventors Hiroshi NOMURA et al.

BACKGROUND OF THE INVENTION

1. Field of the Invention

The present invention relates to a lens drive control apparatus for a zoom lens system incorporating a switching lens group as disclosed in U.S. patent application Ser. No. 09/534,307 (Japanese Patent Application No. Hei 11-79572) filed by the same applicant of the present invention.

2. Description of the Related Art

To provide a zoom lens system having a high zoom ratio and at the same time to provide a miniaturized zoom lens system are contradictory demands. For example, although a small two-group zoom lens system can be relatively easily provided, when the zoom path (solution of loci) of lens group elements are obtained so that the zoom ratio can at a maximum, a collision would occur of lens groups at the telephoto position, or a collision of the lens groups with the image plane. When a three-group zoom lens system is used, it is possible to obtain a larger zoom ratio than that of the two-group lens system, however, providing a small three-group zoom lens system is relatively difficult. Furthermore, when the zoom power of lens group elements is determined in order to obtain an even higher zoom ratio, the accuracy of focusing is deteriorated due to mechanical limitations.

In order to satisfy the above mentioned demands, the applicant has invented a novel miniaturized zoom lens system having a high zoom ratio (U.S. patent application Ser. No. 09/534,307; Japanese Patent Application No. Hei 11-79572).

The characteristics of this zoom lens system are as follows: the zoom lens system includes a plurality of movable variable lens groups for varying focal length, at least one of the variable lens groups having two sub lens groups; one of the sub lens groups is a switching lens group serving as a movable sub lens group selectively moving against another sub lens group to be positioned at any of moving extremities in the optical direction, wherein the movement extremities of the movable sub lens group in the switching lens group are opposite to and away from each other at which the movable sub lens group can be positioned according to the selection of zooming zones between a short focal length zooming zone from a shortest focal length position to an intermediate focal length position(s) (there can be a single intermediate focal length position, or two or more intermediate focal length positions), and the other zooming zone (a long focal length zooming zone) from the intermediate focal length position(s) to a longest focal length position; and the fundamental zoom path of the switching lens group and the other variable lens groups are discontinuously determined at the intermediate position so that the focusing on a predetermined image plane may be performed according to the position of the movable sub lens group.

SUMMARY OF THE INVENTION

It is an object of the present invention to provide a lens drive control apparatus for zooming and focusing of a camera provided with the zoom lens system having a switching lens group.

To achieve the object mentioned above, a lens drive control apparatus for a camera having a zoom lens provided with a plurality of movable variable lens groups for changing a focal length thereof, at least one of the variable lens groups including a switching lens group having two sub lens groups, wherein one of the two sub lens groups serves as a movable sub lens group selectively moving in the optical axis direction with respect to the other sub lens group. The lens drive control apparatus includes a main drive device for moving the plurality of variable lens groups along an optical axis thereof in accordance with a predetermined movement path between a short focal length extremity and a long focal length extremity; and a sub lens group drive device for moving the movable sub lens group within the switching lens group so as to be positioned at a movement extremity on the object side or a movement extremity on the image side, with respect to the other sub lens group, in accordance with a corresponding zooming zone of a short focal length zooming zone from the short focal length extremity to an intermediate focal length position, and a long focal length zooming zone from the intermediate focal length to the long focal length extremity.

In an embodiment, the sub lens group drive device moves the movable sub lens group to the movement extremity on the object side or the movement extremity on the image side in accordance with the corresponding zooming zone when the main drive device moves the variable lens groups along the optical axis.

In an embodiment, the sub lens group drive device moves the movable sub lens group to the movement extremity on the object side or the movement extremity on the image side in accordance with the corresponding zooming zone when the main drive device is stopped.

In an embodiment, the camera further includes a photometering device and a distance measurement device; and the sub lens group drive device moves the movable sub lens group to the movement extremity on the object side or the movement extremity on the image side in accordance with the corresponding zooming zone after the photometering device or the distance measurement device is performed.

In an embodiment, the camera further includes a photometering device, a distance measurement device, a shutter device, a photometering/distance measuring switch for actuating the photometering device and the distance measurement device, and a release switch for actuating the shutter device. The sub lens group drive device moves the movable sub lens group to the movement extremity on the object side or the movement extremity on the image side in accordance with the corresponding zooming zone after the photometering device or the distance measurement device is performed upon operation of the photometering/distance measuring switch regardless of whether the release switch has been operated.

In an embodiment, the camera further includes a photometering device, a distance measurement device, a shutter device, a photometering/distance measuring switch for actuating the photometering device and the distance measurement device, and a release switch for actuating the shutter device. The sub lens group drive device moves the movable sub lens group to the movement extremity on the object side or the movement extremity on the image side in accordance with the corresponding zooming zone after the photometering device or the distance measurement device is performed upon operation of the photometering/distance measuring switch, and before the shutter device is actuated upon operation of the release switch.

In an embodiment, the camera further includes a distance measurement device. The sub lens group drive device moves the movable sub lens group from the one of the movement extremity on the object side and the movement extremity on the image side, in accordance with the corresponding zooming zone, toward the other of the movement extremity on the object side and the movement extremity on the image side in order to carry out focusing based on a result of a distance measurement by the distance measurement device.

In an embodiment, after the sub lens group drive device moves the movable sub lens group to the one of the movement extremity on the object side and the movement extremity on the image side in accordance with the corresponding zooming zone, the sub lens group drive device further moves the movable sub lens group toward the other of the movement extremity on the object side and the movement extremity on the image side in order to carry out focusing based on a result of a distance measurement by the distance measurement device.

In an embodiment, the sub lens group drive device moves the movable sub lens group back to the one of the movement extremity on the object side and the movement extremity on the image side, upon an operation of the photometering/distance measuring switch being released.

In an embodiment, after the sub lens group drive device moves the movable sub lens group to the one of the movement extremity on the object side and the movement extremity on the image side in accordance with the corresponding zooming zone, the sub lens group drive device further moves the movable sub lens group toward the other of said movement extremity on the object side and said movement extremity on the image side in order to carry out focusing based on the result of a distance measurement by the distance measurement device.

In an embodiment, the sub lens group drive device moves the movable sub lens group back to the one of the movement extremity on the object side and the movement extremity on the image side, after the shutter device is actuated.

In an embodiment, the sub lens group drive device includes two sub lens barrels which support two sub lens groups of the switching lens group, and which guide the two sub lens groups so as to be relatively rotatable and to be movable between a mutually close position and a mutually distant position, with respect to the optical axis; an actuator ring, which is engageable with one of the two sub lens barrels, including two engagement portions and cam surfaces formed between the two engagement portions, wherein the actuator ring rotates the one sub lens barrel of the two sub lens barrels between two rotational extremities thereof, and moves the one sub lens barrel in the optical axis direction; a retaining ring including a guide portion which only allows linear movement in the optical axis direction of the one sub lens barrel at each the two rotational extremities, wherein the rotational movement range of the one sub lens barrel is restricted by the two rotational movement extremities; and a motor for rotating the actuator ring forwardly and reversely. After the actuator ring is rotationally driven in a first direction by the motor so that a switching operation of the one sub lens barrel from one to the other of the two rotational movement extremities is performed, the motor is driven in a second direction so that the one sub lens barrel moves in the optical axis direction via the guide portion and the cam surfaces while rotating from the other of the two rotational movement extremities toward the one of the two rotational movement extremities to perform a focusing operation.

The present disclosure relates to subject matter contained in Japanese Patent Application No. 2000-289613 (filed on Sep. 22, 2000) which is expressly incorporated herein by reference in its entirety.

BRIEF DESCRIPTION OF THE DRAWINGS

FIG. 25 is a front view showing the relationship between the first sub-lens group frame and the front shutter retaining ring when viewed in a direction of the arrows indicated by a line XXV—XXV in FIG. 14;

FIG. 26 is a partially enlarged view showing an encircled portion indicated by XXVI in FIG. 25;

FIG. 27 is a front view showing the relationship between the second sub-lens group frame and the front shutter retaining ring when viewed in a direction of the arrows indicated by the line XXVII—XXVII in FIG. 14;

FIG. 28 is a partially enlarged view showing an encircled part XXVIII in FIG. 27;

DESCRIPTION OF THE PREFERRED EMBODIMENTS

First, embodiments of a zoom lens system with a switching lens group proposed in the U.S. patent application Ser. No. 09/534,307 will be herein described. U.S. patent application Ser. No. 09/534,307 is expressly incorporated herein by reference in its entirety.

Figure 1:
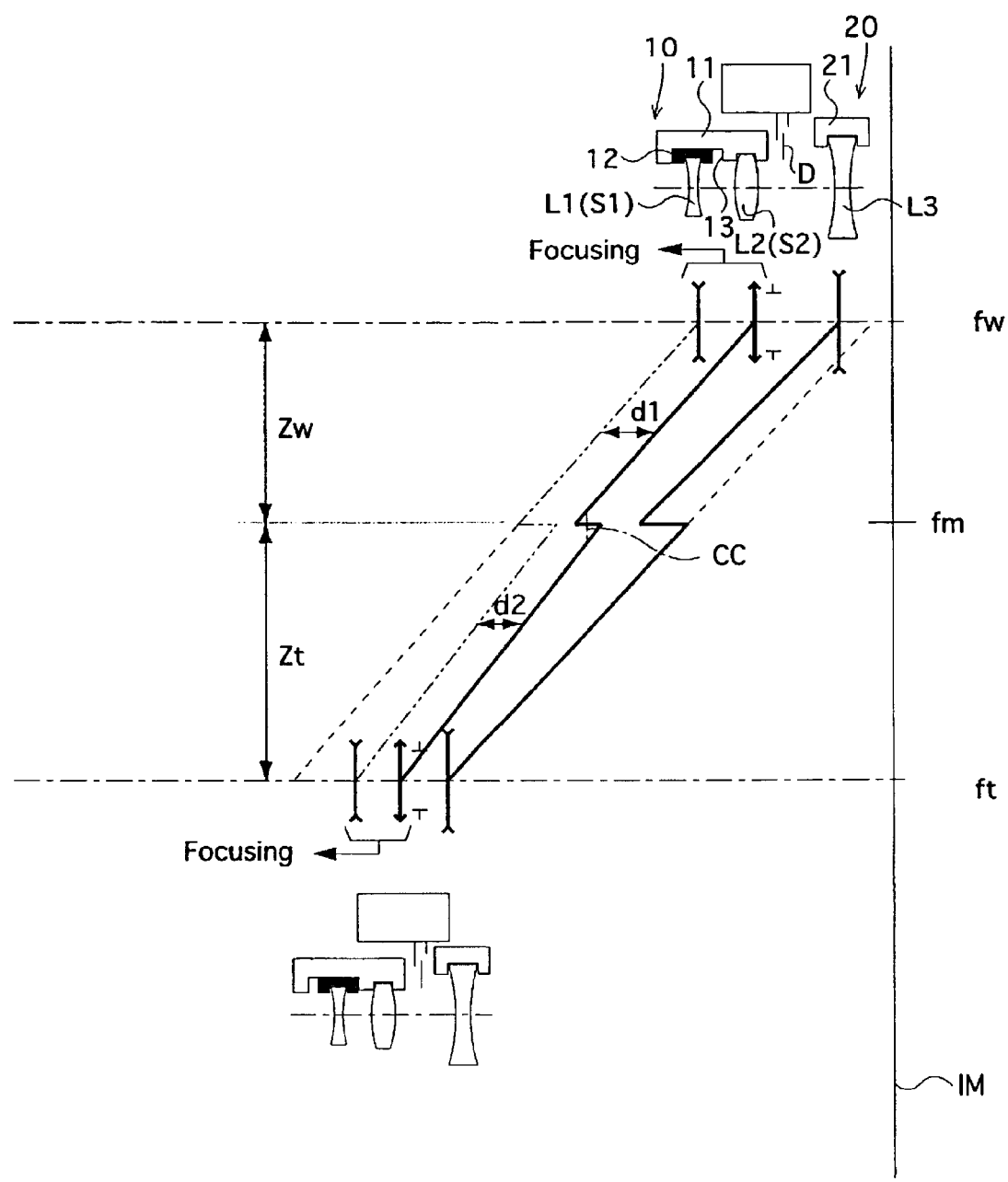
FIG. 1 is a schematic drawing of a first embodiment of a zoom lens system having switching lens groups and the fundamental zoom path thereof, to which the present invention is applied.

FIG. 1 shows the first embodiment of the zoom lens system. The zoom lens system includes a positive first variable lens group 10, and a negative second variable lens group 20, in that order from the object side. The first variable lens group 10 includes a negative first lens group L1 (first sub-lens group S1) and a positive second lens group L2 (second sub-lens group S2), in that order from the object side. The second variable lens group 20 includes a negative third lens group L3. The second sub-lens group S2 of the first variable lens group 10 is fixed to a first lens group frame 11. The first sub-lens group S1 is mounted on a movable sub-lens group frame 12. The movable sub-lens group frame 12 is arranged to move in the optical axis direction, by a predetermined distance, along a guide groove 13 which is formed on the first lens group frame 11. The first sub-lens group S1 is selectively moved to either the object-side movement extremity at which the movable sub-lens group frame 12 comes into contact with the front end of the guide groove 13, or the image-side movement extremity at which the movable sub-lens group frame 12 comes into contact with the rear end of the guide groove 13. The third lens group L3 is fixed to a second lens group frame 21. A diaphragm D is arranged to move together with the first variable lens group 10 (first lens group frame 11). Throughout FIGS. 1 through 9, IM indicates an image plane (film surface, and so forth) which is at a predetermined position.

In the zoom paths according to the first embodiment, the first variable lens group 10 (first lens group frame 11), the second variable lens group 20 (second lens group frame 21), and the first sub-lens group S1 (movable sub-lens group frame 12) move in the following manner:

[A] In a short-focal-length zooming range Zw from the short focal length extremity fw to an intermediate focal length fm, the first sub-lens group S1 and the second sub-lens group S2 maintain a distance d1 therebetween (first separation space/wide space); and the first variable lens group 10 (first lens group frame 11) and the second variable lens group 20 (second lens group frame 21) move towards the object side while mutually changing the distance therebetween.

[B] At the intermediate focal length fm, the first variable lens group 10 and the second variable lens group 20 move towards the image side at the long focal-length extremity of the short-focal-length zooming range Zw; and the first sub-lens group S1 moves to the image-side movement extremity of the guide groove 13, wherein the first sub-lens group S1 moves toward the second sub-lens group S2 so that the distance therebetween is determined by a shorter distance (second separation space/narrow space) d2.

[C] In a long-focal-length zooming range Zt from the intermediate focal length fm to the long focal length extremity ft, the first sub-lens group S1 maintains the shorter distance (second separation space/narrow space) d2 with respect to the second sub-lens group S2; and the first variable lens group 10 and the second variable lens group 20 move towards the object, based on the positions thereof which are determined at the intermediate focal length fm, after the first through third lens groups L1 through L3 have been moved towards the image side, while changing the distance therebetween.

The zoom paths for the first variable lens group 10 and the second variable lens group 20 are simply depicted as straight lines in FIG. 1. It should be noted, however, that the actual zoom paths are not necessarily straight lines.

Focusing is performed by integrally moving, in the optical axis direction, the first sub-lens group S1 and the second sub-lens group S2, i.e., the first variable lens group 10 (first lens group frame 11) regardless of the zooming range.

Figure 2:
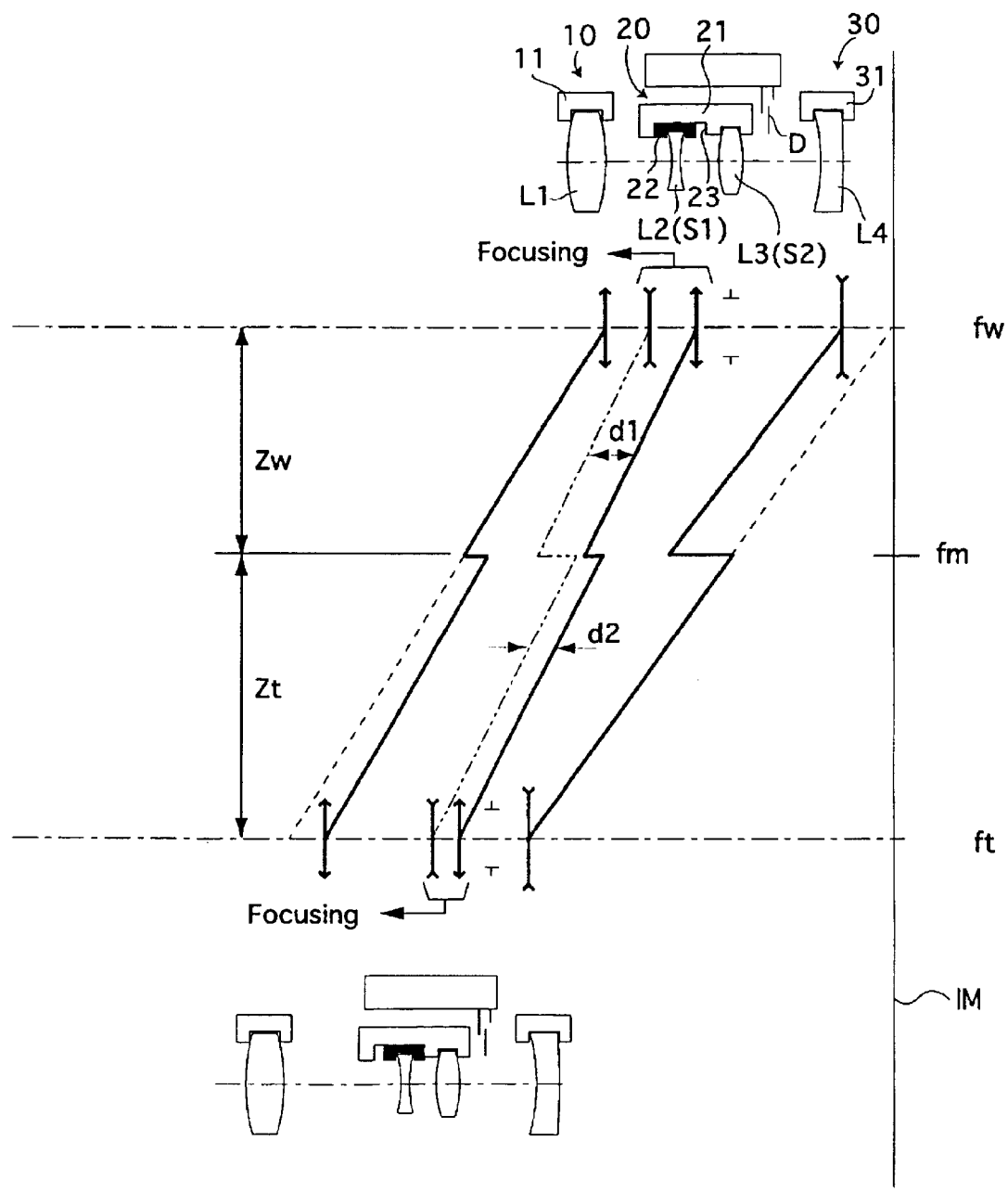
FIG. 2 is a schematic drawing of a second embodiment of a zoom lens system having switching lens groups and the fundamental zoom path thereof, to which the present invention is applied.

FIG. 2 shows the second embodiment of the zoom lens system. The zoom lens system includes a positive first variable lens group 10, a positive second variable lens group 20, and a negative third variable lens group 30, in that order from the object side. The first variable lens group 10 includes a positive first lens group L1. The second variable lens group 20 includes a negative second lens group L2 (first sub-lens group S1) and a positive third lens group L3 (second sub-lens group S2), in that order from the object side. The third variable lens group 30 includes a negative fourth lens group L4. The first lens group L1 is fixed to a first lens group frame 11. The second sub-lens group S2 of the second variable lens group 20 is fixed to a second lens group frame 21. The first sub-lens group S1 is mounted on a movable sub-lens group frame 22. The movable sub-lens group frame 22 is arranged to move, in the optical axis direction, by a predetermined distance, along a guide groove 23 which is formed on the second lens group frame 21. The first sub-lens group S1 is selectively moved to either the object-side movement extremity at which the movable sub-lens group frame 22 comes into contact with the front end of the guide groove 23, or the image-side movement extremity at which the movable sub-lens group frame 22 comes into contact with the rear end of the guide groove 23. The fourth lens group L4 is fixed to a third lens group frame 31. A diaphragm D is arranged to move together with the second variable lens group 20 (second lens group frame 21).

In the zoom paths according to the second embodiment, the first variable lens group 10 (first lens group frame 11), the second variable lens group 20 (second lens group frame 21), the third variable lens group 30 (third lens group frame 31), and the first sub-lens group S1 (movable sub-lens group frame 22) move in the following manner:

[A] In a short-focal-length zooming range Zw from the short focal length extremity fw to an intermediate focal length fm, the first sub-lens group S1 and the second sub-lens group S2 maintain a distance d1 (first separation space/wide space); and the first variable lens group 10 (first lens group frame 11), the second variable lens group 20 (second lens group frame 21) and the third variable lens group 30 (third lens group frame 31) move towards the object side while mutually changing the distances therebetween.

[B] At the intermediate focal length fm, the first variable lens group 10, the second variable lens group 20 and the third variable lens group 30 are moved towards the image side at the long focal-length extremity of the short-focal-length zooming range Zw; and the first sub-lens group S1 moves to the image-side movement extremity of the guide groove 23, wherein the first sub-lens group S1 moves toward the second sub-lens group S2 so that the distance therebetween is determined by a shorter distance (second separation space/narrow space) d2.

[C] In a long-focal-length zooming range Zt from the intermediate focal length fm to the long focal length extremity ft, the first sub-lens group S1 and the second sub-lens group S2 maintain the shorter distance d2; and the first variable lens group 10, the second variable lens group 20 and third variable lens group 30 move towards the object side based on the positions thereof which are determined at the intermediate focal length fm, after the first through fourth lens groups 1 through 4 have been moved towards the image side, while changing the distances therebetween.

The zoom paths for the first variable lens group 10, the second variable lens group 20 and the third variable lens group 30 are simply depicted as straight lines in FIG. 2. It should be noted, however, that actual zoom paths are not necessarily straight lines.

Focusing is performed by integrally moving, in the optical axis direction, the first sub-lens group S1 and the second sub-lens group S2, i.e., the second variable lens group 20 (second lens group frame 21) regardless of the zooming range.

Likewise with the first embodiment, the zoom paths are discontinuous at the intermediate focal length fm; however, a solution for continuously forming a correct image plane exists by appropriately determining the positions of the first lens group L1, the first sub-lens group S1 (second lens group L2) and the second sub-lens group S2 (third lens group L3) and the fourth lens group L4 respectively at the short focal length extremity fw, the intermediate focal length fm (discontinuous line) and the long focal length extremity ft. According to such a zoom path, a miniaturized zoom lens system having a high zoom ratio can be obtained.

Figure 3:
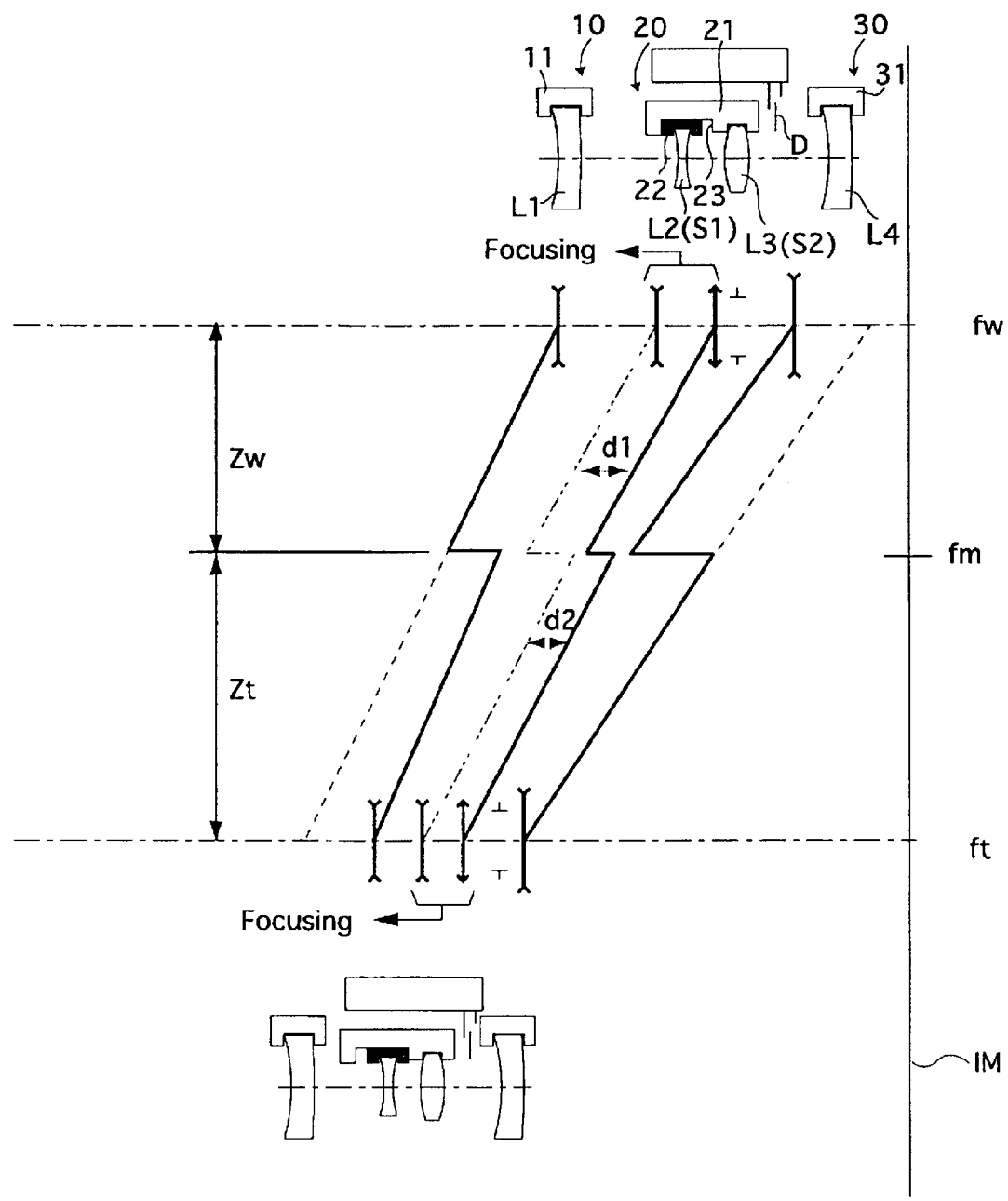
FIG. 3 is a schematic drawing of a third embodiment of a zoom lens system having switching lens groups and the fundamental zoom path thereof, to which the present invention is applied.

FIG. 3 shows the third embodiment of the zoom lens system with a switching lens system. In this embodiment, the first lens group L1 is constructed so as to have negative refractive power, which is the only difference compared with the second embodiment. Apart from this characteristic, the third embodiment is substantially the same as the second embodiment.

Figure 4:
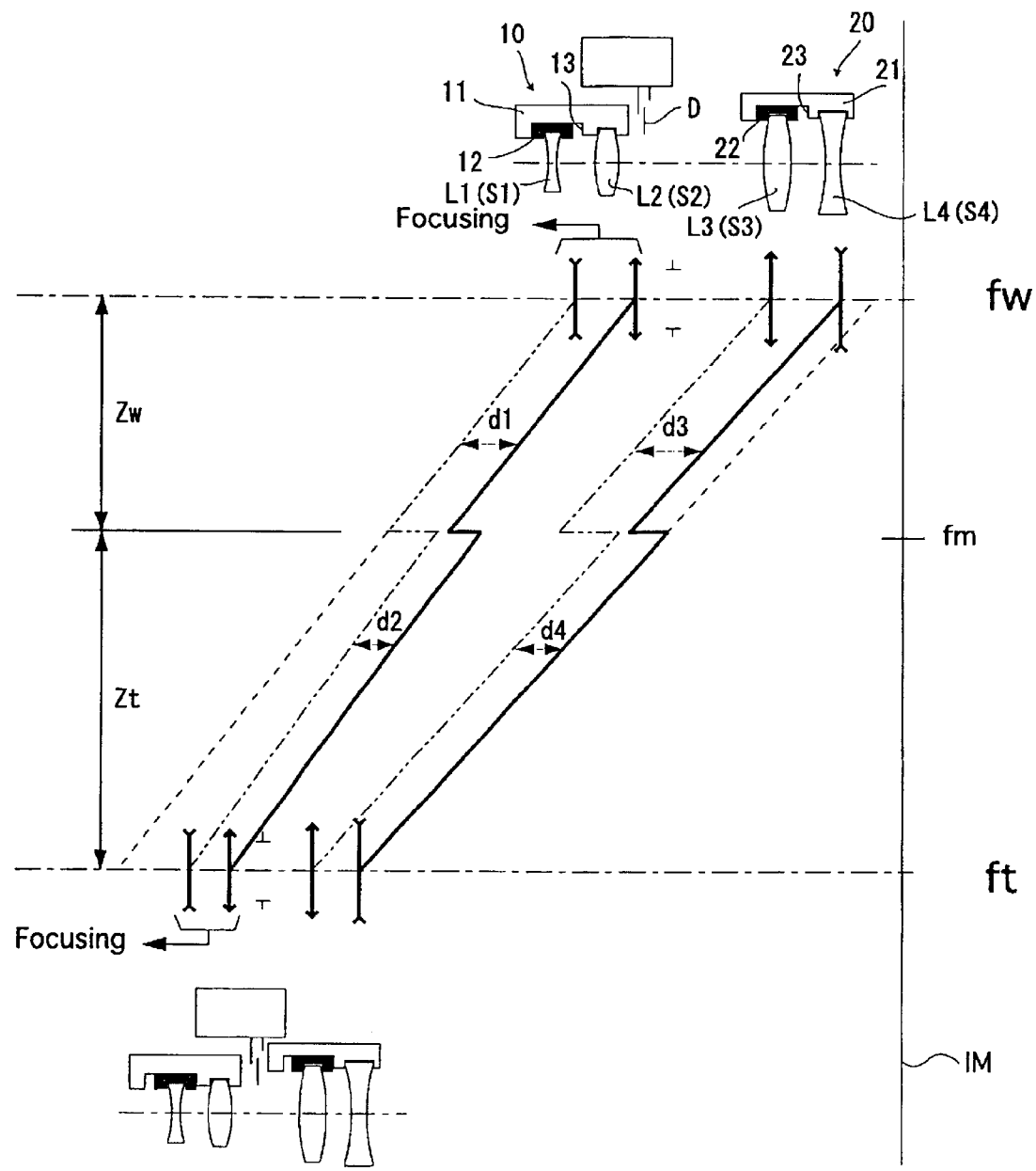
FIG. 4 is a schematic drawing of a fourth embodiment of a zoom lens system having switching lens groups and the fundamental zoom path thereof, to which the present invention is applied.

FIG. 4 shows the fourth embodiment of the zoom lens system with a switching lens group. The zoom lens system includes a positive first variable lens group 10, and a negative second variable lens group 20, in that order from the object side. The first variable lens group 10 includes a negative first lens group L1 (first sub-lens group S1) and a positive second lens group L2 (second sub-lens group S2), in that order from the object side. The second variable lens group 20 includes a positive third lens group L3 (third sub-lens group S3) and a negative fourth lens group L4 (fourth sub-lens group S4), in that order from the object side.

The second sub-lens group S2 of the first variable lens group 10 is fixed to a first lens group frame 11. The first sub-lens group S1 is mounted on a movable sub-lens group frame 12. The movable sub-lens group frame 12 is arranged to move in the optical axis direction, by a predetermined distance, along a guide groove 13 which is formed on the first lens group frame 11. The first sub-lens group S1 is selectively moved to either the object-side movement extremity at which the movable sub-lens group frame 12 comes into contact with the front end of the guide groove 13, or the image-side movement extremity at which the movable sub-lens group frame 12 comes into contact with the rear end of the guide groove 13. Similarly, the fourth sub-lens group S4 of the second variable lens group 20 is fixed to a second lens group frame 21. The third sub-lens group S3 is mounted on a movable sub-lens group frame 22. The movable sub-lens group frame 22 is arranged to move in the optical axis direction, by a predetermined distance, along a guide groove 23 which is formed on the second lens group frame 21. The third sub-lens group S3 is selectively moved to either the object-side movement extremity at which the movable sub-lens group frame 22 comes into contact with the front end of the guide groove 23, or the image-side movement extremity at which the movable sub-lens group frame 22 comes into contact with the rear end of the guide groove 23. A diaphragm D is arranged to move together with the first variable lens group 10 (first lens group frame 11).

In the zoom paths according to the fourth embodiment, the first variable lens group 10 (first lens group frame 11) the second variable lens group 20 (second lens group frame 21), the first sub-lens group S1, and the third sub lens group S3 move in the following manner:

[A] In a short-focal-length zooming range Zw from the short focal length extremity fw to an intermediate focal length fm, the first sub-lens group S1 and the second sub-lens group S2 maintain a distance d1 therebetween (first separation space/wide space), and the third sub-lens group S3 and the fourth sub-lens group S4 maintain a distance d3 therebetween (first separation space/wide space) ; and the first variable lens group 10 (first lens group frame 11) and the second variable lens group 20 (second lens group frame 21) move towards the object side while mutually changing the distance therebetween.

[B] At the intermediate focal length fm, the first variable lens group 10 and the second variable lens group 20 are moved towards the image side at the long focal-length extremity of the short-focal-length zooming range Zw; and the first sub-lens group S1 moves to the image-side movement extremity of the guide groove 13, wherein the first sub-lens group S1 moves toward the second sub-lens group S2 so that the distance therebetween is determined by a shorter distance (second separation space/narrow space) d2, and also the third sub-lens group S3 moves toward the fourth sub-lens group S4 so that the distance therebetween is determined by a shorter distance (second separation space/narrow space) d4.

[C] In a long-focal-length zooming range Zt from the intermediate focal length fm to the long focal length extremity ft, the first sub-lens group S1 and the second sub-lens group S2 maintain the shorter distance d2 therebetween, and the third sub-lens group S3 and the fourth sub-lens group S4 maintain the shorter distance d4 therebetween; and the first variable lens group 10 and the second variable lens group 20 move towards the object side based on the positions thereof which are determined at the intermediate focal length fm, after the first through fourth lens groups L1 through L4 have been moved towards the image side, while changing the distance therebetween.

The zoom paths for the first variable lens group 10 and the second variable lens group 20 are simply depicted as straight lines in FIG. 4. It should be noted, however, that the actual zoom paths are not necessarily straight lines.

Focusing is performed by integrally moving, in the optical axis direction, the first sub-lens group S1 and the second sub-lens group S2, i.e., the first variable lens group 10 (first lens group frame 11) regardless of the zooming range.

Similar to the first through third embodiments, in the fourth embodiment, the zoom paths are discontinuous at the intermediate focal length fm; however, a solution for continuously forming a correct image plane exists by appropriately determining the positions of the first sub-lens group S1 (first lens group L1), the second sub-lens group S2 (second lens group L2), the third sub-lens group S3 (third lens group L3), and the fourth sub-lens group S4 (fourth lens group L4), respectively, at the short focal length extremity fw, the intermediate focal length fm (discontinuous line), and the long focal length extremity ft. According to such a zoom path, a miniaturized zoom lens system having a high zoom ratio can be obtained.

Figure 5:
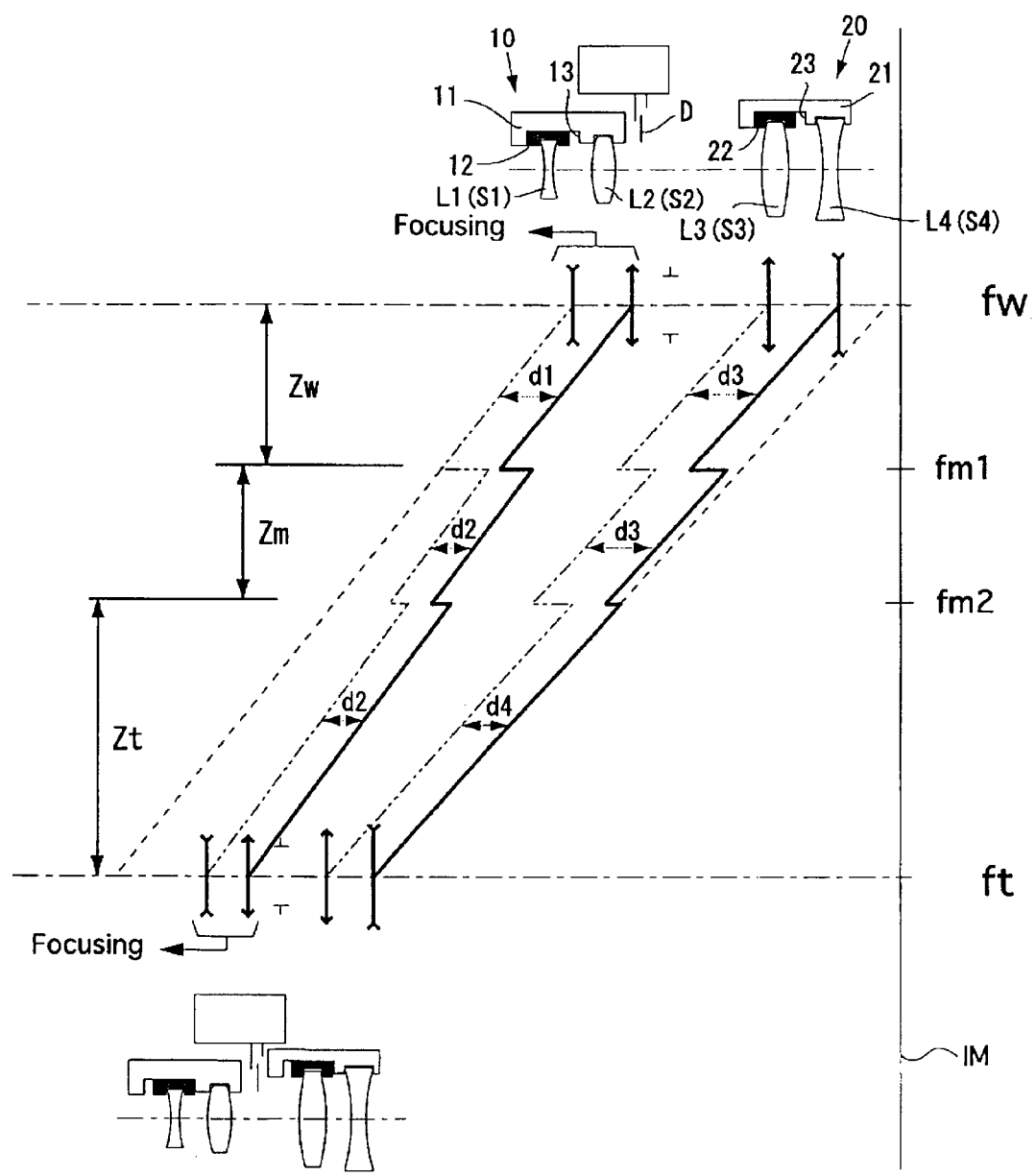
FIG. 5 is a schematic drawing of a fifth embodiment of a zoom lens system having switching lens groups and the fundamental zoom path thereof, to which the present invention is applied.

FIG. 5 shows the fifth embodiment of the zoom lens system with a switching lens group. The zoom lens system includes a positive first variable lens group 10, and a negative second variable lens group 20, in that order from the object side. The first variable lens group 10 includes a negative first lens group L1 (first sub-lens group S1) and a positive second lens group L2 (second sub-lens group S2), in that order from the object side. The second variable lens group 20 includes a positive third lens group L3 (third sub-lens group S3) and a negative fourth lens group L4 (fourth sub-lens group S4), in that order from the object side.

The second sub-lens group S2 of the first variable lens group 10 is fixed to a first lens group frame 11. The first sub-lens group S1 is mounted on a movable sub-lens group frame 12. The movable sub-lens group frame 12 is arranged to move in the optical axis direction, by a predetermined distance, along a guide groove 13 which is formed on the first lens group frame 11. The first sub-lens group S1 is selectively moved to either the object-side movement extremity at which the movable sub-lens group frame 12 comes into contact with the front end of the guide groove 13, or the image-side movement extremity at which the movable sub-lens group frame 12 comes into contact with the rear end of the guide groove 13. Similarly, the fourth sub-lens group S4 of the second variable lens group 20 is fixed to a second lens group frame 21. The third sub-lens group S3 is mounted on a movable sub-lens group frame 22. The movable sub-lens group frame 22 is arranged to move in the optical axis direction, by a predetermined distance, along a guide groove 23 which is formed on the second lens group frame 21. The third sub-lens group S3 is selectively moved to either the object-side movement extremity at which the movable sub-lens group frame 22 comes into contact with the front end of the guide groove 23, or the image-side movement extremity at which the movable sub-lens group frame 22 comes into contact with the rear end of the guide groove 23. A diaphragm D is arranged to move together with the first variable lens group 10 (first lens group frame 11).

In the zoom paths according to the fifth embodiment, the first variable lens group 10 (first lens group frame 11) the second variable lens group 20 (second lens group frame 21), the first sub-lens group S1, and the third sub lens group S3 move in the following manner:

[A] In a short-focal-length zooming range Zw from the short focal length extremity fw to a first intermediate focal length fm1, the first sub-lens group S1 and the second sub-lens group S2 maintain a distance d1 therebetween (first separation space/wide space), and the third sub-lens group S3 and the fourth sub-lens group S4 maintain a distance d3 therebetween (first separation space/wide space); and the first variable lens group 10 (first lens group frame 11) and the second variable lens group 20 (second lens group frame 21) move towards the object side while mutually changing the distance therebetween.

[B] At the first intermediate focal length fm1, the first variable lens group 10 and the second variable lens group 20 are moved towards the image side at the long focal-length extremity of the short-focal-length zooming range Zw; and the first sub-lens group S1 moves to the image-side movement extremity of the guide groove 13, wherein the first sub-lens group S1 moved toward the second sub-lens group S2 so that the distance therebetween is determined by a shorter distance (second separation space/narrow space) d2.

[C] In an intermediate zooming range Zm from the first intermediate focal length fm1 to a second intermediate focal length fm2, the first sub-lens group S1 and the second sub-lens group S2 maintain the shorter distance d2, and the third sub-lens group S3 and the fourth sub-lens group S4 maintain the longer distance d3; and the first variable lens group 10 and the second variable lens group 20 move towards the object side based on the positions thereof which are determined at the first intermediate focal length fm1, after the first through fourth lens groups L1 through L4 have been moved towards the image side, while changing the distance therebetween.

[D] At the second intermediate focal length fm2, the first variable lens group 10 and the second variable lens group 20 are moved towards the image side at the long focal length extremity of the intermediate zooming range Zm; and the third sub-lens group S3 moves to the image-side movement extremity of the guide groove 23, wherein the third sub-lens group S3 moves toward the fourth sub-lens group S4 so that the distance therebetween is determined by a shorter distance (second separation space/narrow space) d4.

[E] In a long-focal-length zooming range Zt from the second intermediate focal length fm2 to the long focal length extremity ft, the first sub-lens group S1 and the second sub-lens group S2 maintain the shorter distance d2 therebetween, and the third sub-lens group S3 and the fourth sub-lens group S4 maintain the shorter distance d4 therebetween; and the first variable lens group 10 and the second variable lens group 20 move towards the object side based on the positions thereof which are determined at the second intermediate focal length fm2, after the first through fourth lens groups L1 through L4 have been moved towards the image side, while changing the distance therebetween.

The zoom paths for the first variable lens group 10 and the second variable lens group 20 are simply depicted as straight lines in FIG. 5. It should be noted, however, that the actual zoom paths are not necessarily straight lines.

Focusing is performed by integrally moving, in the optical axis direction, the first sub-lens group S1 and the second sub-lens group S2, i.e., the first variable lens group 10 (first lens group frame 11) regardless of the zooming range.

Similar to the first through fourth embodiments, in the fifth embodiment, the zoom paths are discontinuous at the first intermediate focal length fm1 and the second intermediate focal length fm2; however, a solution for continuously forming a correct image plane exists by appropriately determining the positions of the first sub-lens group S1 (first lens group L1), the second sub-lens group S2 (second lens group L2), the third sub-lens group S3 (third lens group L3) and the fourth sub-lens group S4 (fourth lens group L4), respectively, at the short focal length extremity fw, the first and second intermediate focal lengths fm1, fm2 (discontinuous line), and the long focal length extremity ft. According to such a zoom path, a miniaturized zoom lens system having a high zoom ratio can be obtained.

Figure 6:
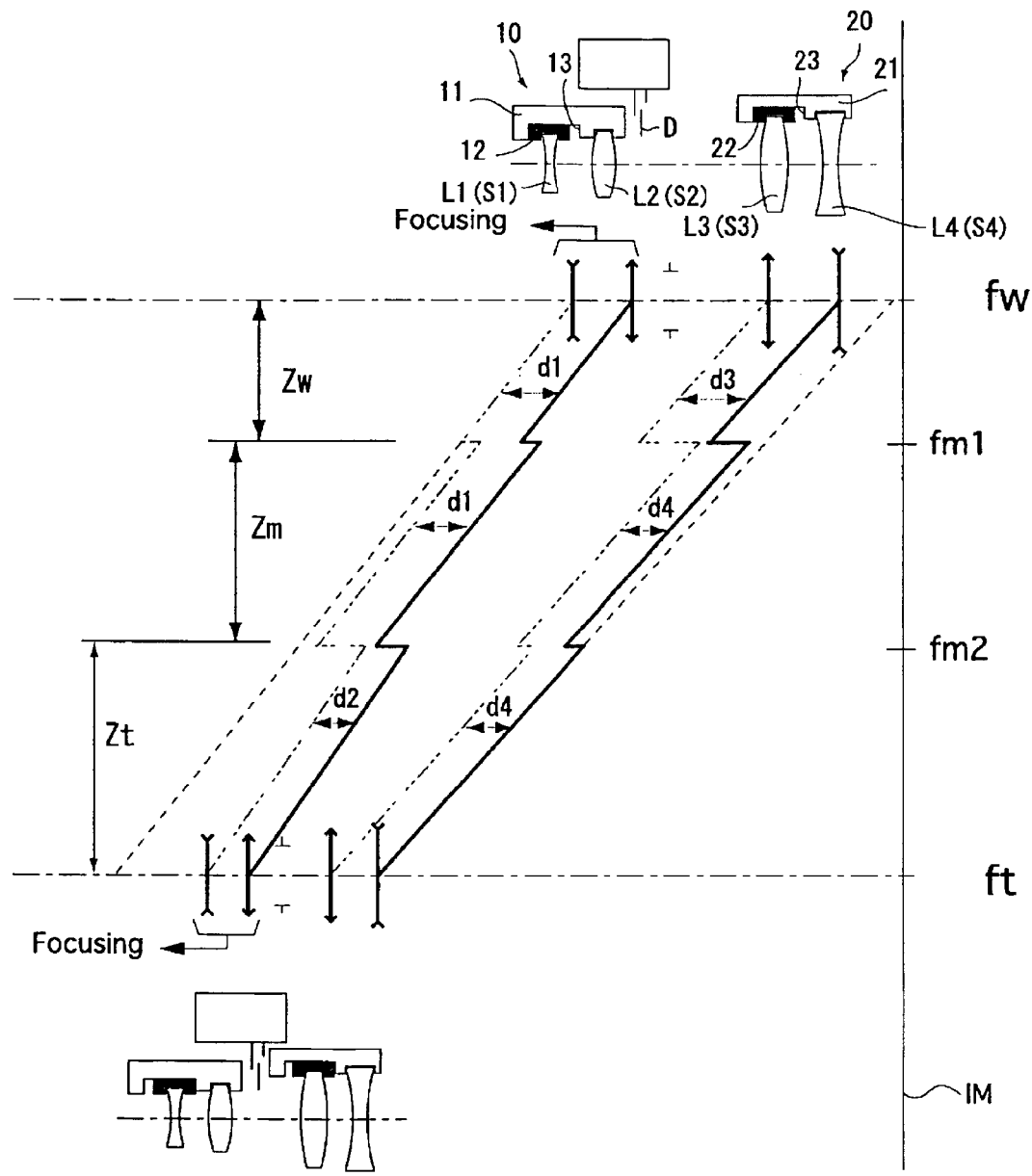
FIG. 6 is a schematic drawing of a sixth embodiment of a zoom lens system having switching lens groups and the fundamental zoom path thereof, to which the present invention is applied.

FIG. 6 shows the sixth embodiment of the zoom lens system with a switching lens group. The zoom lens system includes a positive first variable lens group 10, and a negative second variable lens group 20, in that order from the object side. The first variable lens group 10 includes a negative first lens group L1 (first sub-lens group S1) and a positive second lens group L2 (second sub-lens group S2), in that order from the object side. The second variable lens group 20 includes a positive third lens group L3 (third sub-lens group S3) and a negative fourth lens group L4 (fourth sub-lens group S4), in that order from the object side.

The second sub-lens group S2 of the first variable lens group 10 is fixed to a first lens group frame 11. The first sub-lens group S1 is mounted on a movable sub-lens group frame 12. The movable sub-lens group frame 12 is arranged to move in the optical axis direction, by a predetermined distance, along a guide groove 13 which is formed on the first lens group frame 11. The first sub-lens group S1 is selectively moved to either the object-side movement extremity at which the movable sub-lens group frame 12 comes into contact with the front end of the guide groove 13, or the image-side movement extremity at which the movable sub-lens group frame 12 comes into contact with the rear end of the guide groove 13. Similarly, the fourth sub-lens group S4 of the second variable lens group 20 is fixed to a second lens group frame 21. The third sub-lens group S3 is mounted on a movable sub-lens group frame 22. The movable sub-lens group frame 22 is arranged to move in the optical axis direction, by a predetermined distance, along a guide groove 23 which is formed on the second lens group frame 21. The third sub-lens group S3 is selectively moved to either the object-side movement extremity at which the movable sub-lens group frame 22 comes into contact with the front end of the guide groove 23, or the image-side movement extremity at which the movable sub-lens group frame 22 comes into contact with the rear end of the guide groove 23. A diaphragm D is arranged to move together with the first variable lens group 10 (first lens group frame 11).

In the zoom paths according to the sixth embodiment, the first variable lens group 10 (first lens group frame 11), the second variable lens group 20 (second lens group frame 21), the first sub-lens group S1, and the third sub lens group S3 move in following manner:

[A] In a short-focal-length zooming range Zw from the short focal length extremity fw to a first intermediate focal length fm1, the first sub-lens group S1 and the second sub-lens group S2 maintain a distance d1 therebetween (first separation space/wide space), and the third sub-lens group S3 and the fourth sub-lens group S4 maintain a distance d3 therebetween (first separation space/wide space); and the first variable lens group 10 (first lens group frame 11) and the second variable lens group 20 (second lens group frame 21) move towards the object side while mutually changing the distance therebetween.

[B] At the first intermediate focal length fm1, the first variable lens group 10 and the second variable lens group 20 are moved towards the image side at the long focal length extremity of the short-focal-length zooming range Zw; and the third sub-lens group S3 moves to the image-side movement extremity of the guide groove 23, and wherein the third sub-lens group S3 moves toward the fourth sub-lens group S4 so that the distance therebetween is determined by a shorter distance (second separation space/narrow space) d4.

[C] In an intermediate zooming range Zm from the first intermediate focal length fm1 to a second intermediate focal length fm2, the first sub-lens group S1 and the second sub-lens group S2 maintain the longer distance d1 therebetween, and the third sub-lens group S3 and the fourth sub-lens group S4 maintain the shorter distance d4 therebetween; and the first variable lens group 10 and the second variable lens group 20 move towards the object side based on the positions thereof which are determined at the first intermediate focal length fm1, after the first through fourth lens groups L1 through L4 have been moved towards the image side, while changing the distance therebetween.

[D] At the second intermediate focal length fm2, the 5 first variable lens group 10 and the second variable lens group 20 are moved towards the image side at the long focal length extremity of the intermediate zooming range Zm; and the first sub-lens group S1 moves to the image-side movement extremity of the guide groove 13, and wherein the first sub-lens group S1 moves toward the second sub-lens group S2 so that the distance therebetween is determined by a shorter distance (second separation space/narrow space) d2.

[E] In a long-focal-length zooming range Zt from the second intermediate focal length fm2 to the long focal length extremity ft, the first sub-lens group S1 and the second sub-lens group S2 maintain the shorter distance d2 therebetween, and the third sub-lens group S3 and the fourth sub-lens group S4 maintain the shorter distance d4 therebetween; and the first variable lens group 10 and the second variable lens group 20 20 move towards the object side based on the positions thereof which are determined at the second intermediate focal length fm2, after the first through fourth lens groups L1 through L4 have been moved towards the image side, while changing the distance therebetween.

The zoom paths for the first variable lens group 10 and the second variable lens group 20 are simply depicted as straight lines in FIG. 6. It should be noted, however, that the actual zoom paths are not necessarily straight lines.

Focusing is performed by integrally moving, in the optical axis direction, the first sub-lens group S1 and the second sub-lens group S2, i.e., the first variable lens group 10 (first lens group frame 11) regardless of the zooming range.

Similar to the first through fifth embodiments, in the sixth embodiment, the zoom paths are discontinuous at the first intermediate focal length fm1 and the second intermediate focal length fm2; however, a solution for continuously forming a correct image plane exists by appropriately determining the positions of the first sub-lens group S1 (first lens group L1), the second sub-lens group S2 (second lens group L2), the third sub-lens group S3 (third lens group L3), and the fourth sub-lens group S4 (fourth lens group L4), respectively, at the short focal length extremity fw, the first and second intermediate focal lengths fm1, fm2 (discontinuous line), and the long focal length extremity ft. According to such a zoom path, a miniaturized zoom lens system having a high zoom ratio can be obtained.

Figure 7:
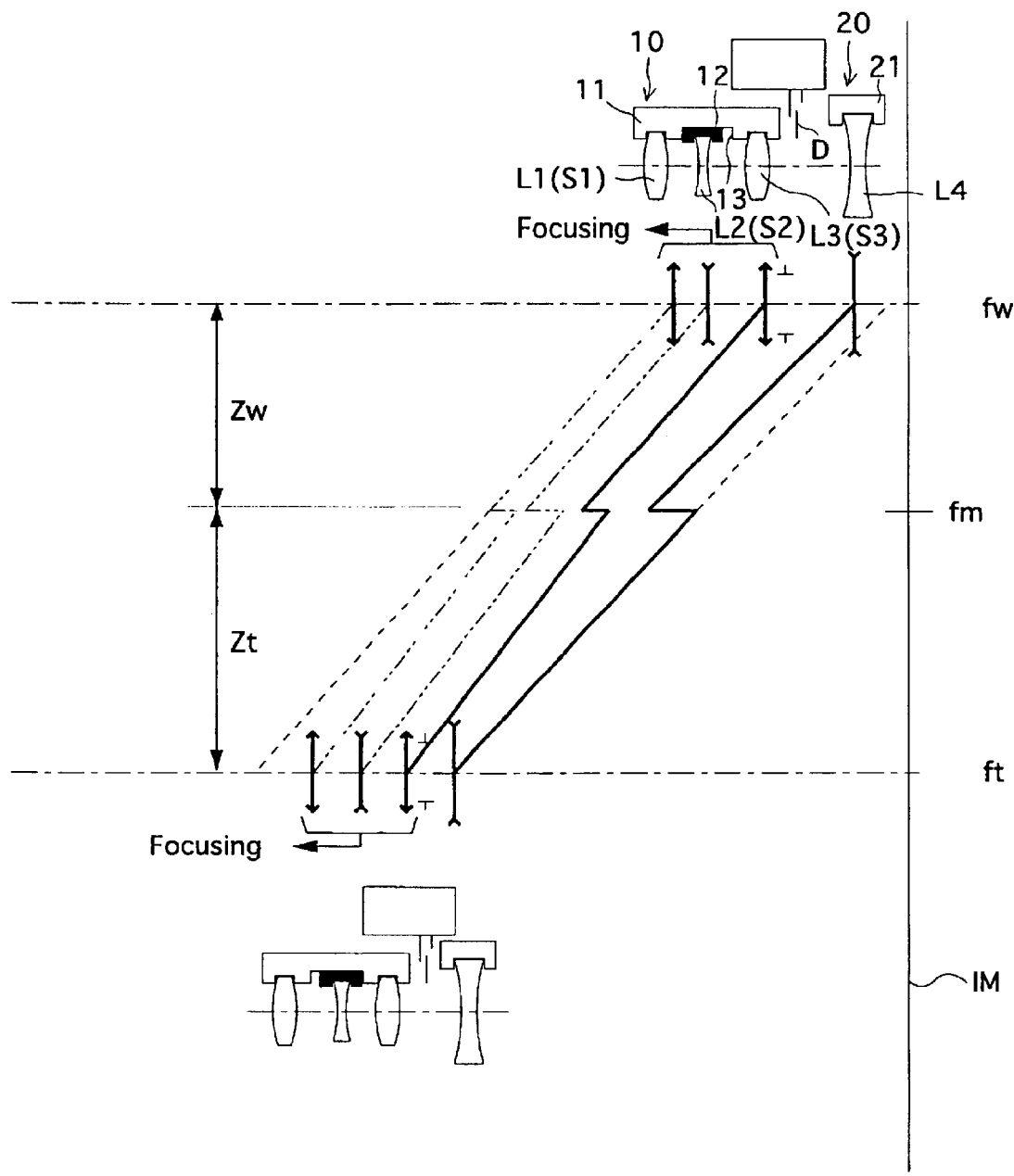
FIG. 7 is a schematic drawing of a seventh embodiment of a zoom lens system having switching lens groups and the fundamental zoom path thereof, to which the present invention is applied.

FIG. 7 shows the seventh embodiment of the zoom lens system with a switching lens group. The zoom lens system includes a positive first variable lens group 10, and a negative second variable lens group 20, in that order from the object side. The first variable lens group 10 includes a positive first lens group L1 (first sub-lens group S1), a negative second lens group L2 (second sub-lens group S2) and a positive third lens group L3 (third sub-lens group S3), in that order from the object side. The second variable lens group 20 includes a negative fourth lens group L4. The first sub-lens group S1 and the third sub-lens group S3 are fixed to a first lens group frame 11. The second sub-lens group S2 is mounted on a movable sub-lens group frame 12. The movable sub-lens group frame 12 is arranged to move in the optical axis direction, by a predetermined distance, along a guide groove 13 which is formed on the first lens group frame 11. The second sub-lens group S2 is selectively moved to either the object-side movement extremity at which the movable sub lens group frame 12 comes into contact with the front end of the guide groove 13, or the image-side movement extremity at which the movable sub-lens group frame 12 comes into contact with the rear end of the guide groove 13. The fourth lens group L4 of the second variable lens group 20 is fixed to a second lens group frame 21. A diaphragm D is arranged to move together with the first variable lens group 10 (first lens group frame 11).

In the zoom paths according to the seventh embodiment, the first variable lens group 10 (first lens group frame 11), the second variable lens group 20 (second lens group frame 21), and the second sub-lens group S2 move in the following manner:

[A] In a short-focal-length zooming range Zw from the short focal length extremity fw to an intermediate focal length fm, the first sub-lens group S1 and the second sub-lens group S2 maintain a shorter distance therebetween; however, the second sub-lens group S2 and the third sub-lens group S3 maintain a longer distance there between; and the first variable lens group 10 (first lens group frame 11) and the second variable lens group 20 (second lens group frame 21) move towards the object side while changing the distance therebetween.

[B] At the intermediate focal length fm, the first variable lens group 10 and the second variable lens group 20 are moved towards the image side at the long focal-length extremity of the short-focal-length zooming range Zw; and the second sub-lens group S2 moves to the image-side movement extremity of the guide groove 13, and wherein the second sub-lens group S2 moves away from the first sub-lens group S1 and moves toward the third sub-lens group S3.

[C] In a long-focal-length zooming range Zt from the intermediate focal length fm to the long focal length extremity ft, the first sub-lens group S1 and the second sub-lens group S2 maintain the longer distance therebetween, and the second sub-lens group S2 and the third sub-lens group S3 maintain the shorter distance therebetween; and the first variable lens group 10 and the second variable lens group 20 move towards the object side based on the positions thereof which are determined at the intermediate focal length fm, after the first through fourth lens groups L1 through L4 have been moving towards the image side, while changing the distance therebetween.

The zoom paths for the first variable lens group 10 and the second variable lens group 20 are simply depicted as straight lines in FIG. 7. It should be noted, however, that the actual zoom paths are not necessarily straight lines.

Focusing is performed by integrally moving, in the optical axis direction, the first sub-lens group S1 through the third sub-lens group S3, i.e., the first variable lens group 10 (first lens group frame 11) regardless of the zooming range.

Similar to the first through sixth embodiments, in the seventh embodiment, the zoom paths are discontinuous at the intermediate focal length fm; however, a solution for continuously forming a correct image plane exists by appropriately determining the positions of the first sub-lens group S1 (first lens group L1), the second sub-lens group S2 (second lens group L2), the third sub-lens group S3 (third lens group L3), and the fourth lens group L4, respectively, at the short focal length extremity fw, the intermediate focal length fm, (discontinuous line), and the long focal length extremity ft. According to such a zoom path, a miniaturized zoom lens system having a high zoom ratio can be obtained.

Figure 8:
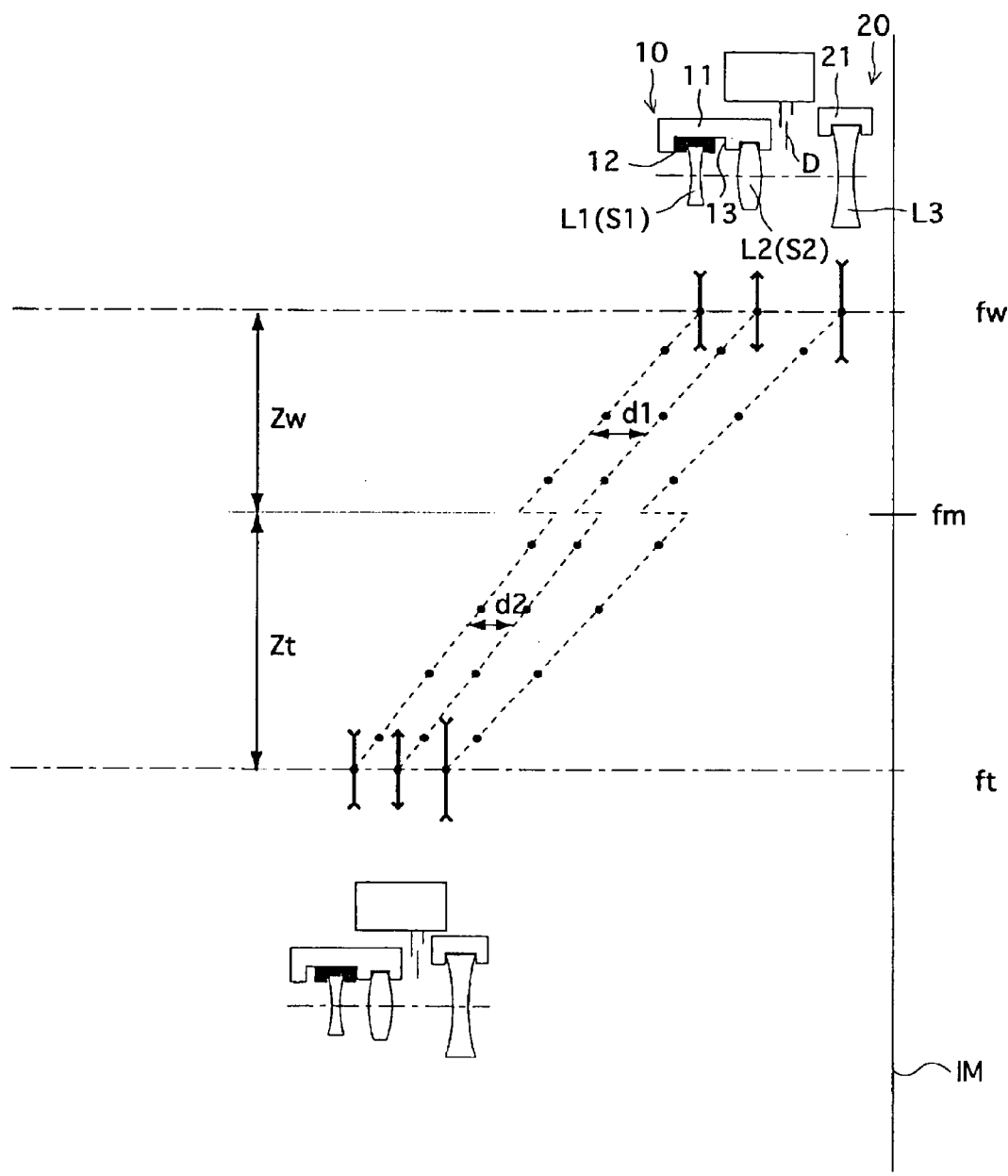
FIG. 8 shows one example of stopping positions of the lens groups when a photographic operation is carried out, to which the present invention is applied.
Figure 9A:
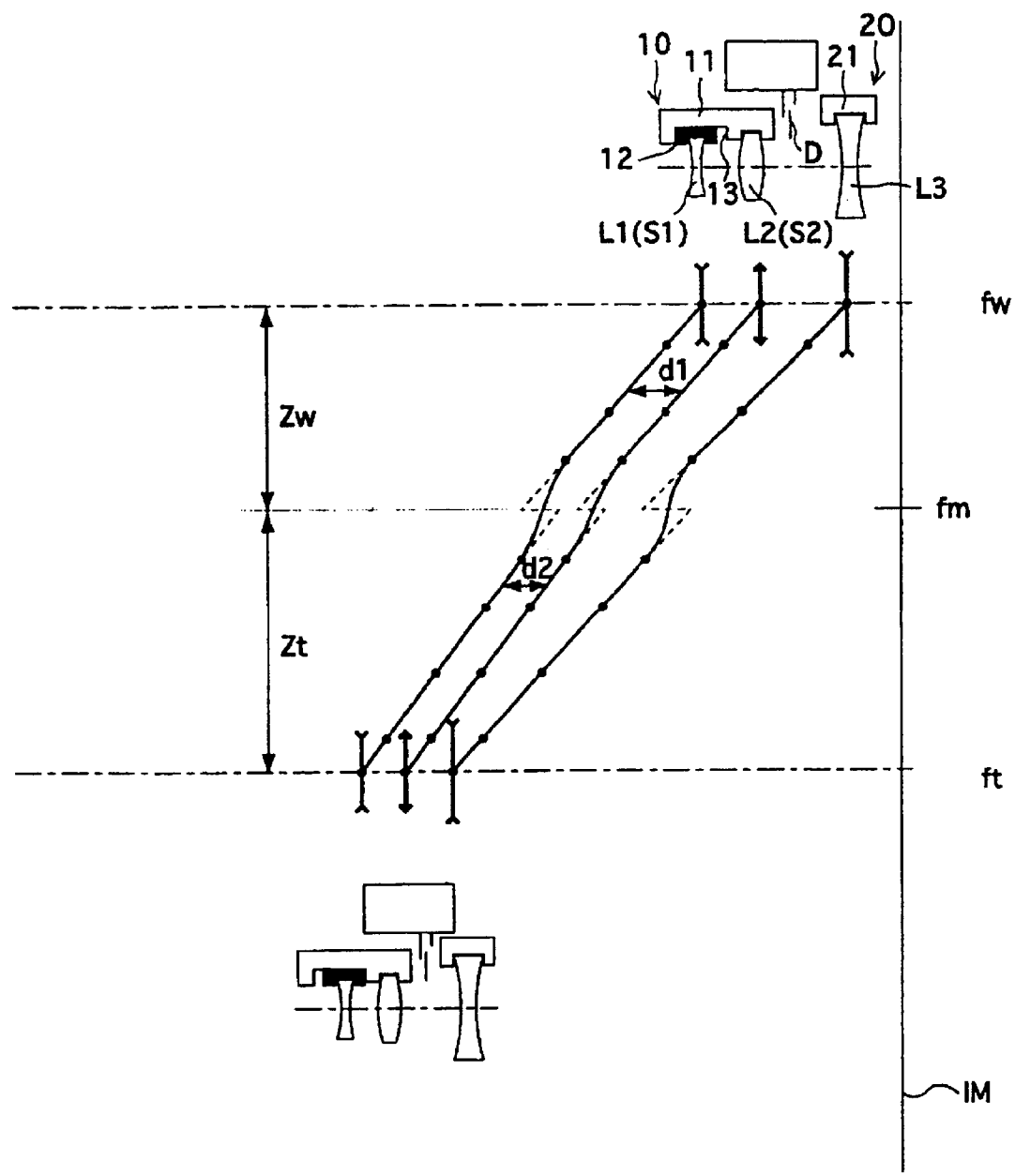
FIG. 9A shows an example of the stopping positions of FIG. 8 and an example of an actual zoom path of the lens groups, to which the present invention is applied.

As can be understood from the above description, it is practical to apply the above-described zoom lens system having switching lens groups to a photographing lens system of a camera in which the photographing lens system and a finder optical system are independently provided. Moreover, with respect to each of the first through fourth lens groups L1 through L4, stopping positions at which the lens group stops upon zooming are preferably determined in a stepwise manner along a fundamental zoom path, i.e., it is preferable to provide a plurality of focal-length steps. FIGS. 8 and 9 show zoom lens systems in which positions for stopping each lens group are determined in a stepwise manner along the fundamental zoom paths. Since these zoom lens systems are the same as that of the first embodiment, identical components are provided with the same designators. The zoom paths are depicted with fundamental dotted lines; and positions at which the first lens group frame 11 and the second lens group frame 21 stop are indicated with black dots along the dotted lines. Further, in FIG. 9A, the dots are connected by smooth (continuous) curved lines to form an actual zoom path. The actual mechanical structure thereof allows the first lens group frame 11 and the second lens group frame 21 to be moved along the smooth curved lines (actual zoom path).

In the first through seventh embodiments, each lens group is illustrated as a single lens element; however, a lens group can of course include a plurality of lens elements.

Figure 9B:
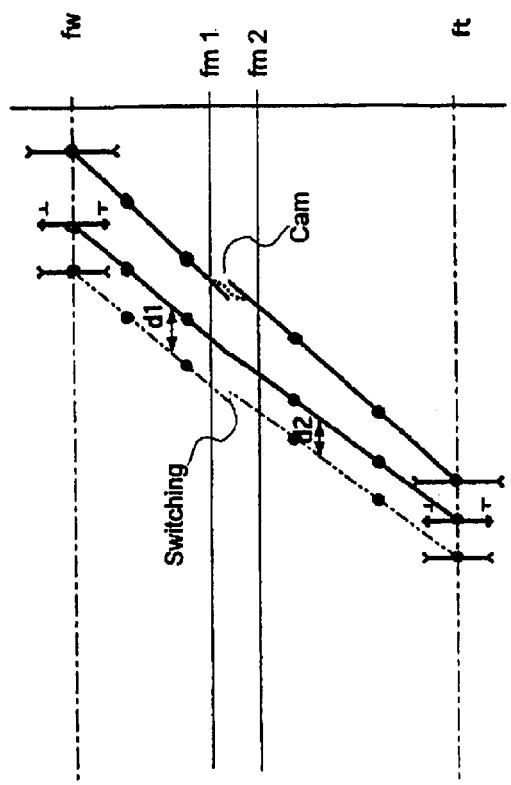
FIGS. 9B and 9C depict an additional schematic view of the concepts shown in FIGS. 8 and 9A.
Figure 9C:
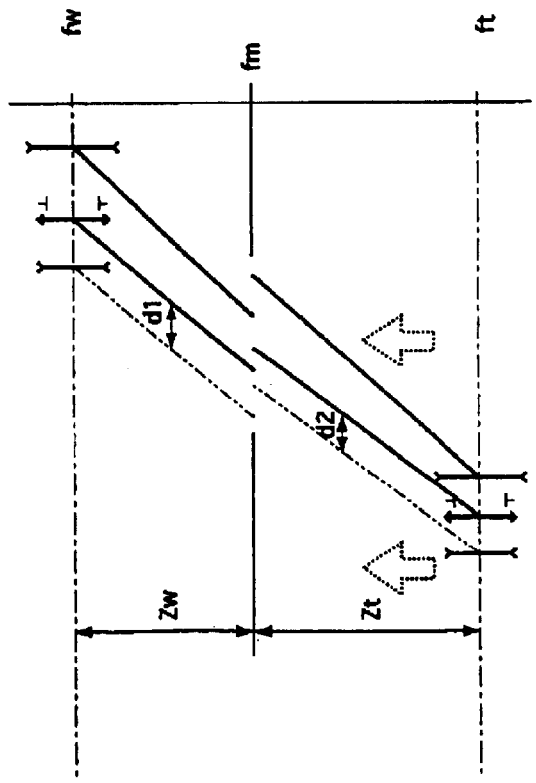

FIGS. 9B and 9C depict an additional schematic view of the concepts shown in FIGS. 8 and 9A. It should be noted in the following explanation that FIGS. 9B and 9C are schematic in nature (e.g., not to scale and/or not depicting actual shape) and that one skilled in the art will recognize that the zoom paths are not necessarily straight, and the manner in which the schematics of FIGS. 9B and 9C relate to a designed (zooming) cam groove shape (which will differ depending at least on the optical configuration). As shown in FIG. 9B and 9C, if, in order to arrange movement in accordance with FIG. 9A, it is determined that one zoom path will be connected in an uninflected line (i.e., essentially without discontinuity or inflection and without switching), then the cam ring, shape, and orientation of cam groove(s) can be adapted for this purpose. As shown in FIG. 9B, each of the three fundamental zoom paths can include a discontinuity. By smoothly connecting one zoom path, in this case the second zoom path (e.g., depicted in the FIGS. 9B and 9C by shifting all of the zoom paths in the intermediate-to-telephoto range "up" so that the path of the second lens group is connected), it becomes possible to carry out the movements of the combined groups more simply. In this case, it is decided to use "switching" for the first group and a smooth inflection in the second group. As noted, the stepwise movement/positioning and prohibition of photography in the switching/inflection range also form part of this system.

Although FIG. 9C depicts a shift in which the second zoom path is made essentially connected, the amount of shifting "up" does not need to fully align the curve to be made smoother, but need only take up a portion of the discontinuity (e.g., reducing any inflection to a selected amount, such as an imperceptible amount). In the following description, it is noted that cam groove 44f is essentially without discontinuity or inflection, relating to the second group zoom path in FIGS. 9A–9C, and that cam groove 44r has a small inflection, relating to the third group zoom path in FIGS. 9A–9C. However, the adaptation depicted in FIGS. 9B and 9C can be used for any of the systems depicted in FIGS. 1–7 or variations thereof.

It can be decided to use at least one smooth or uninflected line for various reasons, including simplicity of movement, simplicity of manufacturing, or to improve exterior appearance of movement of lens barrels (e.g., to avoid visible discontinuity in the operation of the lens barrels, so that an unsophisticated operator does not become concerned about the proper operation of the camera). In the example given, the movement of the lens barrel supporting the second lens group is essentially continuous, while the switching movement of the first lens group and the inflected movement of the third lens group cannot be seen from the exterior of the camera.

In each of the above-described embodiments, the first variable lens group 10 in FIGS. 1, 8, and 9A, the second variable lens group 20 in FIG. 2, the second variable lens group 20 in FIG. 3, the first variable lens group 10 in FIG. 4, the first variable lens group 10 in FIG. 5, the first variable lens group 10 in FIG. 6, and the first variable lens group 10 in FIG. 7 (including the first lens L1 and the third lens L3 as a unit) are each switching lens groups which serve as focusing lens groups in any focal length range.

A preferred embodiment will now be described in which the present invention has been applied to the zoom lens barrel in the examples shown in FIGS. 1, 8, and 9A, which have a first variable lens group 10 (switching lens group) and a second variable lens group 20.

FIGS. 10 through 31 show an embodiment of a zoom lens barrel (system). Unlike the zoom lens systems shown in FIGS. 1, 8 and 9, in which one of the first and second sub-lens groups S1 and S2, which together form a switching lens group 10, is fixed to the first lens group frame 11, the first and second sub-lens groups S1 and S2 in this embodiment are both movable with respect to the switching lens group frame in the optical axis direction. In this embodiment, a moving path of the switching lens group frame upon zooming and a path of the first sub-lens group S1 and the second sub-lens group S2 within the switching lens group frame can be added to each other to give a composite zoom path, which corresponds to the zoom path shown in FIGS. 1, 8, and 9A. Upon focusing, the first sub-lens group S1 and the second sub-lens group S2 are integrally moved within the switching lens frame in the optical axis direction. In a photographic operation, the first sub-lens group SI and the second sub-lens group S2 are placed at a predetermined position, before the release of the shutter is started, as a result of the movement of the switching lens group frame and the movement of the first sub-lens group S1 and the second sub-lens group S2 within the switching lens group frame in accordance with focal length information set by an operator (the photographer) and object distance information detected.

Figure 10:
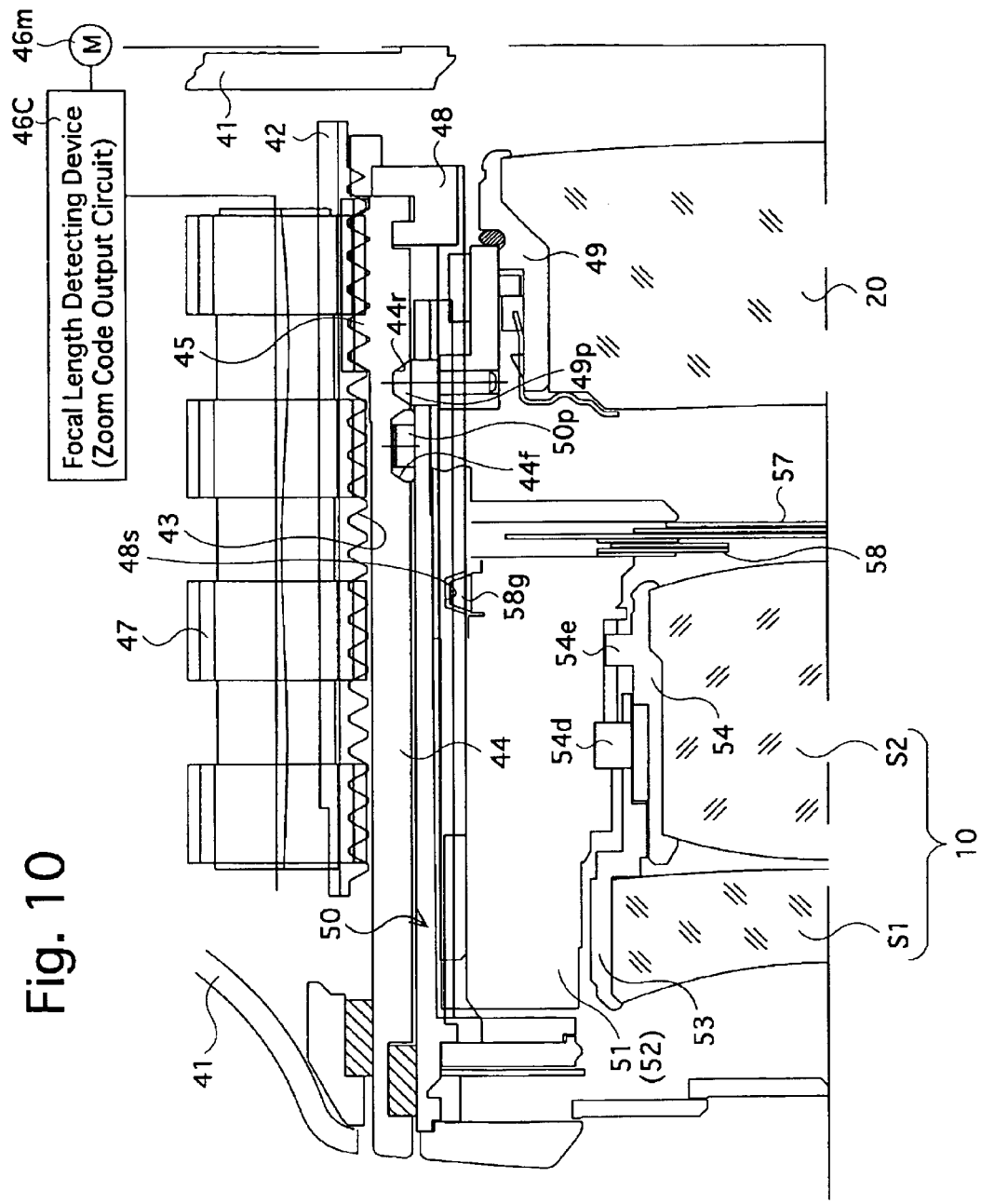
FIG. 10 is a cross-sectional view showing an embodiment of a zoom lens barrel which includes the zoom lens systems having switching lens groups shown in FIGS. 1, 8 and 9.

As shown in FIG. 10, a stationary barrel 42, which is fixed to a camera body 41, has a female helicoid 43 formed on an inner surface of the stationary barrel 42. A male helicoid 45, which is formed on the rearmost circumference of a cam ring 44, engages with the female helicoid 43. Arranged outside of the stationary barrel 42 is a pinion 47 which is rotated by a zooming motor 46. Gear teeth (not shown) are formed on the circumference of the cam ring 44 wherein a part of the male helicoid 45 is cut out therefor. The gear teeth, which are formed to have the same oblique direction as the lead of the male helicoid 45, engages with the pinion 47. Accordingly, the cam ring 44 advances or retreats along the optical axis direction when the cam ring 44 is rotated in either direction by the zooming motor 46 due to the engagement of the female helicoid 43 and male helicoid 45. The position of the cam ring 44 resulting from the rotation made by the zooming motor 46 is detected by focal length detecting device 46C, which can include, for example, of a code plate and a brush.

A linear guide ring 48 is supported by the cam ring 44. The guide ring 48 rotates relative to the cam ring 44 and moves together with the cam ring 44 along the optical axis direction (i.e., no relative displacement is allowed in the optical axis direction). The guide ring 48 is supported by a camera body 41 in a manner that enables the guide ring 48 to move only in the optical axis direction. Arranged inside of the cam ring 44 in order from the front side of the cam ring 44 are a switching lens group frame 50 (first lens group frame) which supports the first variable lens group 10 (i.e., the first sub-lens group S1 and second sub-lens group S2) and a second lens group frame 49 which supports the second variable lens group 20. The switching lens group frame 50 and the second lens group frame 49 are linearly guided along the optical axis direction by the guide ring 48.

Figure 11:
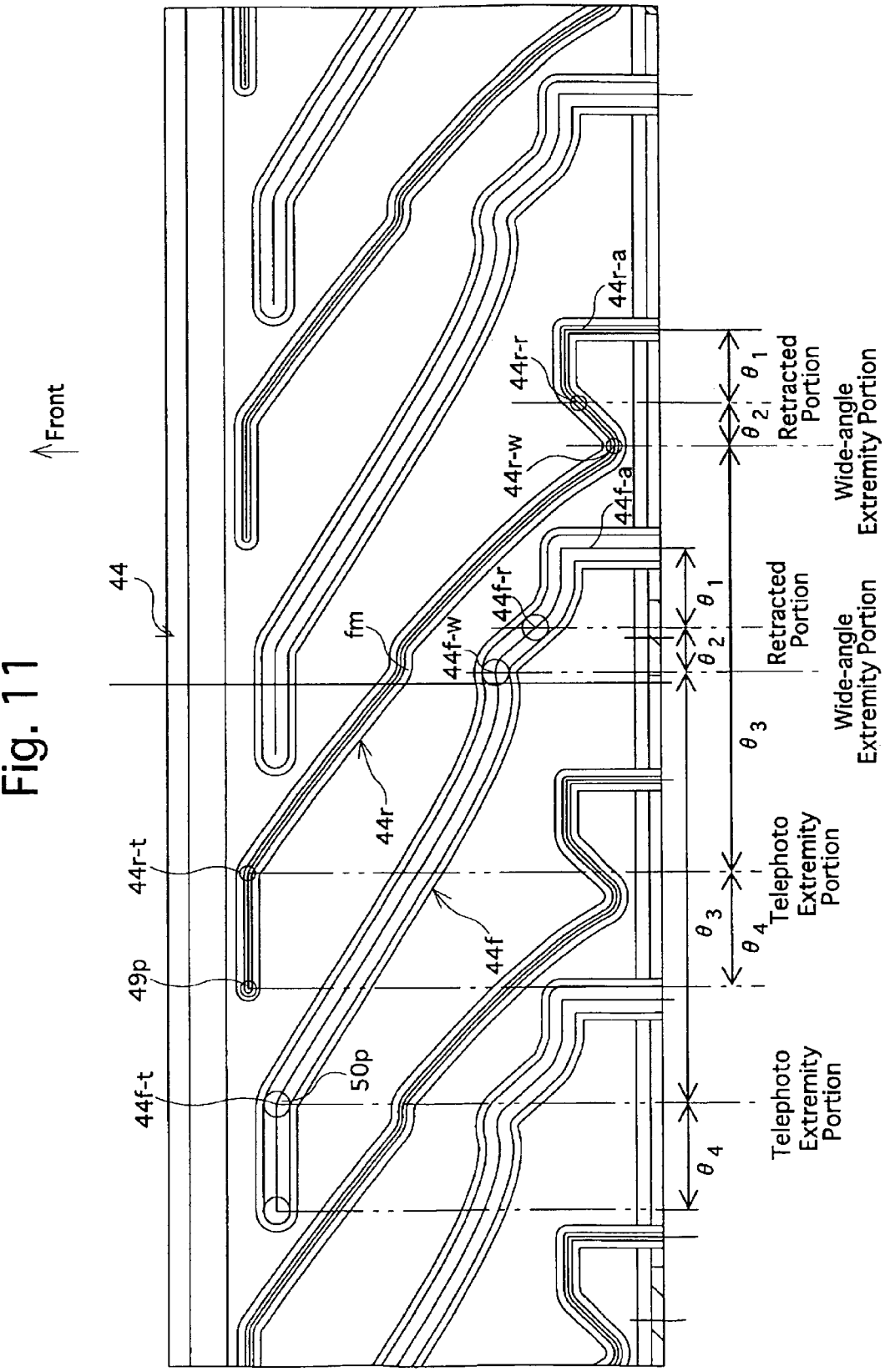
FIG. 11 is a developed view of an inner surface of a cam ring of the zoom lens barrel of FIG. 10 showing an exemplary arrangement of cam grooves.

Cam grooves 44*f* and 44*r* are formed on an inner surface of the cam ring 44. The cam grooves 44*f* and 44*r* receive the switching lens group frame 50 and second lens group frame 49, respectively. FIG. 11 shows an arrangement of the cam grooves 44*f* and 44*r* in a developed view. Three sets of the cam grooves 44*f* and 44*r* are formed circumferentially with each groove spaced at equi-angular distances from one another. Radial follower pins 50*p* and 49*p* are provided on the switching lens group frame 50 and the second lens group frame 49 to be received in the cam grooves 44*f* and 44*r*, respectively.

The cam grooves 44*f* and 44*r* include introducing portions 44*f-a* and 44*r-a* for the follower pins 50*p* and 49*p*, retracted portions 44*f-r* and 44*r-r* for the zoom lens system, wide-angle extremity portions 44*f-w* and 44*r-w*, and telephoto extremity portions 44*f-t* and 44*r-t*, respectively. A rotational angle $\theta_1$ is defined as the rotational angle from the introducing portions 44*f-a* and 44*r-a* to the retracted portions 44*f-r* and 44*r-r*, respectively. A rotational angle $\theta_2$ is defined as the rotational angle from the retracted portions 44*f-r* and 44*r-r* to the wide-angle extremity portions 44*f-w* and 44*r-w*, respectively. A rotational angle $\theta_3$ is defined as the rotational angle from the wide-angle extremity portions 44*f-w* and 44*r-w* to the telephoto extremity portions 44*f-t* and 44*r-t*, respectively. A rotational angle $\theta_4$, defined as the rotational angle beyond the telephoto extremity portions 44*f-t* and 44*r-t*, which serves as a rotational angle for assembly use. Each of the cam grooves 44*r* for the second lens group frame 49 has an intermediate discontinuous position fm that corresponds to the zoom path of the second variable lens group 20 as described in the embodiments in FIGS. 1, 8 and 9.

In contrast, no discontinuous position appears to exist in the cam grooves 44*f* for the first variable lens group 10 between the wide-angle extremity portion 44*f-w* and the telephoto extremity portion 44*f-t* since the change in shape (profile) of each cam groove 44*f* is smooth in this area. This is because, in this embodiment, the switching lens group frame 50 and the sub-lens group S2 are moved in such a manner that the positions of the sub-lens group S2 are not discontinuous in the short-focal-length zooming range Zw and in the long-focal-length zooming range Zt, the two ranges extending on both sides of intermediate focal length fm in FIG. 1. A connection line CC is schematically shown in FIG. 1. The connection line CC connects the zoom path of the short-focal-length zooming range Zw to zoom path of the long-focal-length zooming range Zt, the two ranges extending on both sides of the intermediate focal length fm. The cam groove 44*f* is shaped to correspond to the zoom path connected by the connection line CC. As the follower pin 50*p* moves along a section corresponding to the connection line CC, the sub-lens group S1 moves from the object-side movement extremity to the image-side movement extremity. It is necessary to control the zoom lens barrel so that the section of the cam groove 44*f* corresponding to the line CC is not used as an actual zooming range in a photographic operation (i.e., the cam ring 44 is not stopped). Alternatively, the cam grove 44*f* can include the discontinuous position similar to that of the cam groove 44*r*.

In the above-described zoom lens barrel, the cam ring 44 advances or retreats along the optical axis while rotating as the pinion 47 is rotated via the zooming motor 46 in either direction, which causes the switching lens group frame 50 (i.e., the first variable lens group 10) and the second lens group frame 49 (i.e., the second variable lens group 20), which are guided in the optical axis direction within the cam ring 44, to move in the optical axis direction along a predetermined path defined by the cam grooves 44*f* and 44*r*.

Figure 31:
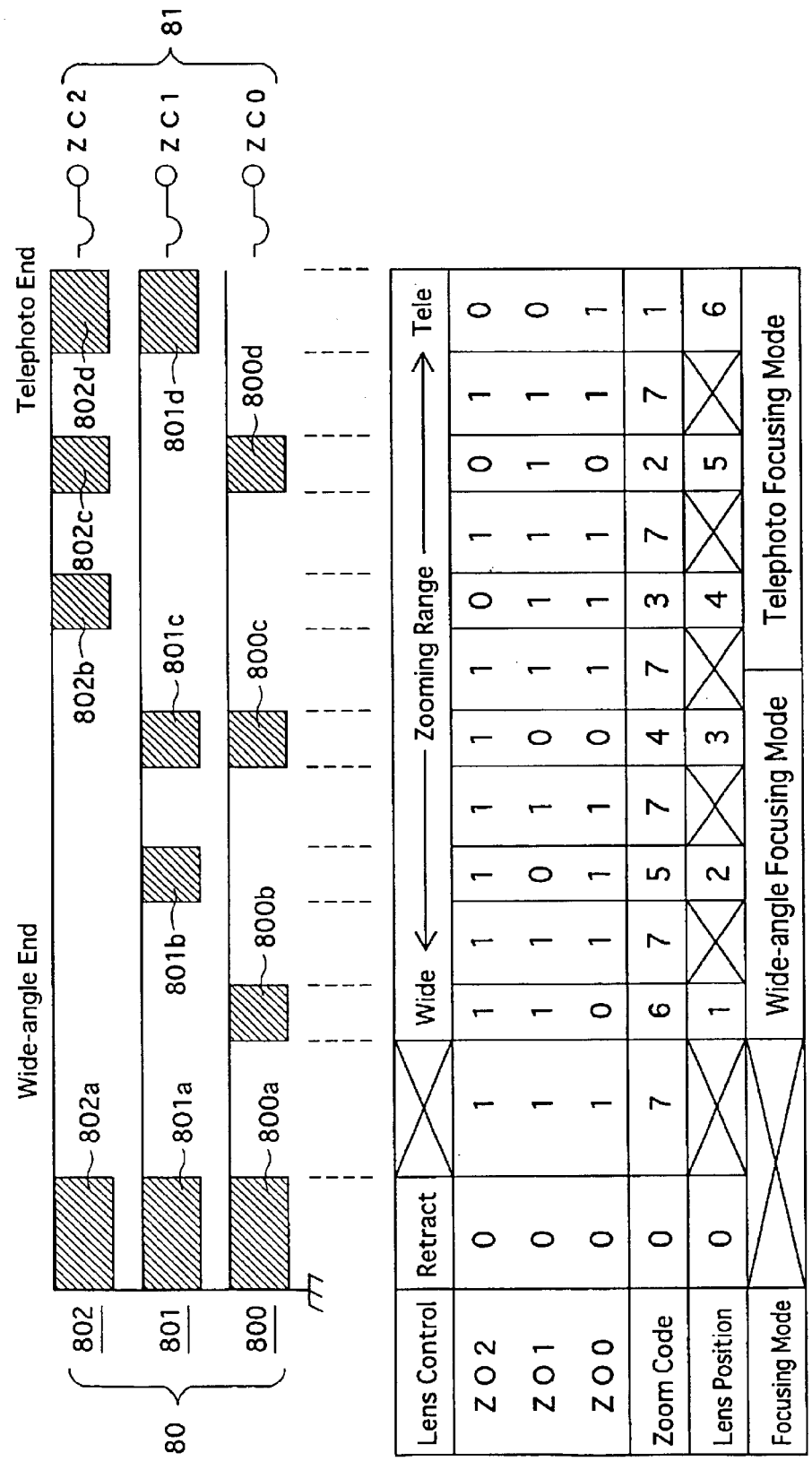
FIG. 31 is a explanatory view showing a layout of a code plate and a brush for detecting the lens position (the rotational position of the cam ring) illustrated in the zoom lens barrel shown in FIG. 10.

FIG. 31 shows an embodiment of a lens position code plate 80 and a brush 81 for detecting the position of the zoom lens and the focal length thereof according to the present invention. The lens position code plate 80 and the brush 81 are attached to the space between the linear guide ring 48 and the camera body 41 of a camera 100, whereby the rotational position of the cam ring 44 can be detected as an optical axis position of the linear guide ring 48 in the optical axis direction.

The lens position code plate 80 includes three bit codes 800, 801 and 802 provided in a predetermined combination layout of land portions 800*a* through 800*d* of the bit code 800, land portions 801*a* through 801*d* of the bit code 801, and 802*a* through 802*d* of the bit code 802, so that the rotational position of the cam ring 44, which is at a lens stop position, can be detected by the land portions 800*a* through

800d, 801a through 801d, and 802a through 802d. The illustrated embodiment is applied to a step zoom lens, wherein six different positions corresponding to respective focal lengths including a retracted position, a wide-angle extremity, and a telephoto extremity can be detected. The land portions 800a through 800d, 801a through 801d, and 802a through 802d are respectively formed on an elastic insulating material such as a flexible printed circuit and connected to ground.

The brush 81 is provided with three independent tips ZC0, ZC1 and ZC2, which can be in slidable contact with the respective corresponding codes 800, 801 and 802 of the lens position code plate 80. The electric potential of each of the tips ZC0, ZC1 and ZC2 is input in the input port of a CPU 66 via a zoom code output circuit 46c.

According to the illustrated embodiment, the rotational position of the cam ring 44 is detected by a zoom code and a lens position code. The zoom code includes a retracted position '0', a position '7' between the retracted position and the wide-angle extremity, a wide-angle extremity position '6', a telephoto extremity position '1', and intermediate positions '5', '4', '3' and '2' between the wide-angle extremity position '6' and the telephoto extremity position '1'. A plurality of positions '7' are also allotted at respective intervals of the intermediate positions '5', '4', '3' and '2'. However, the lens position code is determined so that the retracted position is lens position '0', the wide-angle extremity position is lens position '1', the telephoto extremity position is lens position '6', and the intermediate positions between the wide-angle extremity and the telephoto extremity are lens positions '2', '3', '4' and '5'.

A wide-angle focusing mode (a short focal length side zooming zone Zw) is determined as being from lens position 1 (i.e., the wide-angle extremity position '1') to lens position 3 (i.e., intermediate position '3'). Likewise, a telephoto focusing mode (a long focal length side zooming zone Zt) is determined as being from lens position 4 (i.e., intermediate position '4') to lens position 6 (i.e., the telephoto extremity position '6').

The lens position code plate 80 detects the rotational position of the cam groove 44f, corresponding to the connecting line CC of FIG. 1, as the zoom code 7, and the CPU 66 controls the cam ring 44 so as not stop in this section.

The illustrated embodiment shows an example of a zoom lens barrel which applies the movement operation as above discussed to the switching lens group frame 50 and the rear lens group frame 49. The characteristics of the illustrated embodiment concern the support structure as well as the drive mechanism of the first sub lens group S1 and the second sub lens group S2 with respect to the switching lens group frame 50. The specific structure inside the switching lens group frame 50 is described below with reference to FIGS. 12 through 30.

Figure 15:
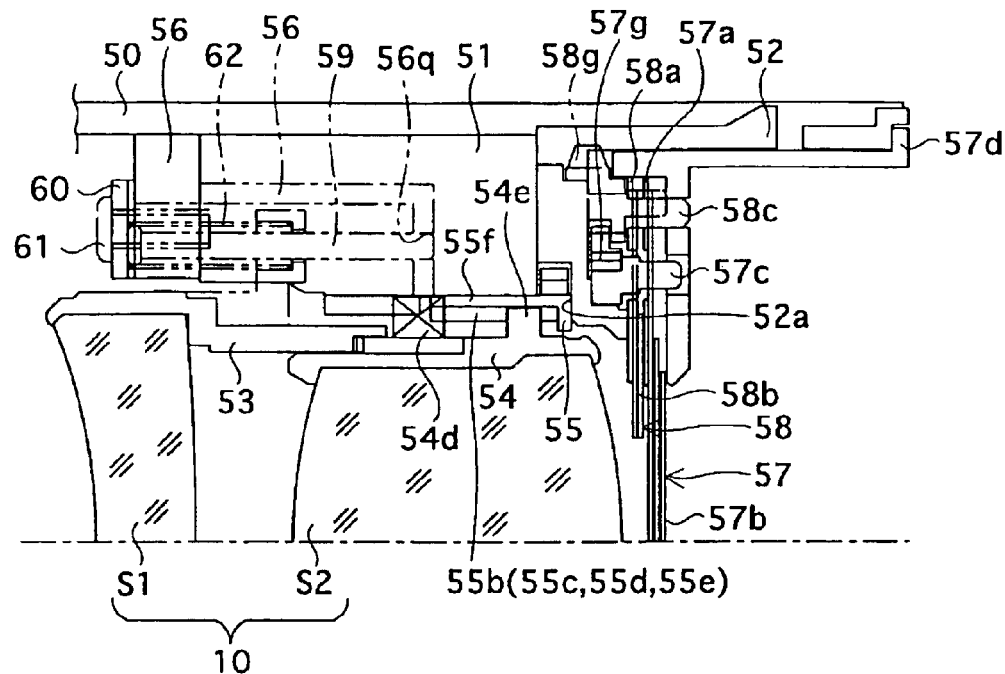
FIG. 15 is a cross-sectional view of an upper half of the switching lens group in which a first sub-lens group and a second sub-lens group are in a mutually distant position at the wide-angle extremity.
Figure 16:
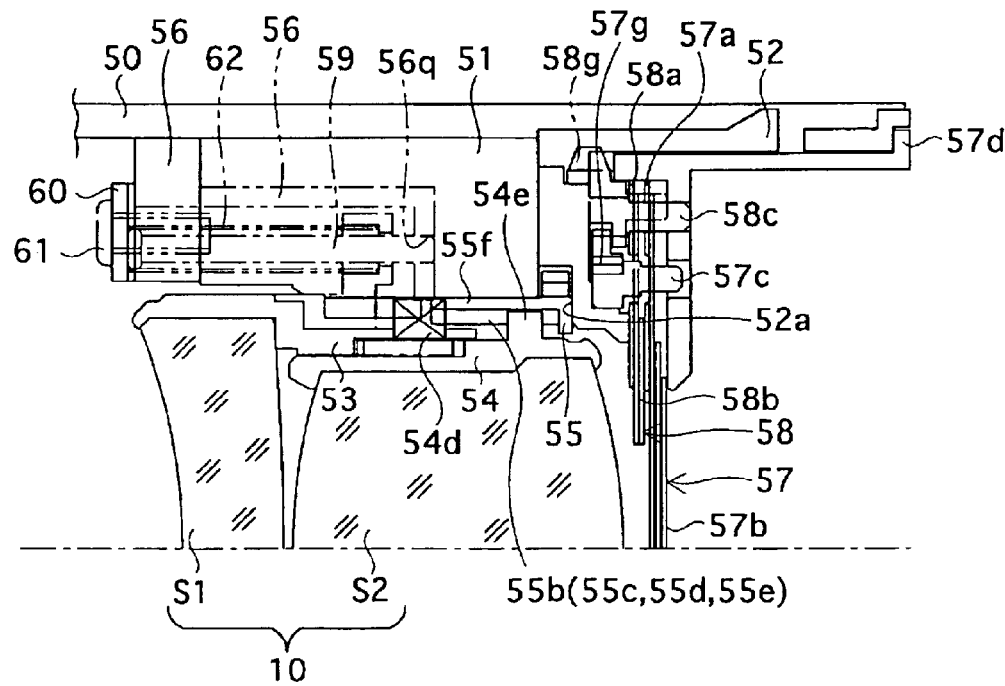
FIG. 16 is a cross-sectional view of an upper half of the switching lens group in which the first sub-lens group and the second sub-lens group are in a mutually close position at the telephoto extremity.

As shown in FIGS. 15 and 16, a front shutter retaining ring 51, a rear shutter retaining ring 52, a first sub-lens group frame 53, a second sub-lens group frame 54, an actuator ring 55, and a gear holding ring 56 are arranged within the switching lens group frame 50. The front shutter retaining ring 51, the rear shutter retaining ring 52, and the gear holding ring 56 form a portion of the switching lens group frame 50. The first sub-lens group S1 is fixed to the first sub-lens group frame 53, and the second sub-lens group S2 is fixed to the second sub-lens group frame 54. The first sub-lens group frame 53, the second sub-lens group frame 54, and the actuator ring 55 are movably fitted in a central opening 51p (see FIG. 12) of the front shutter retaining ring

51. These movable members, i.e., the first sub-lens group frame 53, the second sub-lens group frame 54, and the actuator ring 55, enable the first sub-lens group S1 and the second sub-lens group S2 to be at a mutually close position, or be at a mutually distant position, with respect to the optical axis direction, and also enable the first sub-lens group S1 and the second sub-lens group S2 to perform focusing.

Figure 12:
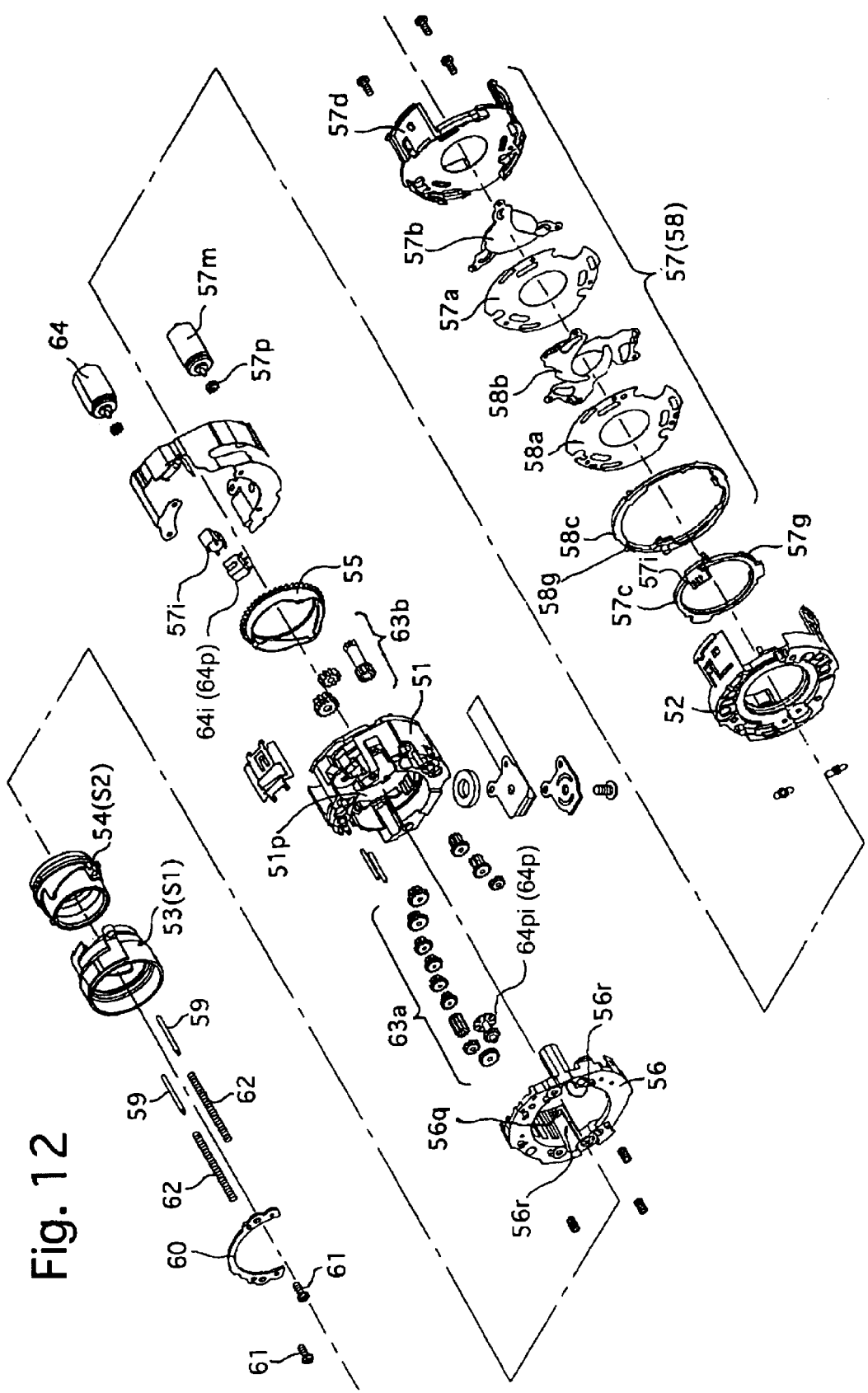
FIG. 12 is an exploded perspective view showing components of a switching lens group frame of the zoom lens barrel.
Figure 13:
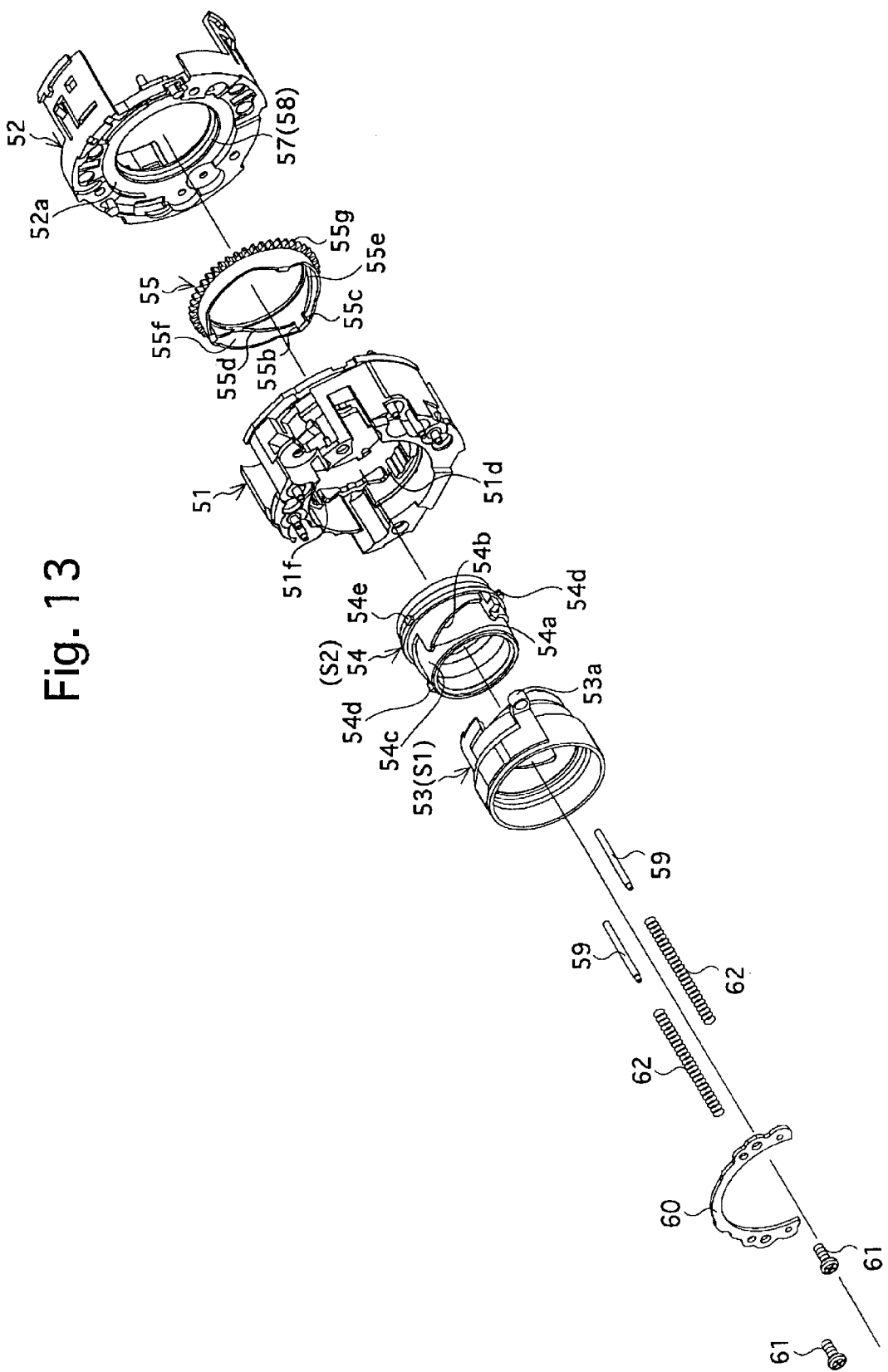
FIG. 13 is an exploded perspective view showing some of the components of the switching lens group frame of the zoom lens barrel.
Figure 14:
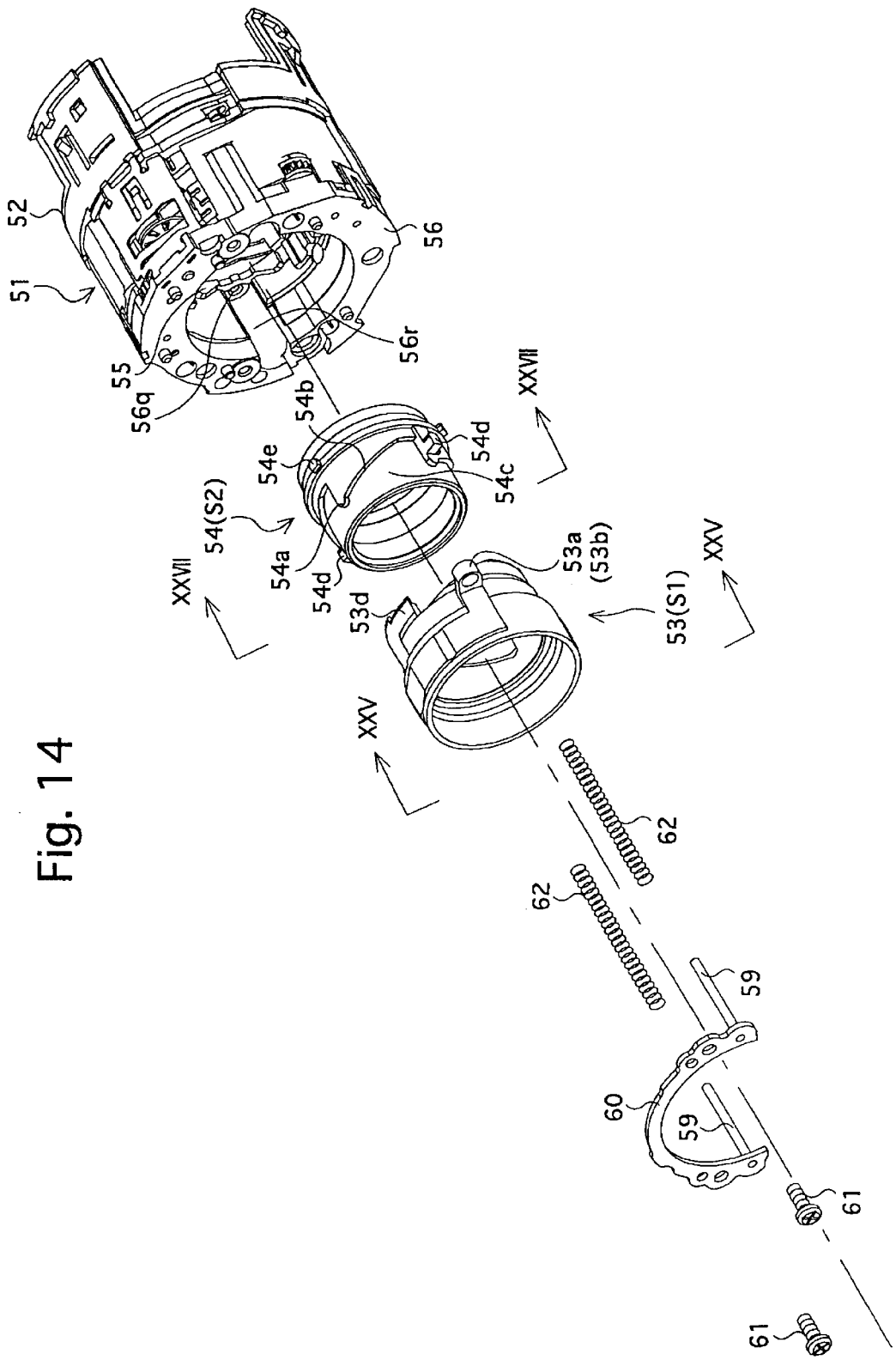
FIG. 14 is a perspective view showing a different assembly of some of the components of the switching lens group frame of the zoom lens barrel.

The actuator ring 55 is rotatably supported between the front and rear shutter retaining rings 51 and 52 with the rearmost portion of the actuator ring 55 being restricted by a receiving surface 52a (FIGS. 13, 15, and 16) of the rear shutter retaining ring 52. The actuator ring 55 is a driving member that enables the first sub-lens group S1 and the second sub-lens group S2 to become mutually close or mutually distant from each other, and enables the first and the second sub-lens groups S1 and S2 to perform focusing via the rotation thereof. The gear holding ring 56 is fixed to the front end of the front shutter retaining ring 51, and a lens shutter mechanism 57 and a diaphragm mechanism 58 are supported by the rear shutter retaining ring 52 (FIGS. 12, 15, and 16).

The first sub-lens group frame 53 has a cylindrical shape and has two linear guide ribs 53a on its periphery at the opposite sides thereof at an equi-angular interval of 180 degrees. A guide bore 53b is formed in the guide rib 53a. A guide rod 59 is loosely inserted (or moveably fitted) in the guide bore 53b. The rear end of the guide rod 59 is fixed in a fixing bore 56q formed at the rearmost portion of the gear holding ring 56 while the front end of the guide rod 59 is fixed to the front surface of the gear holding ring 56 by a bracket 60 and a screw 61. A coil spring 62 is placed over each of the guide rod 59 between the bracket 60 and the guide rib 53a so that the coil spring 62 biases the first sub-lens group frame 53 toward the second sub-lens group frame 54. AU-shaped recess 56r is provided on the gear holding ring 56 so as to receive the guide rod 59 and the spring 62 (FIGS. 25 through 27). The recess 56r communicatively connects with the central opening 51p of the front shutter retaining ring 51. The first sub-lens group frame 53 can be connected to the front shutter retaining ring 51 by engaging the guide ribs 53a with the guide rods 59 of the front shutter retaining ring 51 at two positions, wherein the guide ribs 53a are provided on the first sub-lens group frame 53 at 180° intervals about the optical axis.

Figure 23:
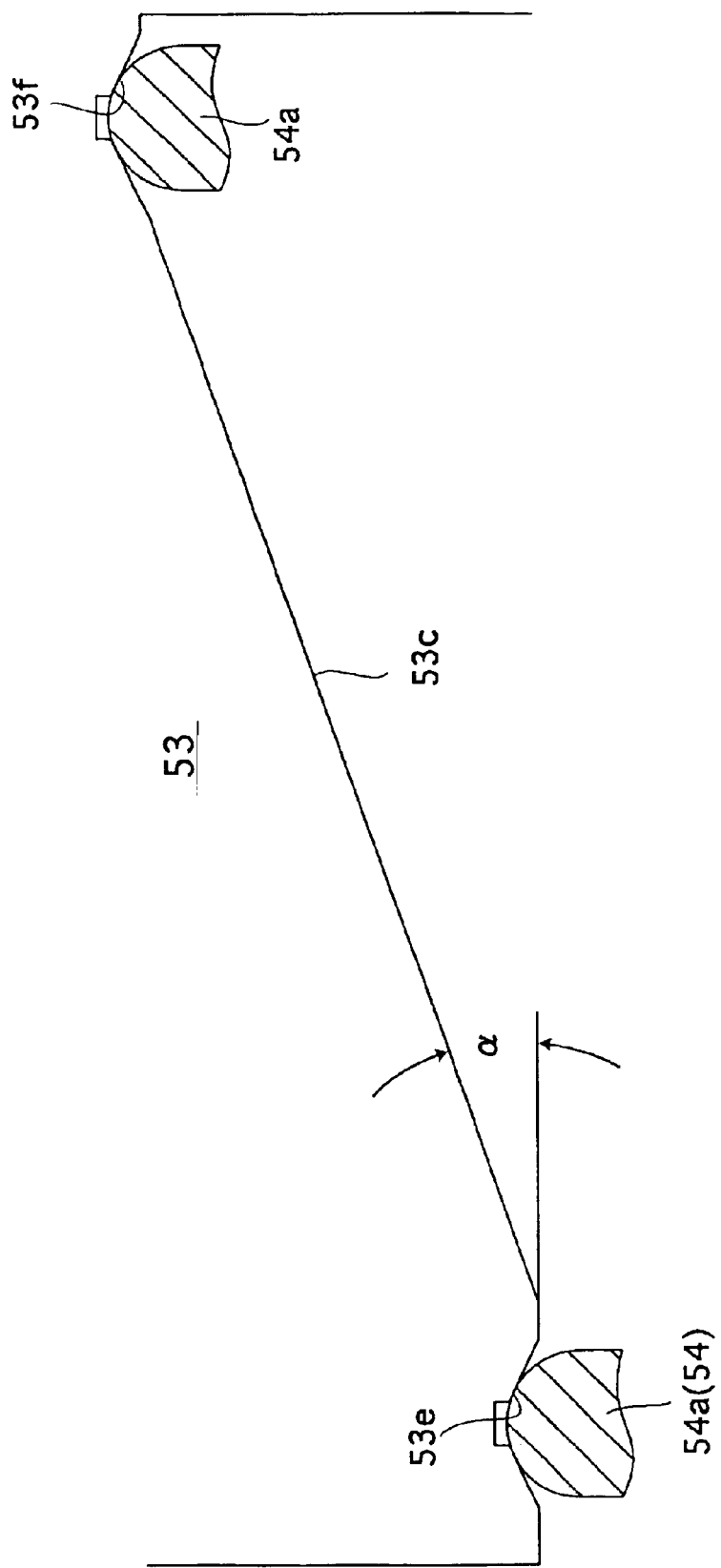
FIG. 23 is an enlarged expanded view showing a face cam of a first sub-lens group frame.

As shown in FIGS. 17A, 18A, 19A and 20A, the first sub-lens group frame 53 is provided with four shift leading surfaces (shift cam surfaces) 53c that are formed circumferentially at equi-angular intervals on the end-face of the first sub-lens group frame 53. Annular light-blocking support ribs 53d (see FIG. 14) are provided radially outside of the shift leading surfaces 53c over the open ends of the shift leading surfaces 53c. FIG. 23 shows an enlarged expanded view of one of the shift leading surfaces 53c which is formed essentially as a straight slope having an inclination angle α with respect to a circumferential edge of the first sub-lens group 53 (i.e., with respect to a plane normal to the optical axis), and is provided with a pair of follower engaging recesses 53e and 53f on either end of the shift leading surface 53c. Each of the engaging recesses 53e and 53f is formed as a shallow V-shaped recess. The follower engaging recess 53e defines a mutually distant position on the wide-angle side and the follower engaging recess 53f defines a mutually close position on the telephoto side, of the first sub-lens group frame 53 and the second sub-lens group frame 54 (i.e., the first sub-lens group S1 and second sub-lens group S2).

As shown in FIGS. 17A, 18A, 19A and 20A, the second sub-lens group frame 54 is provided on its periphery with four follower projections 54a, each corresponding to each of the four shift leading surfaces 53c of the first sub-lens group frame 53. An inclined surface 54b is provided so as to correspond to the shift leading surface 53c of the first sub-lens group frame 53, and the follower projection 54a is provided on the end of the inclined surface 54b which is the closest to the shift leading surface 53c. The tip of the follower projection 54a has a substantially semi-circular shape which is symmetrical with respect to the longitudinal axis thereof, so that the shapes of the engaging recesses 53e and 53f correspond to the tip shape of the projection 54a. Annular light-blocking support ribs 54c are radially provided on the second sub-lens group frame 54 inside the projections 54a and the inclined surfaces 54b. The shift leading surfaces 53c formed on the first sub-lens group frame 53 and the follower projections 54a formed on the second sub-lens group frame 54 together form a shift cam mechanism (of a lens group shift mechanism) that enables the lens-group frames 53 and 54 either be at a mutually close position, or be at a mutually distant position. As described above, the four shift leading surfaces 53c of the first sub-lens group frame 53 and the four projections 54a of the second sub-lens group frame 54 are spaced at equi-angular intervals. Accordingly, each of the surfaces can engage with its respective projection at 180° intervals of a relative rotation. Given that N is the number of the shift leading surfaces 53c or the follower projections 54a (four, in this embodiment) and that M is the number of the guide ribs 53a of the first sub-lens group frame 53 or the number of the guide rods 59 of the front shutter retaining ring 51 (two, in this embodiment), the relationship between M and N is that M is a multiple of N, or in other words, N is a divisor of M. This relationship makes it possible to select an assembly position from among different assembly positions, so that for example, an assembly position that provides optimum optical performance can be achieved.

Figure 24:
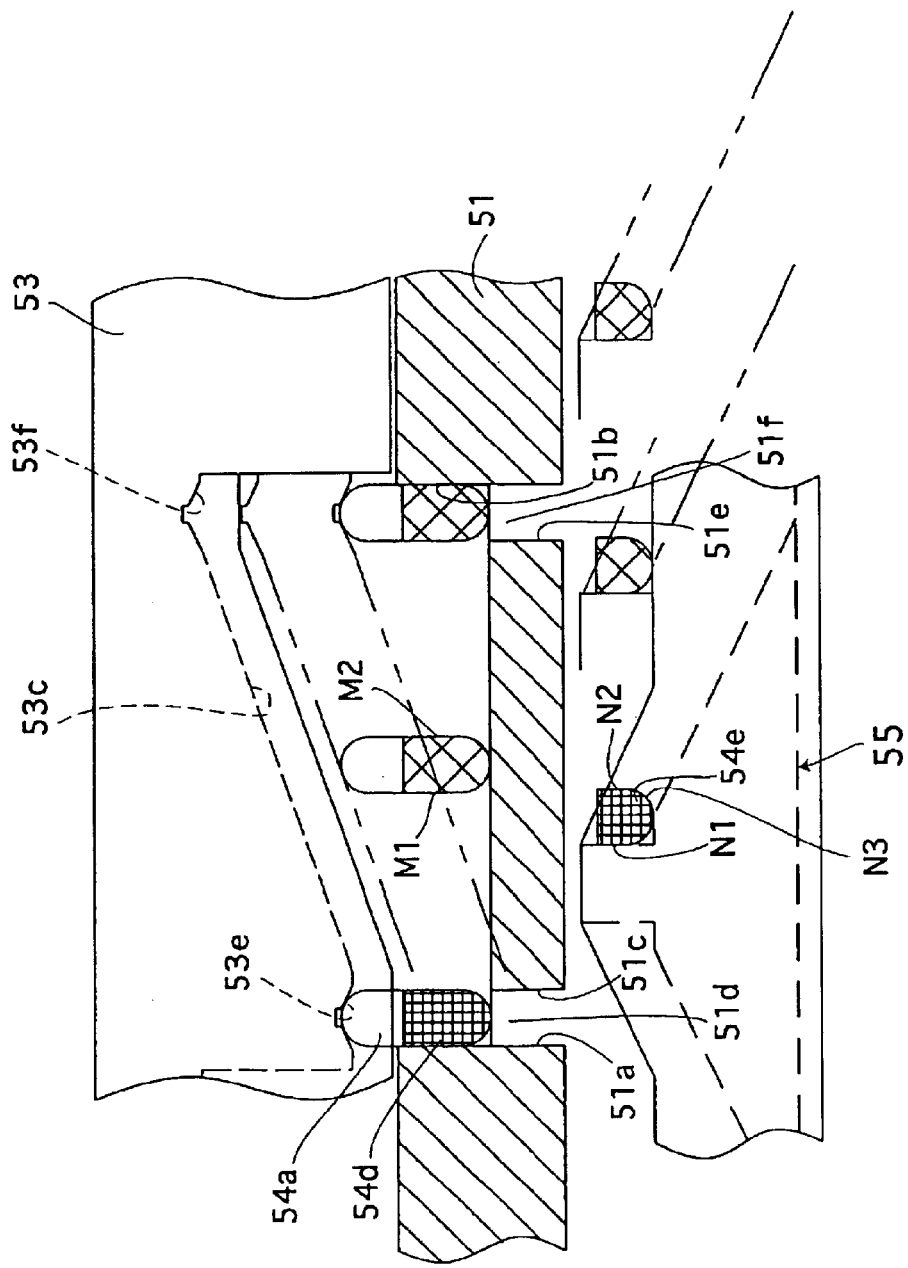
FIG. 24 is an enlarged developed view showing the relationship of the first sub-lens group frame, the second sub-lens group frame, and the actuator ring with respect to a front shutter retaining ring.

Furthermore, a pair of linear guide projections 54d are formed on the second sub-lens group frame 54 on the outer surface thereof. The guide projections 54d are formed at the same circumferential positions as two of the four follower projections 54a that are positioned on the periphery of the second sub-lens group frame 54 at the opposite sides thereof at an equi-angular interval of 180 degrees. Each of the guide projections 54d is formed at a position which is rearward with respect to the follower projection 54a in the optical axis direction. Also formed on the second sub-lens group frame 54 on the outer surface thereof are three lugs 54e, which are spaced at equi-angular intervals, and are positioned rearward with respect to the guide projection 54d in the optical axis direction. As best shown in FIG. 24, each lug 54e has a pair of contact surfaces N1 and N2 that are spaced apart from each other in a circumferential direction. Each lug 54e also has a smooth circular shaped end surface N3 that is symmetrical with respect to the central axis of the lug 54e extending in the middle of the contact surfaces N1 and N2.

As shown in FIG. 24, a pair of rotation preventing surfaces 51a and 51b are formed on the front shutter retaining ring 51 on the inner surface thereof, in order to define the range of rotation of the second sub-lens group frame 54 relative to the non-rotating front shutter retaining ring 51, with respect to the guide projection 54d of the second sub-lens group frame 54. The rotation preventing surfaces 51a and 51b come into contact with contact surfaces M1 and M2 of the guide projection 54d, respectively, when the second sub-lens group frame 54 is rotated in either direction, thereby defining the rotational movement extremities of the second sub-lens group frame 54. A wide-angle linear guide slot (guide portion) 51d is defined between the rotation preventing surface 51a and a guide surface 51c which comes into contact with the contact surface M2 of the guide projection 54d. A telephoto linear guide slot (guide portion) 51f is defined between the rotation preventing surface 51b and a guide surface 51e which comes into contact with the contact surface M1 of the guide projection 54d. Thus, the width of both of the wide-angle linear guide slot 51d and the telephoto linear guide slot 51f in the circumferential direction corresponds to that of the linear guide projection 54d in the same direction. Accordingly, the guide projection 54d snugly fit in the guide slots 51d and 51f so as to movable therein.

The clearance between the wide-angle linear guide slot 51d or the telephoto linear guide slot 51f and the guide projection 54d is determined smaller (stricter) than the clearance between the guide bore 53b of the first sub-lens group frame 53 and the guide rod 59. The linear guide projections 54d are provided on the periphery of the second sub-lens group frame 54 on opposite sides thereof at an equi-angular interval of 180 degrees. A pair of the wide-angle and telephoto linear guide slots 51d and 51f are provided on the front shutter retaining ring 51 so that two linear guide projections 54d can be selectively received in the wide-angle and telephoto linear guide slots 51d and 51f with respect to the rotational positions thereof (i.e., at an angular interval of 180 degrees).

Figure 22:
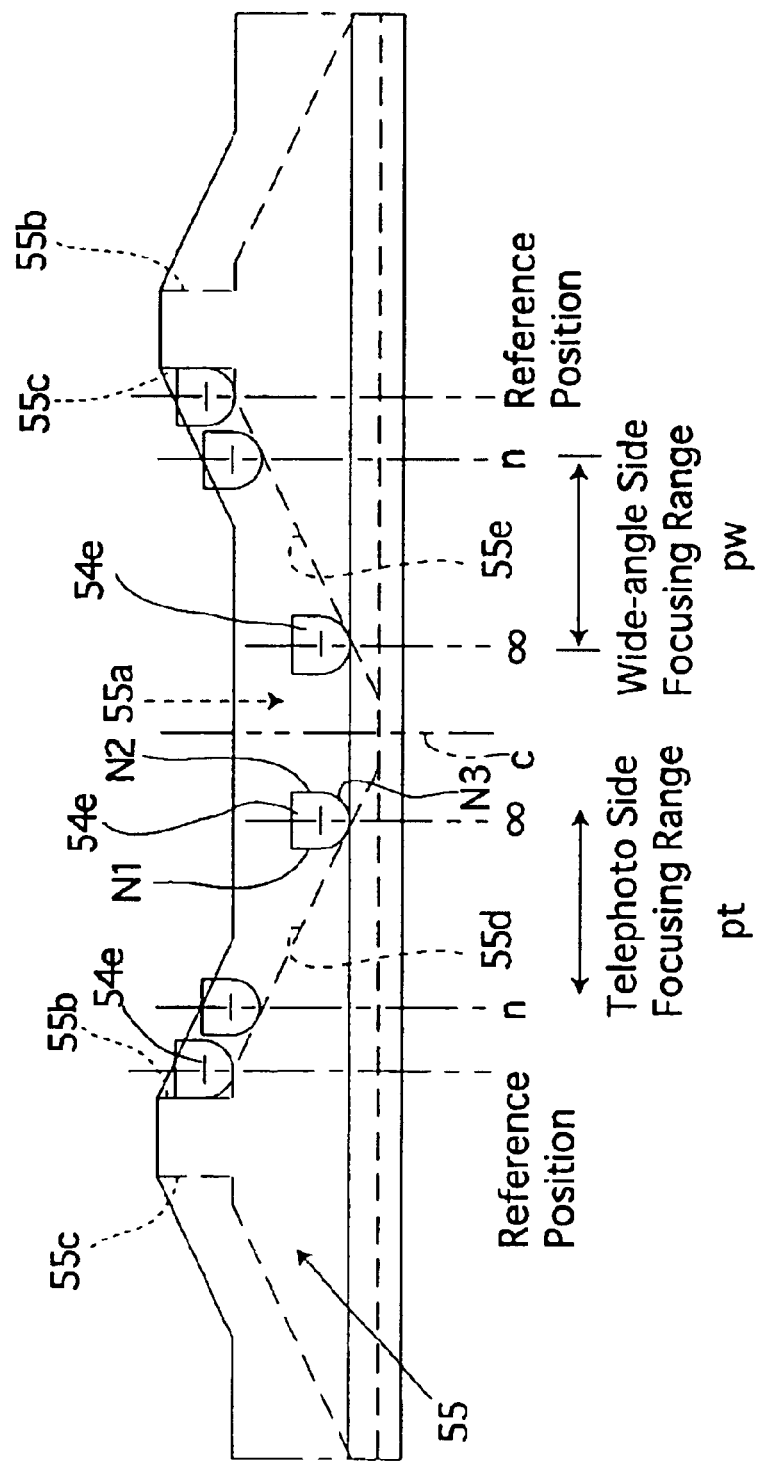
FIG. 22 illustrates how focusing is carried out by the actuator ring.

The actuator ring 55 has, on the front end surface thereof, three control recesses 55a that each correspond to each of the lugs 54e of the second sub-lens group frame 54 (see FIG. 22). Each of the control recesses 55a has a shape that is symmetrical with respect to the central axis extending parallel to the optical axis and includes a pair of effective surfaces (engagement portions) 55b and 55c that respectively come into contact with contact surfaces N1 and N2. The lugs 54e of the second sub-lens group frame 54 and the control recesses 55a constitute a focusing cam mechanism of a focusing mechanism. The control recess 55a also includes a pair of focus leading surfaces 55d and 55e (focus cam surfaces) on the telephoto side and on the wide-angle side, respectively. The focus leading surfaces 55d and 55e each come into contact with the circular end surface N3 of the lug 54e. The telephoto-side focus leading surface 55d and the wide-angle-side focus leading surface 55e are provided between the effective surfaces 55b and 55c in the form of an end-faced cam having an open front end. The slopes of the leading surfaces 55d and 55e have opposite directions with respect to the circumferential direction thereof, but have the same absolute value, i.e., the slopes both incline forwards in the optical axis direction. Annular light-blocking support ribs 55f (see FIG. 13) are provided radially outside, and over the front portion, of the control recess 55a of the actuator ring 55. The focus leading surfaces 55d and 55e, together with the lug 54e provided on the second sub-lens group frame 54, form a focus cam mechanism. As described above, the three lugs 54e of the second sub-lens group frame 54 and the three control recesses 55a of the actuator ring 55 are spaced at equi-angular intervals. In the illustrated embodiment, each of the lugs can engage with a respective recess at 120° angular intervals.

The aforementioned coil springs 62, which bias the first sub-lens group frame 53 rearward, so that the shift leading surfaces 53c contact the follower projections 54a, and the lugs 54e of the second sub-lens group frame 54 contact the telephoto side or wide-angle side focus leading surfaces 55d or 55e of the actuator ring 55. As described above, the rear end surface of the actuator ring 55 abuts the receiving surface 52a of the rear shutter retaining ring 52. Accordingly, the first sub-lens group frame 53, the second sub-lens group frame 54, the actuator ring 55, and the rear shutter retaining ring 52 (receiving surface 52a) can be held in contact by the sole force exerted by the coil springs 62. As can be clearly seen from FIGS. 15 and 16, when the first sub-lens group frame 53, the second sub-lens group frame 54, the actuator ring 55, and the rear shutter retaining ring 52 are in engagement with each other, the front end of the second sub-lens group frame 54 is positioned inside the first sub-lens group frame 53, and the actuator ring 55 is situated on the periphery of the second sub-lens group frame 54.

Figure 21:
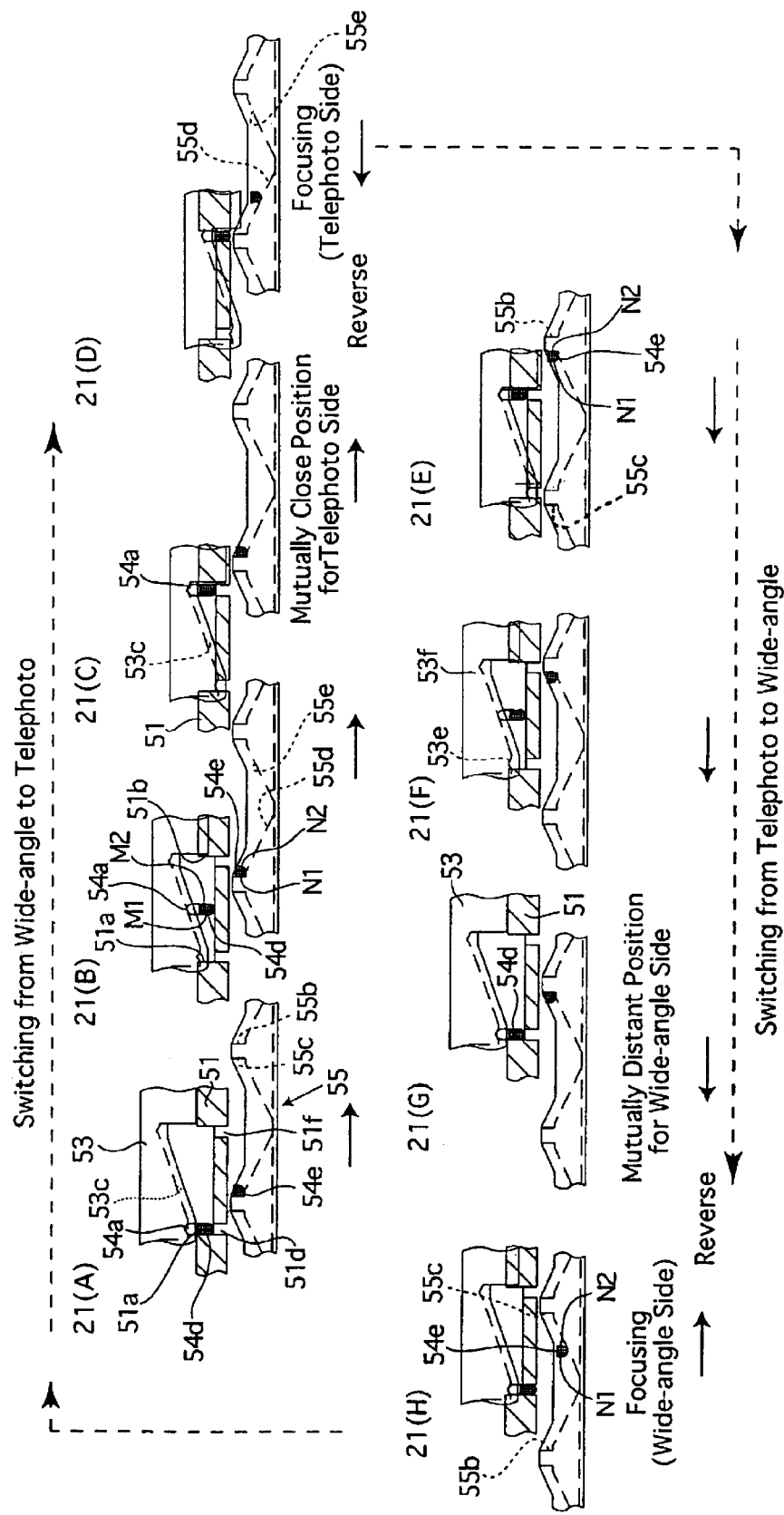
FIG. 21 is an exploded view illustrating how the mutually close position of the first sub-lens group and the second sub-lens group on the telephoto side switches to/from the mutually distant position on the wide-angle side via the rotation of an actuator ring.

FIG. 21(A through H) shows the manner in which the first sub-lens group frame 53 and the second sub-lens group frame 54 (i.e., the first sub-lens group S1 and the second sub-lens group S2) are moved via the effective surfaces 55b and 55c between a mutually close position on the telephoto side and a mutually distant position on the wide-angle side. Note that, solid line arrows represent the rotational direction of the actuator ring 55, in FIG. 21.

The arrangement shown in FIG. 21(A) is the mutually distant position on the wide-angle side, in which the effective surface 55b of the actuator ring 55 abuts the lug 54e, and the linear guide projection 54d of the second sub-lens group frame 54 is disengaged from the wide-angle linear guide slot 51d. As the actuator ring 55 rotates in a clockwise direction (i.e., moves to the right in FIG. 21), the effective surface 55b biases the contact surface N1 of the lug 54e to rotate the second sub-lens group frame 54 clockwise (to the right in FIG. 21) until the linear guide projection 54d abuts the rotation preventing surface 51b (FIGS. 21(A) through 21(C)). During the rotation of the actuator ring 55 and the second sub-lens group frame 54, the first sub-lens group frame 53 (i.e., the first sub-lens group S1) follows the shift leading surface 53c, and the follower projection 54a of the second sub-lens group frame 54 so that the first sub-lens group frame 53 linearly moves closer to the second sub-lens group frame 54 (i.e., the second sub-lens group S1) (FIG. 21(B)). Ultimately, the follower projection 54a engages with the follower engaging recess 53f and rearward movement of the first sub-lens group frame 53 with respect to the second sub-lens group frame 54 in the optical axis direction is stopped (FIG. 21(C)). Since the follower projections 54a and the follower engaging recesses 53f are spaced at equi-angular intervals therebetween, eccentricity between the first sub-lens group frame 53 and the second sub-lens group frame 54 is prevented, with all of the projections and the recesses in engagement. This completes the switching from the mutually distant position on the wide-angle side to the mutually close position on the telephoto side, resulting in the first sub-lens group S1 being in a mutually close position with respect to the second sub-lens group S2(i.e., mutually close extremity). Note that the actuator ring 55 cannot rotate further in this direction.

Upon completion of switching to the mutually close position on the telephoto side, the rotation of the actuator ring 55 is reversed. The lug 54e (i.e., the second sub-lens group frame 54) moves rearward following the telephoto side focus leading surface 55d until the linear guide projection 54d engages with the telephoto linear guide slot 51f. This allows the linear projection 54d to move only in the optical axis direction (FIG. 21(D)). Focusing is carried out on the telephoto side from the intermediate focal length to the long focal length extremity, with the second sub-lens group frame 54 and the first sub-lens group 53 being moved integrally at the mutually close position via the telephoto side-focus leading surface 55d.

Once the actuator ring 55 is rotated until the effective surface 55c abuts the contact surface N2 of the lug 54e, the linear guide projection 54d of the second sub-lens group frame 54 disengages from the telephoto linear guide slot 51f (FIG. 21(E)).

At this point, the rotation of the actuator ring 55 has been reversed (upon or after completion of the switching to the mutually close position on the telephoto side). As the actuator ring 55 rotates counterclockwise (i.e., moves to the left in FIG. 21), the effective surface 55c biases the contact surface N2 of the lug 54e to rotate the second sub-lens group frame 54 leftward until the contact surface M1 of the linear guide projection 54d abuts the rotation preventing surface 51a (FIGS. 21(F) and 21(G)). During the rotation of the actuator ring 55 and the second sub-lens group frame 54, the first sub-lens group frame 53 follows the shift leading surface 53c and the follower projection 54a of the second sub-lens group frame 54 so that the first sub-lens group frame 53 linearly moves away from the second sub-lens group frame 54. Ultimately, the follower projection 54a engages with the follower engaging recess 53e and forward movement of the first sub-lens group frame 53 with respect to the second sub-lens group frame 54 in the optical axis direction is stopped (FIG. 21(G)). Since the follower projections 54a and the follower engaging recesses 53f are spaced at equi-angular intervals therebetween, eccentricity between the first sub-lens group frame 53 and the second sub-lens group frame 54 is prevented, with all of the projections and the recesses in engagement. This completes the switching from the mutually close position on the telephoto side to the mutually distant position on the wide-angle side, resulting in the first sub-lens group 51 being in a mutually distant position with respect to the second sub-lens group S2 (i.e., mutually distant extremity). Note that the actuator ring 55 cannot rotate further in this direction.

Upon completion of switching to the mutually distant position on the wide-angle side, the rotation of the actuator ring 55 is reversed. The lug 54e (i.e., the second sub-lens group frame 54) moves rearward following the wide-angle side focus leading surface 55e until the linear guide projection 54d engages with the wide-angle linear guide slot 51d. This allows the linear projection 54d to move only along the direction of the optical axis (FIGS. 21(G) and 21(H)) Focusing is carried out on the wide-angle side from the intermediate focal length to the short focal length extremity, with the second sub-lens group frame 54 and the first sub-lens group frame 53 being moved integrally at the mutually distant extremity via the wide-angle side focus leading surface 55e.

Once the actuator ring 55 is rotated until the effective surface 55c abuts the contact surface N1 of the lug 54e, the linear guide projection 54d of the second sub-lens group frame 54 disengages from the wide-angle linear guide slot 51d, and the positions of the first sub-lens group frame 53 and the second sub-lens group frame 54 return back to the position shown at FIG. 21(A).

FIG. 22 shows the principle of how the focusing is carried out via the telephoto side-focus leading surface 55d and the wide-angle side-focus leading surface 55e. As the actuator ring 55 is rotated in a telephoto side focusing range pt (from an infinite photographic distance ∞ to a minimum photographic distance (object at a minimum distance) n), with the circular end surface N3 of the lug 54e in contact with the telephoto side focus leading surface 55d, the second sub-lens group frame 54 (whose rotation is confined by the linear guide projection 54d which is in engagement with the telephoto linear guide slot 51f) and the first sub-lens group frame 53 (i.e., the first sub-lens group S1 and the second sub-lens group S2) integrally moves forwardly or rearwardly along the optical axis to thereby carry out focusing. Similarly, as the actuator ring 55 is rotated in a wide-angle side focusing range pw (from an infinite photographic distance ∞ to a minimum photographic distance (object at a minimum distance) n), with the circular end surface N3 of the lug 54e in contact with the wide-angle side focus leading surface 55e, the second sub-lens group frame 54 (whose rotation is confined by the linear guide projection 54d which is in engagement with the wide-angle linear guide slot 51d) and the first sub-lens group frame 53 (i.e., the first sub-lens group S1 and the second sub-lens group S2) integrally moves forwardly or rearwardly along the optical axis to provide focusing.

In particular, focusing on the telephoto side and focusing on the wide-angle side are achieved by controlling the number of pulses counted by a encoder 64p (see FIGS. 12 and 30, encoder 64p including photo interrupter 64i and slit disc 64pi) provided in a driving system which drives the actuator ring with respect to a reference position at which the linear guide projection 54d of the second sub-lens group frame 54 comes into contact with the rotation preventing surface 51a or 51b (i.e., the position where the rotation of the actuator ring 55 is reversed). For example, the number of pulses of the driving system required to move the focusing lens groups (i.e., the sub-lens groups S1 and S2) from a reference position to a position corresponding to a minimum photographic distance n, to a position corresponding to an infinite photographic distance ∞, and to a position corresponding to an intermediate photographic distance can be predetermined by taking the leading angles for the focus leading surfaces 55d and 55e into consideration. Accordingly, focusing can be properly carried out in accordance with the object distance information by managing the number of the pulses of the encoder 64p. The pulses output from the encoder 64p are input to the CPU 66 via a focus pulse output circuit 64e. Also, in the illustrated embodiment, the slopes of the telephoto side focus leading surface 55d and the wide-angle side focus leading surface 55e of the actuator ring 55 have opposite directions with respect to the circumferential direction thereof, but have the same absolute value, i.e., the slopes both incline forwards in the optical axis direction, and the lug 54e is shaped to be symmetrical with respect to the central axis extending in the middle of the contact surfaces N1 and N2 which are circumferentially spaced apart from each other. Accordingly, focusing can be carried out on the telephoto side in the same manner as on the wide-angle side. This facilitates focusing control.

Figure 17A:
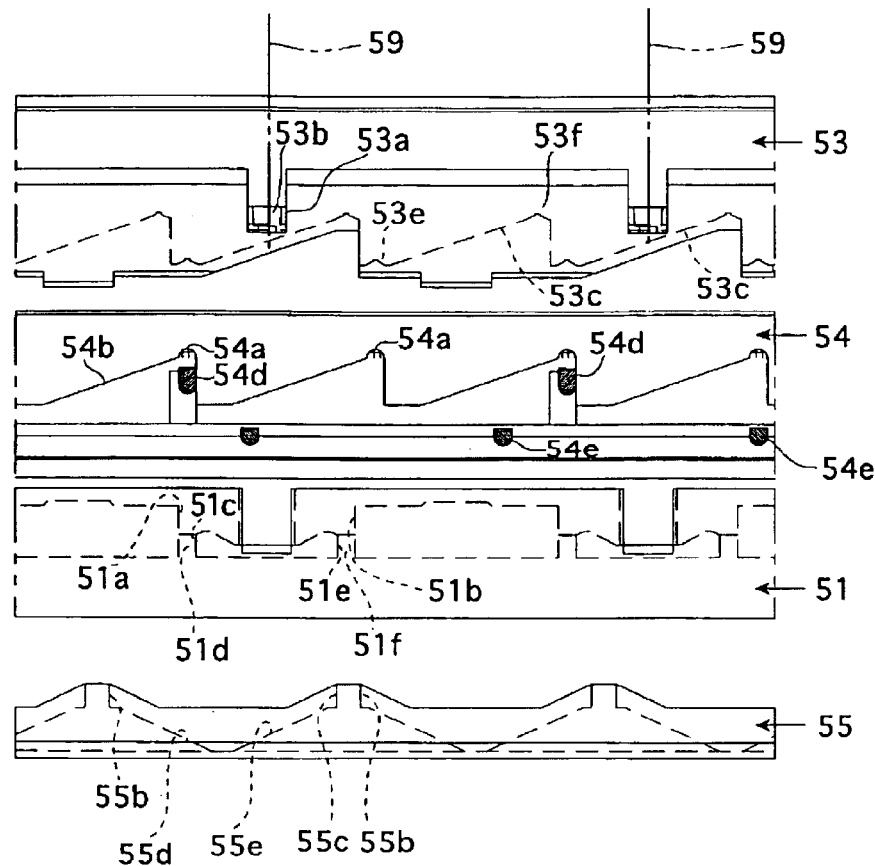
FIG. 17A is an exploded view in which components are exploded in the optical axis direction, wherein the first sub-lens group and the second sub-lens group are in the mutually distant position at the wide-angle side and are focused on an object at infinity.
Figure 17B:
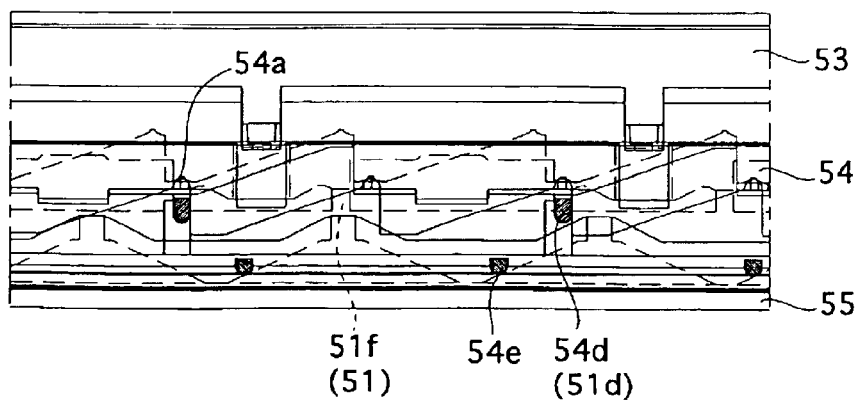
FIG. 17B is a developed view showing the components of FIG. 17A in actual engagement.
Figure 18A:
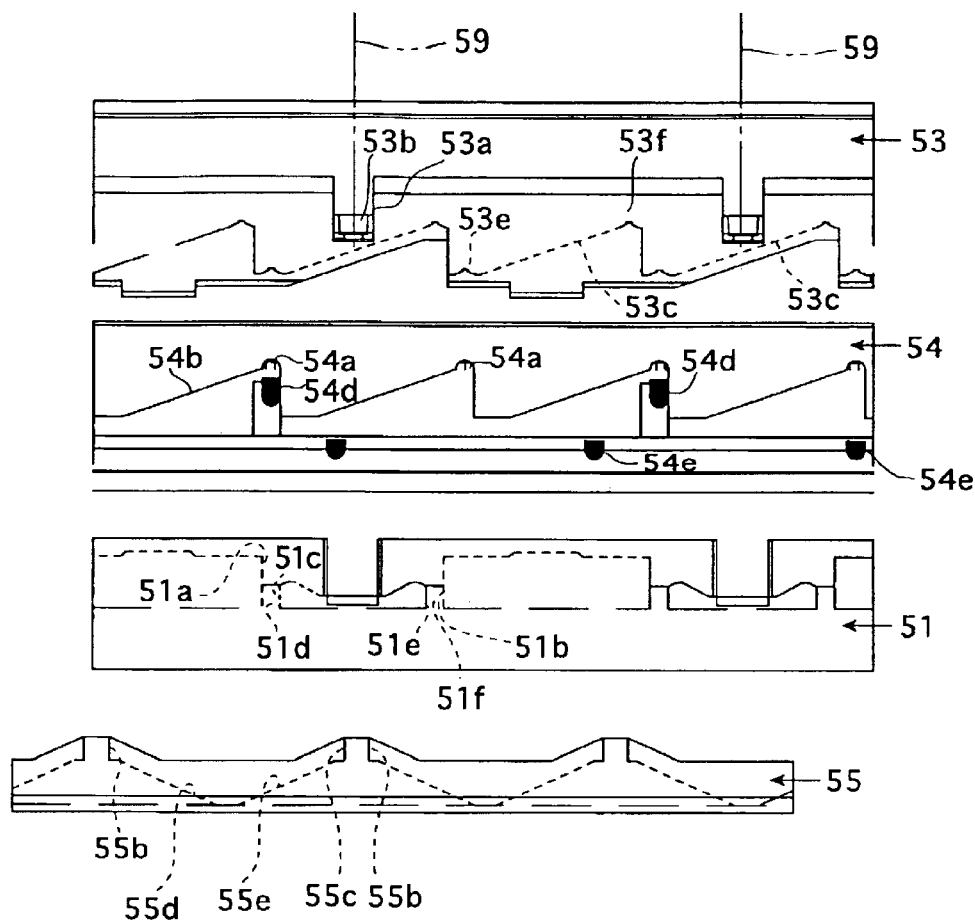
FIG. 18A is an exploded view in which components are exploded in the optical axis direction, wherein the first sub-lens group and the second sub-lens group are in the mutually distant position at the wide-angle side and are focused on an object at a minimum distance.
Figure 18B:
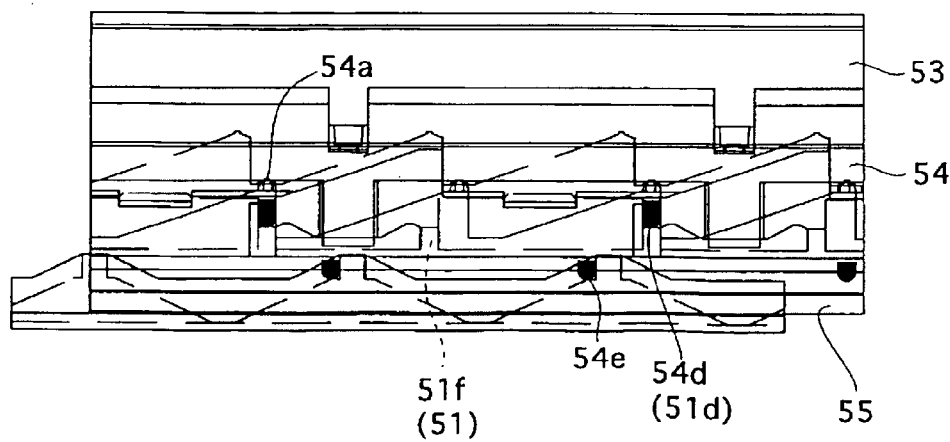
FIG. 18B is a developed view showing the components of FIG. 18A in actual engagement.
Figure 19A:
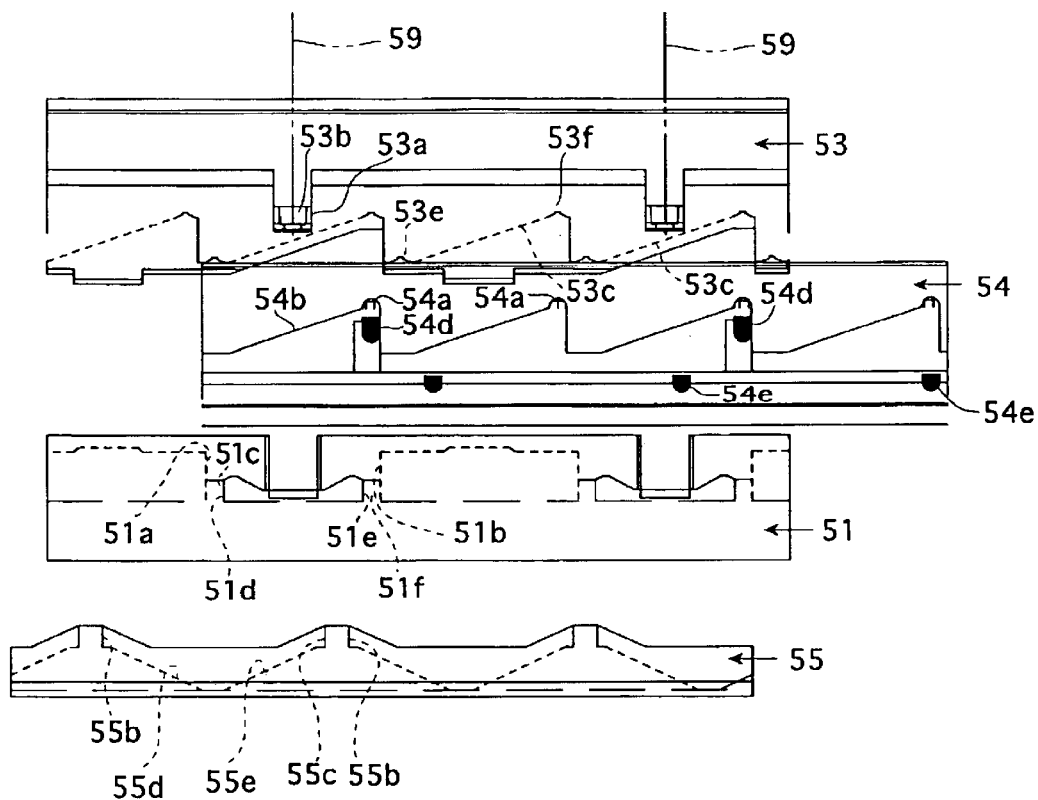
FIG. 19A is an exploded view in which components are exploded in the optical axis direction, wherein the first sub-lens group and the second sub-lens group are in the mutually close position at the telephoto side and are focused on an object at infinity.
Figure 19B:
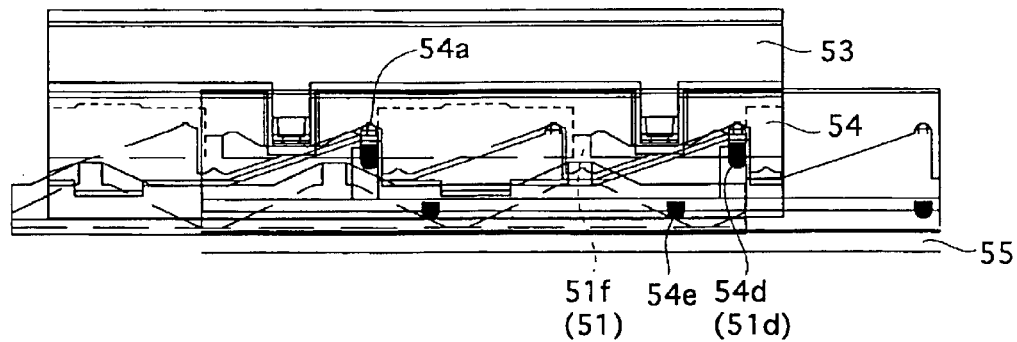
FIG. 19B is a developed view showing the components of FIG. 19A in actual engagement.
Figure 20A:
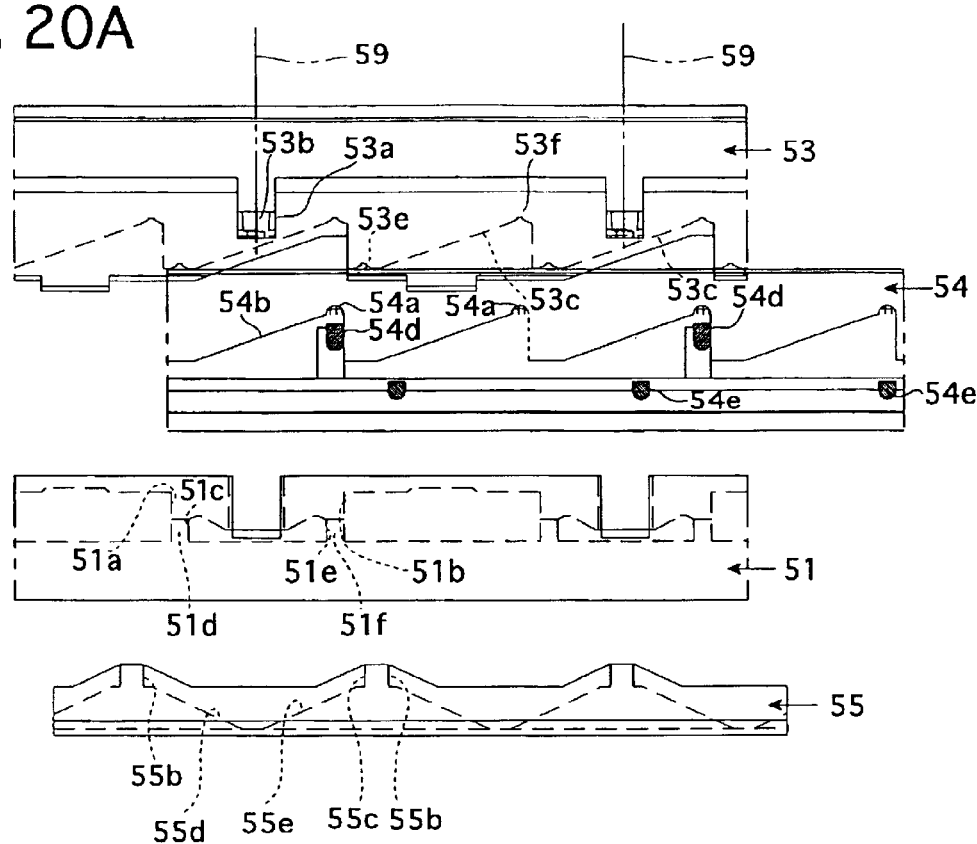
FIG. 20A is an exploded view in which components are exploded in the optical axis direction, wherein the first sub-lens group and the second sub-lens group are in the mutually close position at the telephoto side and are focused on an object at a minimum distance.
Figure 20B:
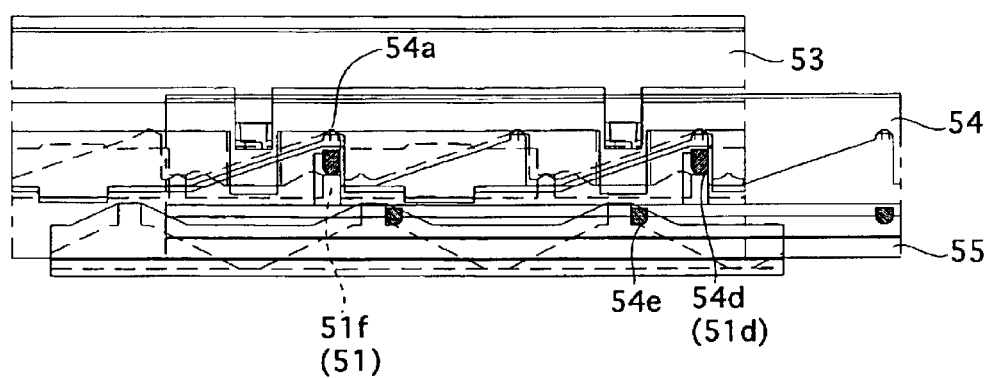
FIG. 20B is a developed view showing the components of FIG. 20A in actual engagement.

FIGS. 17A and 17B show an arrangement of the first sub-lens group frame 53, the second sub-lens group frame 54, the actuator ring 55, and the front shutter retaining ring 51 when the first sub-lens group frame 53 (i.e., the first sub-lens group S1) and the second sub-lens group frame 54 (i.e., the second sub-lens group S2) are in the mutually distant position at the wide-angle side, and are in a position so as to focus on an object at infinity. FIGS. 18A and 18B show an arrangement of the first sub-lens group frame 53, the second sub-lens group frame 54, the actuator ring 55, and the front shutter retaining ring 51 when the first sub-lens group frame 53 and the second sub-lens group frame 54 are in the mutually distant position on the wide-angle side, and are in a position so as to focus on an object at a minimum distance. FIGS. 19A and 19B show an arrangement of the first sub-lens group frame 53, the second sub-lens group frame 54, the actuator ring 55, and the front shutter retaining ring 51 when the first sub-lens group frame 53 and the second sub-lens group frame 54 are in the mutually close position on the telephoto side, and are in a position so as to focus on an object at infinity. FIGS. 20A and 20B show an arrangement of the first sub-lens group frame 53, the second sub-lens group frame 54, the actuator ring 55, and the front shutter retaining ring 51 when the first sub-lens group frame 53 and the second sub-lens group frame 54 are in the mutually close position on the telephoto side, and are in a position so as to focus on an object at a minimum distance. The first sub-lens group frame 53, the second sub-lens group frame 54, the actuator ring 55, and the front shutter retaining ring 51 are shown separated in the optical axis direction in FIGS. 17A, 18A, 19A and 20A, and are shown in operation in FIGS. 17B, 18B, 19B and 20B.

Figure 29:
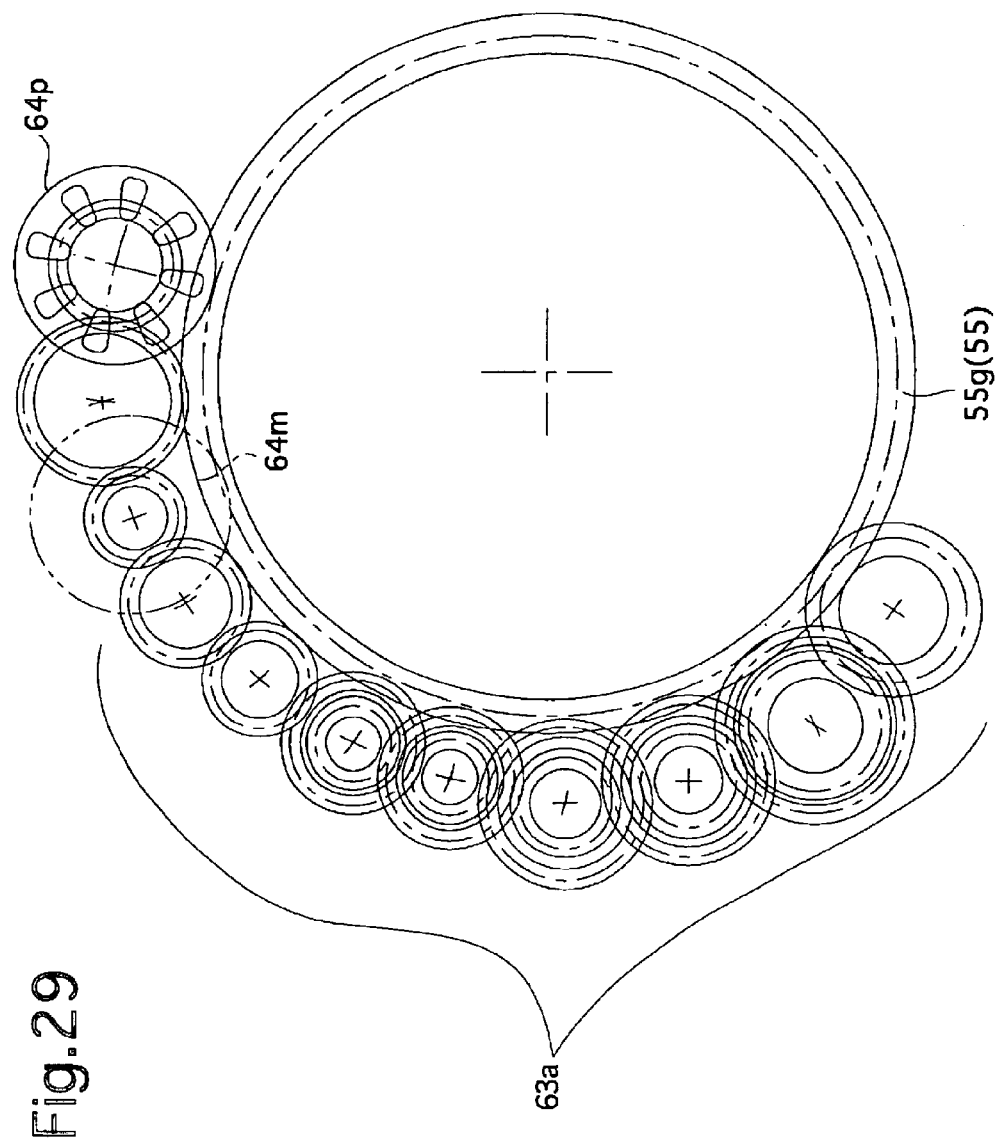
FIG. 29 is a front view showing an arrangement of reduction gears of a driving system of the actuator ring, the reduction gears being retained between the front shutter retaining ring and the gear holding ring.
Figure 30:
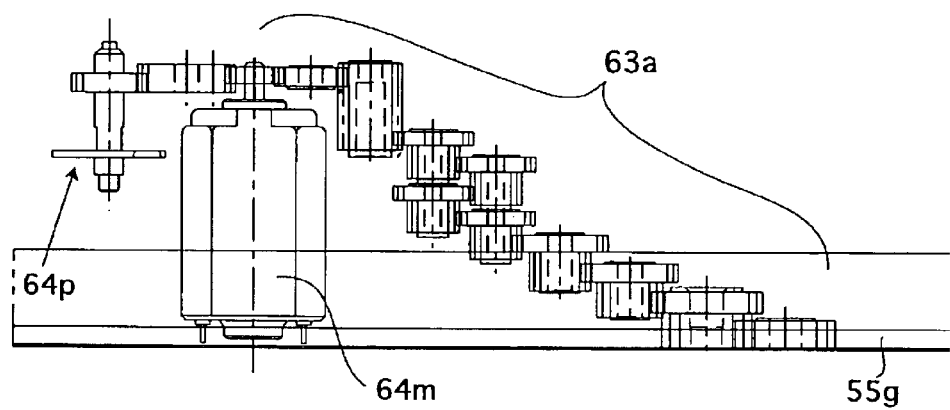
FIG. 30 is a developed plan view of FIG. 29.

Gear teeth 55g are formed over a circumference on the rear-end periphery of the actuator ring 55. As shown in FIGS. 12, 29 and 30, the gear teeth 55g engage with a series of reduction gears 63a. The series of reduction gears 63a are rotated in either direction by a focusing motor (bi-directional motor) 64m which also includes the encoder 64p. The series of reduction gears 63a are held between the front shutter retaining ring 51 and the gear holding ring 56, and the focusing motor 64m is held by the rear shutter retaining ring 52. The gear teeth 55g of the actuator ring 55, which are formed over the entire periphery thereof, makes it easy for the three control recesses 55a to engage with the three lugs 54e of the second sub-lens group frame 54 at different relative rotational positions that are separated by 120°.

The lens shutter mechanism 57 and the diaphragm mechanism 58 are mounted on the rear shutter retaining ring 52. In particular, as shown in FIGS. 12, 15 and 16, the lens shutter mechanism 57 includes a shutter sector support plate 57a, three shutter sectors 57b, and a shutter drive ring 57c for opening and closing the shutter sectors 57b. The diaphragm mechanism 58 includes a diaphragm sector support plate 58a, three diaphragm sectors 58b, and a diaphragm drive ring 58c for opening and closing the diaphragm sectors 58b. These components are retained in the rear shutter retaining ring 52 by a sector holding ring 57d. The shutter sector 57b and the diaphragm sector 58b include a pair of dowels. One of the dowels is rotatably supported by the support plates 57a and 58a and the other is rotatably fitted to the drive rings 57c and 58c. The lens shutter mechanism 57 opens and closes an aperture formed by the shutter sectors 57b as the shutter drive ring 57c is rotated. The diaphragm mechanism 58 varies the size of an aperture formed by the diaphragm sectors 58b as the diaphragm drive ring 58c is rotated.

Sector gear teeth 57g are formed on a part of the periphery of the shutter drive ring 57c and engage with a series of reduction gears 63b that are sequentially arranged from a shutter drive motor 57m (see FIG. 12). When the shutter drive motor 57m is rotated in either direction, the aperture, which has been closed by the shutter sectors 57b, is momentarily opened and is then closed again. In the zoom lens barrel of the illustrated embodiment, the shutter sectors 57b serve both as a variable diaphragm to provide an aperture of an arbitrary size, and as a shutter. The shutter sectors 57b are electrically controlled so that the size of the aperture of the shutter sectors 57b (aperture value) and the length of time during which the aperture is left opened (i.e., shutter speed) can be varied depending on the exposure, upon the release of the shutter. Furthermore, the diaphragm drive ring 58c includes a lug 58g on the periphery thereof. The lug 58g engages with a diaphragm-controlling cam slot 48s formed on an inner surface of the linear guide ring 48 (see FIG. 10). Upon zooming, the linear guide ring 48 and the rear shutter retaining ring 52 (i.e., the diaphragm drive ring 58c) moves relative to each another in the optical axis direction. This causes the lug 58g to follow the diaphragm-controlling cam slot 48s so as to move in the circumferential direction. This in turn causes the diaphragm drive ring 58c to rotate and, as a result, the size of the aperture formed by the diaphragm sectors 58b is varied. The diaphragm sector 58b is provided to restrict the maximum value of the aperture diameter especially in the wide-angle side photographing range, and the degree of opening of the aperture is mechanically varied in accordance with the amount of extension of the zoom lens barrel.

The rotational angle of the shutter drive ring 57c corresponds to the position of a slit plate 57s formed on the shutter drive ring 57c, and the movement of the slit plate 57s is then detected by a photo interrupter 57i as a variation of output value, which is then output as the shutter pulse from a shutter pulse output circuit 57e to the CPU 66. A shutter drive motor 57m is driven in the forward and reverse directions by the CPU 66 via a shutter drive circuit 57d. The shutter speed is controlled by the shutter pulse output from the shutter pulse output circuit 57e (see FIG. 32) and according to the switch time between the forward and reverse rotations of the shutter drive.

A diaphragm drive ring 58c is driven in association with the forward and rearward movement of the zoom lens barrel, whereby the opening and closing operations of a diaphragm sectors 58b are performed. The diaphragm sectors 58b are automatically opened and closed in association with the change in the lens position of the zoom lens, which is driven by a zoom motor 46m, in order to prevent the zoom lens performance on the wide-angle side from being deteriorated.

Figure 32:
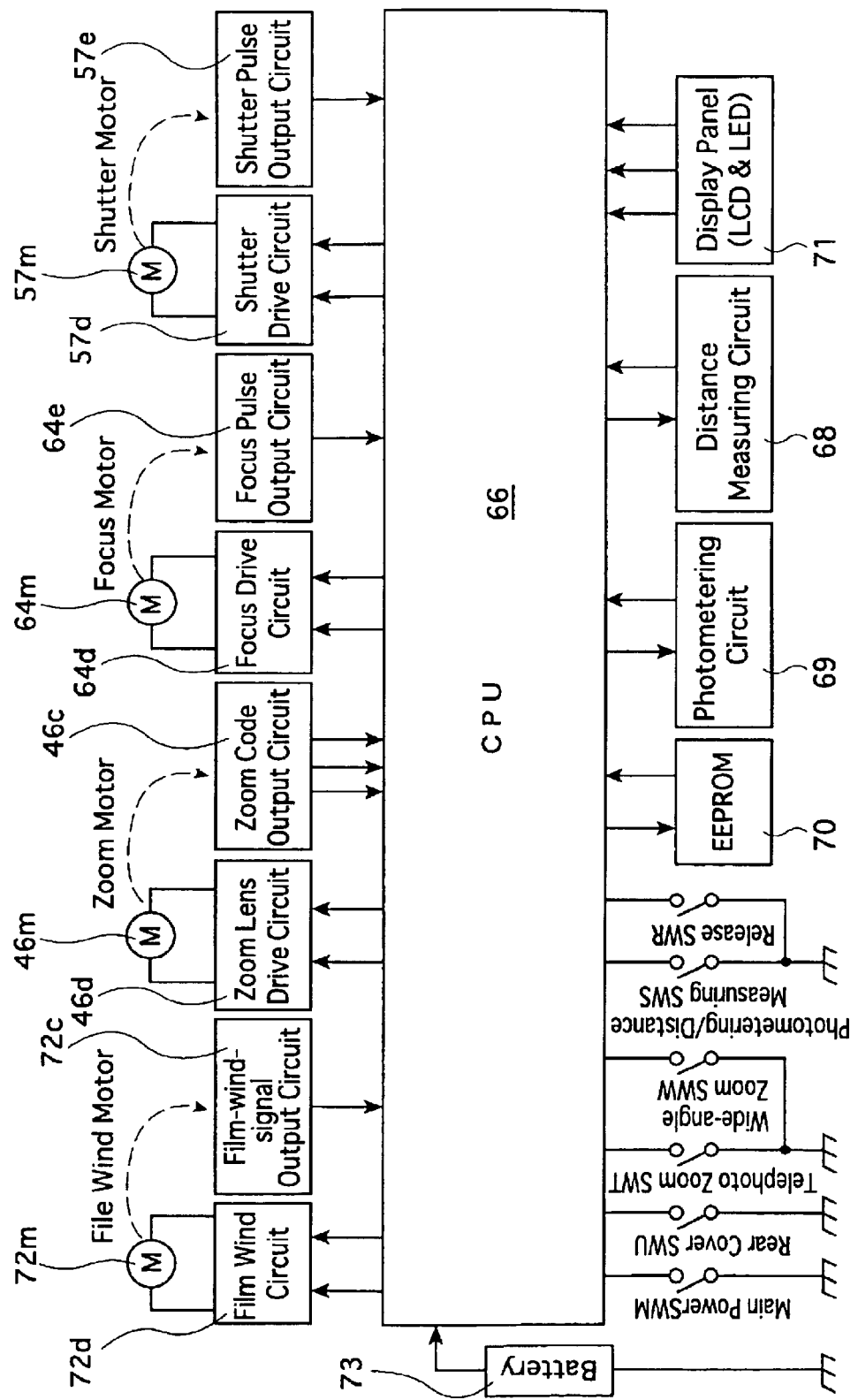
FIG. 32 is a block diagram showing a control system construction of a lens drive control apparatus incorporated in the camera having the zoom lens barrel with the switching lens group shown in FIG. 10.

The CPU 66 controls the zoom motor 46m of the cam ring 44, the focusing motor 64m of the drive ring (sub lens group drive device) 55, and a shutter drive motor 57m of the lens shutter mechanism 57, as shown in the block diagram of FIG. 32 as an embodiment of the elements of the control system according to the lens drive control apparatus of the present invention. According to the illustrated embodiment shown in FIG. 32, although a variable diaphragm mechanism 58 is electrically driven in association with the forward and rearward movements of the zoom lens barrel, it is also possible to provide another type of variable diaphragm mechanism in which the diaphragm drive ring 58c is manually rotated by hand. It is also possible to provide a much simpler system in which the variable diaphragm mechanism 58 is excluded so that the exposure control is performed only by the lens shutter mechanism 57.

As shown in FIG. 32, the zoom motor 46m, the focusing motor 64m and the shutter drive motor 57m are controlled based on the focal length information input via a zoom code output circuit 46c, the object brightness information obtained via a photometering circuit (photometering device) 69, and the photographing distance information obtained via a distance measuring circuit (distance measuring device) 68, so that the photographing (exposure) may be performed in the optimum exposure condition according to the measured focal length.

The CPU 66 is electrically connected to switches, operated by an operator, including a photometering/distance measuring switch SWS, a release switch SWR, a telephoto zoom switch SWT, a wide-angle zoom switch SWW, a main power switch SWM and a rear cover switch SWU. The rear cover switch SWU detects the open/close state of a rear cover of the camera body (not shown). Upon a battery 73 being installed in the camera body, the CPU 66 is actuated and carries out a predetermined initializing process and several switch checks intermittently, then waits for the state of any switch being turned ON. An EEPROM 70 stores various parameters necessary for photographing such as focusing modes I, II and III (each of which will be described in detail) selected by the operator.

Display panels 71 are provided inside and outside of the camera body, which indicate the focal length information corresponding to the zoom code input via the zoom code output circuit 46c, or the film frame number, etc.

The control system of FIG. 32 is also provided with a film wind motor 72m which is used for loading, winding and rewinding a film (not shown), driven via a film wind circuit 72d. The film wind amount is controlled by the CPU 66 based on the output from a film-wind-signal output circuit 72c provided with a pulse encoder in order to detect the winding state of the film.

It is sufficient to complete the switching lens group setting and focusing of the zoom lens barrel (photographic optical system) having the above discussed switching lens group (first variable lens group 10), immediately before the shutter release operation. Thus, according to the illustrated embodiment, the focusing mode which is switched between the telephoto focusing mode and the wide-angle focusing mode can be selected from among the focusing mode I (performed upon completion of zooming), the focusing mode II (performed upon the photometering/distance measuring switch SWS being turned ON), and the focusing mode III (performed upon the release switch SWS being turned ON). In the illustrated embodiment, one of the focusing modes I, II and III selected by the operator is stored in the EEPROM 70.

The focal length determined by the operator according to the illustrated embodiment can be confirmed by another finder optical system (not shown) which is provided separate from at least the photographic optical system.

As a mechanical structure of the above-described illustrated embodiment, one of the sub lens groups (the first sub lens group S1) is supported by the first sub lens group frame (53), and the other of the sub lens groups (the second sub lens group S2) is supported by the second sub lens group frame (54). Thus, the first and second sub lens group frames 53 and 54 are both supported by the switching lens group frame 50, to be integrally movable with the switching lens group frame 50 in the optical axis direction. When the drive ring 55 (a sub lens group frame selective movement mechanism) rotates in the forward or reverse direction, a sub lens group frame (first sub lens group frame 53) is selectively moved to one of two positions with respect to the other sub lens group frame (second sub lens group frame 54), namely, a mutually close position or a mutually distant position. In the illustrated embodiment, the first sub lens group S1 (first sub lens group frame 53) is moved to a movement extremity on the image side to achieve a mutually close position with respect to the second sub lens group S2 (second sub lens group frame 54), and the first sub lens group S1 is moved to a movement extremity on the object side to achieve a mutually distant position with respect to the second sub lens group S2. The switching lens group frame 50 moves via the cam ring 44 and the zoom motor 46m which is used as a lens frame driver (switching lens group frame movement mechanism) along a predetermined path in order to vary the focal length. Thus the combined movement of the sub lens group frame selective movement mechanism with the switching lens group frame movement mechanism achieves the fundamental zoom path of the two sub lens groups of the switching lens group.

Consequently, the zoom lens system having the switching lens group of the present invention can be easily applied to the zoom lens system proposed in the above-mentioned U.S. patent application Ser. No. 09/534,307 (Japanese Patent Application No. Hei 11-79572).

The sub lens group frame selective movement mechanism also serves as a focusing mechanism by integrally moving the first and second sub lens groups S1 and S2 (first and second sub lens group frames 53 and 54), which are at a mutually close position or a mutually distant position, in the optical axis direction. Thus a simple structure of the sub lens group frame selective movement mechanism can be accomplished.

If both the sub lens group frame selective movement mechanism and the switching lens group frame movement mechanism move the switching lens group frame 50 in the short focal length side and the long focal length side, with respect to an intermediate focal length position, so that the movement of the second sub lens group frame 54 is not discontinuous, the zooming can be performed smoothly.

During a photographic operation, the stop positions of the switching lens group frame 50, the first sub lens group frame 53 and the second sub lens group frame 54 of the zoom lens barrel using the switching lens group (first variable lens group 10) can be practically determined stepwise along the fundamental zooming path.

In the illustrated embodiment, the sub lens group frame selective movement mechanism includes the drive ring 55, rotationally driven in the forward and reverse directions, and cam mechanisms formed on the first sub lens group frame 53 and the second sub lens group frame 54. The first sub lens group frame 53 and the second sub lens group frame 54 can be moved in the forward and rearward directions by any conventional mechanism such as a feed screw mechanism or a solenoid mechanism.

Although the drive ring 55 also serves as the drive power source of the focusing mechanism in the illustrated embodiment, it is also possible to use a separate mechanism which integrally moves the first sub lens group frame 53 with respect to the second sub lens group frame 54 to the mutually close and distant positions, rather than the drive ring 55 or any linear movement mechanism. Further, there are many conventional types of zoom lens mechanisms known in the art for moving the switching lens group frame 50 in the optical axis direction, and the illustrated embodiment is a an example of one of such mechanisms.

Although the illustrated embodiment is applied to the first variable lens group (switching lens group) 10 according to the embodiment as shown in FIGS. 1, 8 and 9, it is also possible to apply this embodiment to the second variable lens group 20 of FIG. 2, the second variable lens group 20 of FIG. 3, the first variable lens group 10 and second lens group 20 of FIG. 4, the first variable lens group 10 and second lens group 20 of FIG. 5, the first variable lens group 10 and second lens group 20 of FIG. 6, and the first variable lens group 10 of FIG. 7 (the first lens L1 and the third lens L3 are integral).

The operation of the lens drive control process according to the illustrated embodiment performed by the CPU 66 will be hereinafter discussed with reference to flow charts shown in FIGS. 33 through 43.

Figure 33:
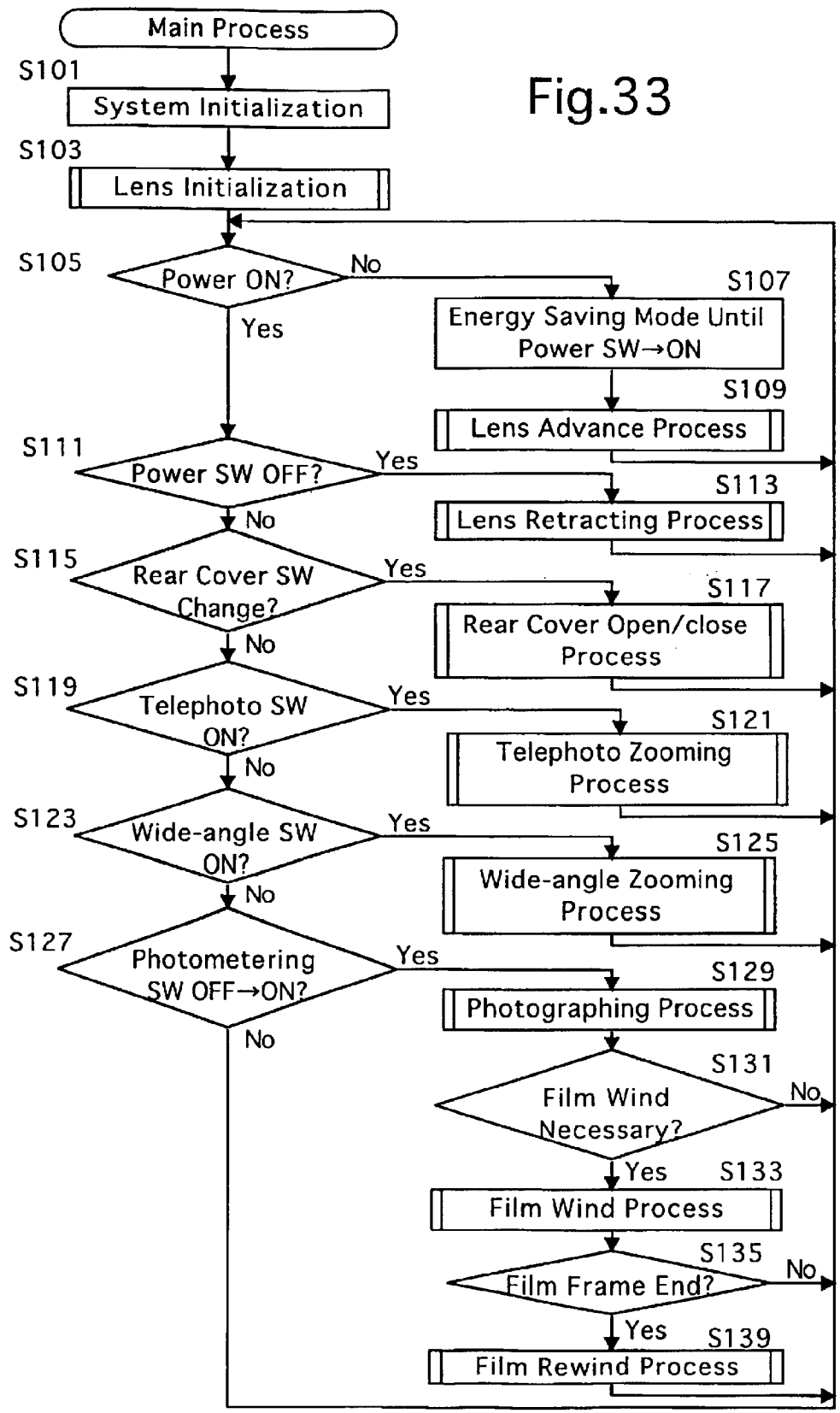
FIG. 33 is a flow chart showing the main process of the lens drive control apparatus shown in FIG. 32.
Figure 34:
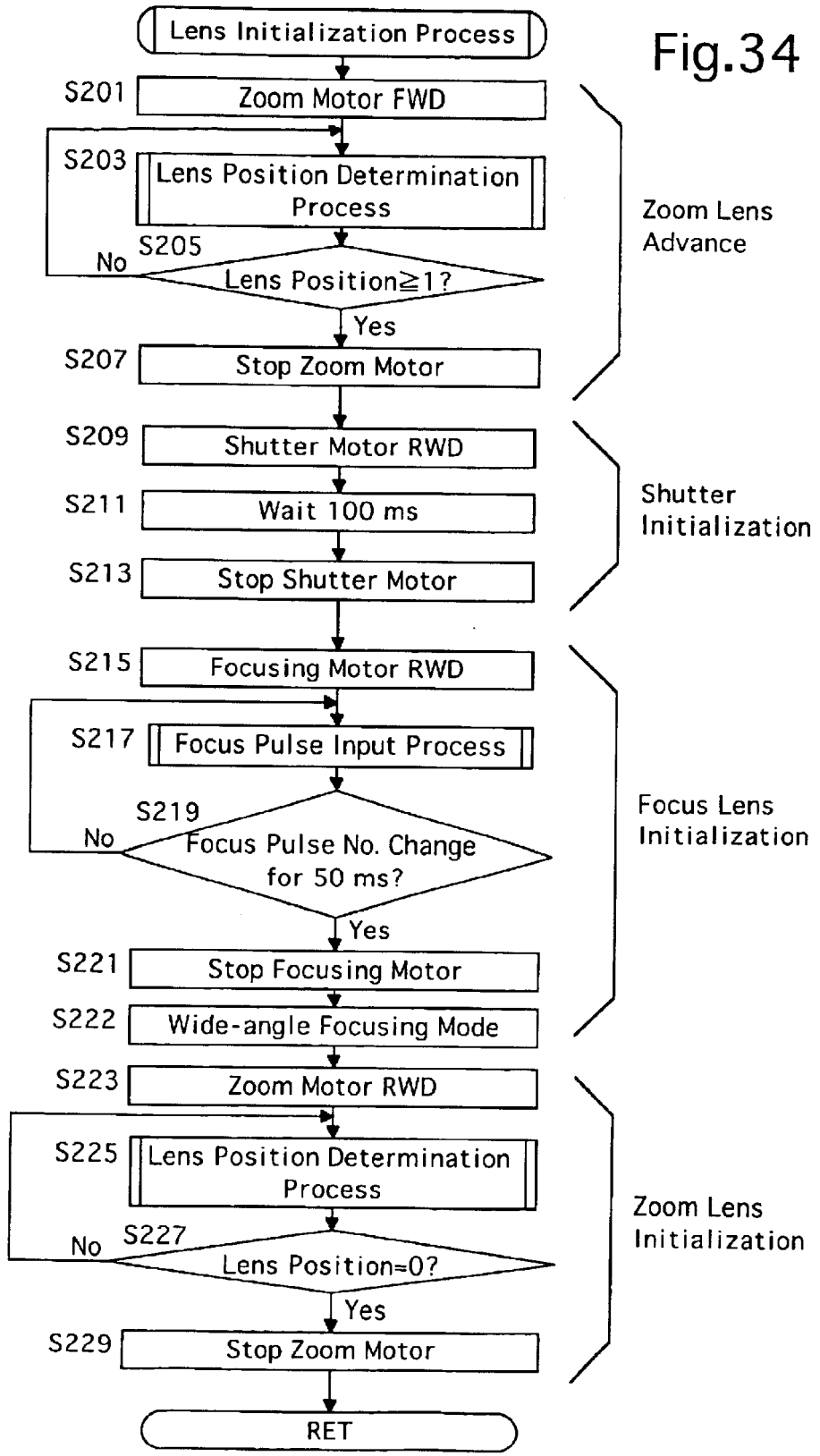
FIG. 34 is a flow chart showing the lens initializing process of the lens drive control apparatus shown in FIG. 32.

FIG. 33 is a flow chart showing the main process of a camera 100 according to the illustrated embodiment.

In the main process, the CPU 66 initializes the overall system (step S101) and the photographing lens (step S103). The initialization process of the photographing lens includes the confirmation of the lens position by the zoom code after advancing the lens, driving the lens shutter mechanism 57 to an initial position, moving the focusing lens group (e.g., sub lens groups S1 and S2) to an initial position, and returning the zoom lens to the retracted position. The initialization process is performed upon a battery being installed. While the battery is loaded in the camera body, a check process is repeatedly performed. The check process includes checking whether the main power is ON, whether the main power switch SWM is turned OFF, whether the position of the rear cover switch SWU has been changed, whether the telephoto zoom switch SWT is turned ON, whether the wide-angle zoom switch SWW is turned ON, and whether the photometering/distance measuring switch SWS has been turned from OFF to ON. Thereafter, the processes corresponding to result of the switch states are performed.

Firstly, at step S105, it is determined whether or not the main power is ON. If it is determined at step S105 that the main power is not ON, control proceeds to step S107 to enter an energy saving mode until the main power switch SWM is turned ON. Upon the main power switch SWM being turned ON at step S107 (energy saving mode), a lens advance process is performed (step S109), and control returns to step S105. The lens advance process is carried out in order to advance the zoom lens from the retracted position to the wide-angle extremity position.

When it is determined at step S105 that the main power switch SWM has been ON, it is subsequently determined whether or not the main power switch SWM is turned OFF (step S111) If it is determined at step S111 that the main power switch SWM is turned OFF, a lens retracting process for retracting the zoom lens to the retracted position is performed (step S113), and control returns to step S105.

If it is determined at step S111 that the main power switch has not been turned OFF, it is subsequently determined whether or not the state of the rear cover switch SWU has been changed (step S115). When it is determined at step S115 that the position of the rear cover switch SWU has been changed, a rear cover open/close process is performed (step S117), and control returns to step S105. In the rear cover open/close process, the film counter, etc., is initialized upon the rear cover being opened, and a film top frame index process is performed upon the rear cover being closed.

If it is determined at step S115 that the position of the rear cover switch SWU has not been changed, it is subsequently determined whether or not the telephoto zoom switch SWT is turned ON (step S119) and the wide-angle zoom switch SWW is turned ON (step S123). If it is determined at step S119 that the telephoto zoom switch SWT has been turned ON, control proceeds to step S121 in order to perform a telephoto zooming process, and control returns to step S105. On the other hand, if it is determined at step S123 that the wide-angle zoom switch SWW has been turned ON, a wide-angle zooming process is performed (step S125), and control returns to step S105.

Thereafter, it is determined whether or not the photometering/distance measuring switch SWS has been changed from OFF to ON (step S127). If it is determined at step S127 that the photometering/distance measuring switch SWS has not been changed to ON, control immediately returns to step S105. If it is determined at step S127 that the photometering/distance measuring switch SWS has been changed to ON, a photographing process is performed (step S129). Thereafter, it is determined whether or not the film wind is necessary (step S131), and if it is determined at step S131 that the film wind is not necessary, control returns to step S105. On the other hand, if it is determined at step S131 that the film wind is necessary, the film wind process is performed (step S133), and it is subsequently determined whether or not all the film frames have been used (step S135). If it is determined at step S135 that all the film frames have not been used, control immediately returns to step S105. If it is determined at step S135 that all the film frames have been used, the film rewind process is performed (step S139), and control returns to step The lens initialization process performed at step S103 (of FIG. 33) will be described in detail with reference to a flow chart shown in FIG. 34.

In the lens initialization process, the zoom motor 46m is driven in the forward direction (step S201). The forward direction of rotation of the zoom motor 46m is the direction in which the zoom lens is advanced, i.e., the direction in which the zoom lens moves from the retracted position toward the telephoto extremity.

Thereafter, a lens position determination process is performed (step S203), in which control waits until it is determined that the lens position is equal to or larger than '1' (step S205) The lens position determination process is carried out in order to detect the lens position according to the zoom code signal output from the brush 81, wherein lens position '1' refers to the wide-angle extremity (see FIG. 31).

If it is determined at step S205 that the lens position is equal to or larger than 1, the zoom motor 46m is stopped (step S207). In other words, the zoom lens is stopped at any step zoom position between the wide-angle extremity and the telephoto extremity.

Thereafter, the shutter motor 57m is actuated at step S209 to be driven in the reverse direction (the direction of closing). The reverse rotation of the shutter motor 57m is maintained for 100 ms (step S211), and after completion of reverse rotation for 100 ms, the shutter motor 57m is stopped (step S213). This process from step S207 to step S211 serves as the shutter initialization process, whereby the shutter drive ring 57c securely reaches the initial position.

Thereafter, the focusing motor 64m is driven in the reverse direction (step S215), and a focus pulse input process is preformed (step S217). The reverse rotation of the focusing motor 64m is in a direction wherein the focusing lens group (sub lens groups S1 and S2) is in the wide-angle focusing mode, i.e., moves to the wide-angle extremity. In the focus pulse input process, the output level of focus pulse from the focus pulse output circuit 64e is repeatedly checked until it is determined that the output level of focus pulse does not change for at least 50 ms (step S219). If it is determined at step S219 that there is no change of output level of focus pulse for at least 50 ms, which means that the focusing lens group (sub lens groups S1 and S2) has reached the movement extremity on the wide-angle side and has stopped there, the focusing motor 64m is stopped (step S221). Thereafter, the focusing mode is set to the wide-angle focusing mode (step S222).

Upon the focusing motor 64m being stopped at step S221, the zoom motor 46m is driven in the reverse direction, i.e., in a direction so as to retract (move backwards) the lens (step S223). In the lens position determination process (step S225) the zoom motor 46m is driven in the reverse direction until it is determined that the zoom lens is at lens position 0 (step S227). When it is determined at step S227 that the zoom lens is at lens position 0, which indicates the lens has been retracted at the retracting position, the zoom motor 46m is stopped (step S229), and control is returned.

In the lens initialization process as discussed above, the shutter 57, focusing lens group, and the zoom lens are all initialized, whereby the initializing for photographing is completed.

Figure 35:
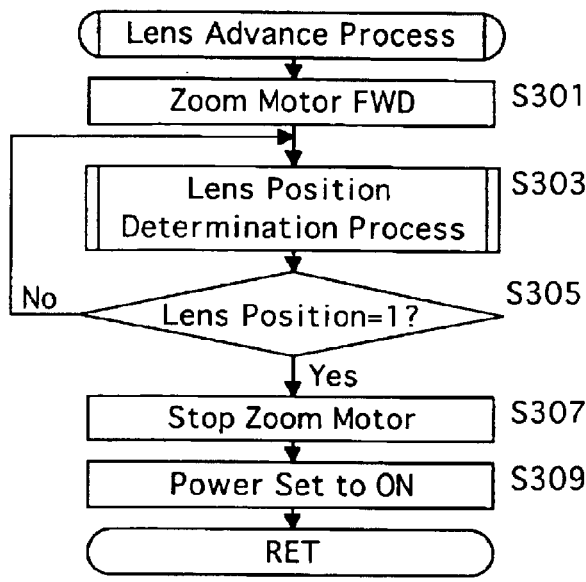
FIG. 35 is a flow chart showing the lens advance process of the lens drive control apparatus shown in FIG. 32.

The lens advance process performed at step S109 (of FIG. 33) will be described in detail with reference to a flow chart shown in FIG. 35. The lens advance process is carried out in order to advance the zoom lens from the retracted position to the wide-angle extremity position.

In the lens advance process, the zoom motor 46m is driven in the forward direction, i.e., in the direction of advancing (forward movement) the zoom lens (step S301). In the lens position determination process (step S303), the zoom motor 46m is driven in the forward direction until it is determined that the zoom lens is at lens position 1 (step S305).

When it is determined at step S305 that the zoom lens is at lens position 1, which indicates that the zoom lens has reached the wide-angle extremity position, the zoom motor 46m is stopped (step S307), the main power is set to ON (step S309), and control is returned.

According to the above-described lens advance process, the zoom lens is advanced from the retracted position to the wide-angle extremity position.

Figure 36:
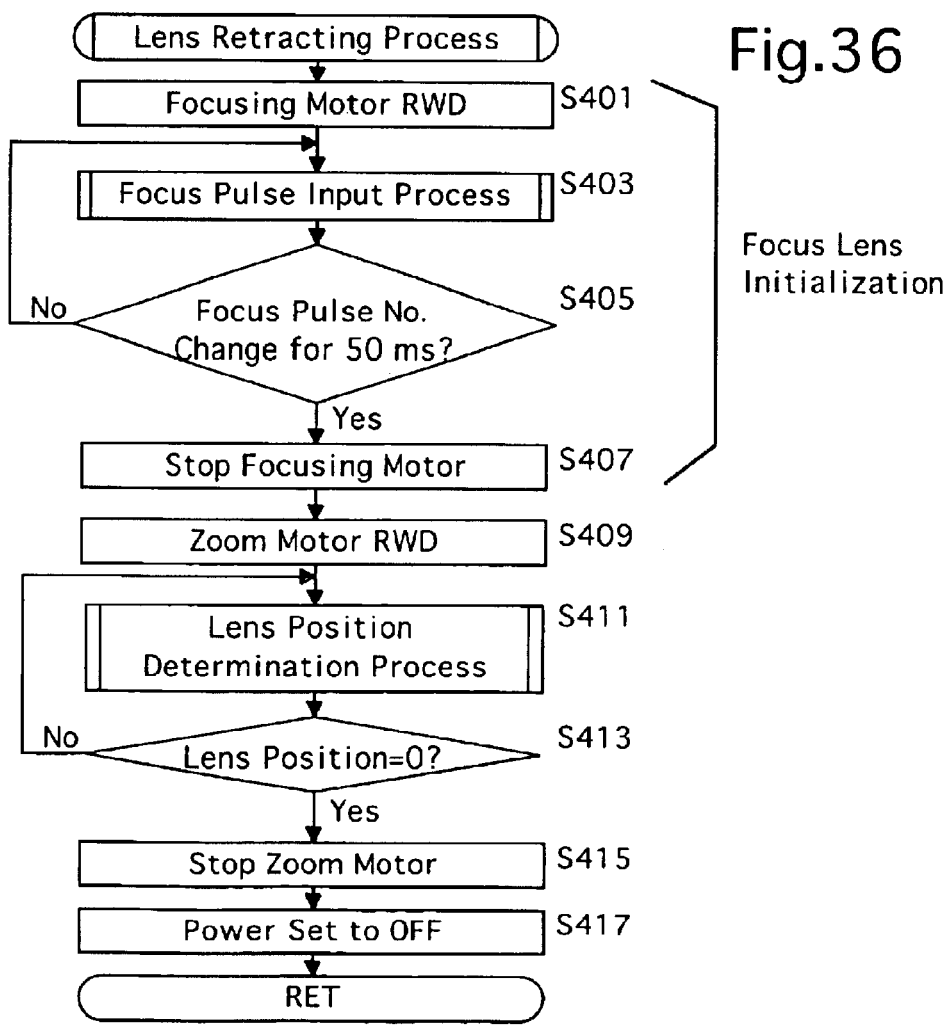
FIG. 36 is a flow chart showing the lens retracting process of the lens drive control apparatus shown in FIG. 32.

The lens retracting process performed at step S113 (of FIG. 33) will be described in detail with reference to a flow chart shown in FIG. 36. In the lens retracting process, the focusing lens group is first initialized, and subsequently the zoom lens is retracted to the retracted position.

In the lens retracting process, the focusing motor 64m is driven in the reverse direction (step S401), and the focus pulse input process is preformed (step S403). The reverse rotation of the focusing motor 64m is in a direction wherein the focusing lens group (sub lens groups S1 and S2) is in the wide-angle focusing mode, i.e., moves to the wide-angle extremity. In a focus pulse input process, the output level of focus pulse from the focus pulse output circuit 64e is repeatedly checked until it is determined that the output level of focus pulse does not change for at least 50 ms (step S405) When it is determined at step S405 that there is no change of output level of the focus pulse for at least 50 ms, which indicates that the focusing lens group (sub lens groups S1 and S2) has reached the movement extremity on the wide-angle side and stopped there, the focusing motor 64m is stopped (step S407).

Upon the focusing motor 64m being stopped at step S407, the zoom motor 46m is driven in the reverse direction, i.e., in the direction so as to retract the lens (step S409). In the lens position determination process (step S411), the zoom motor 46m is driven in the reverse direction until it is determined that the zoom lens is at lens position 0 (step S413). When it is determined at step S413 that the zoom lens is at lens position 0, which indicates that the lens is retracted at the retracting position, the zoom motor 46m is stopped (step S415), the main power is set to OFF (step S417), and control is returned.

In the lens retracting process as discussed above, the focusing lens is returned to the initial position, and the zoom lens is returned to the retracted position.

Figure 37:
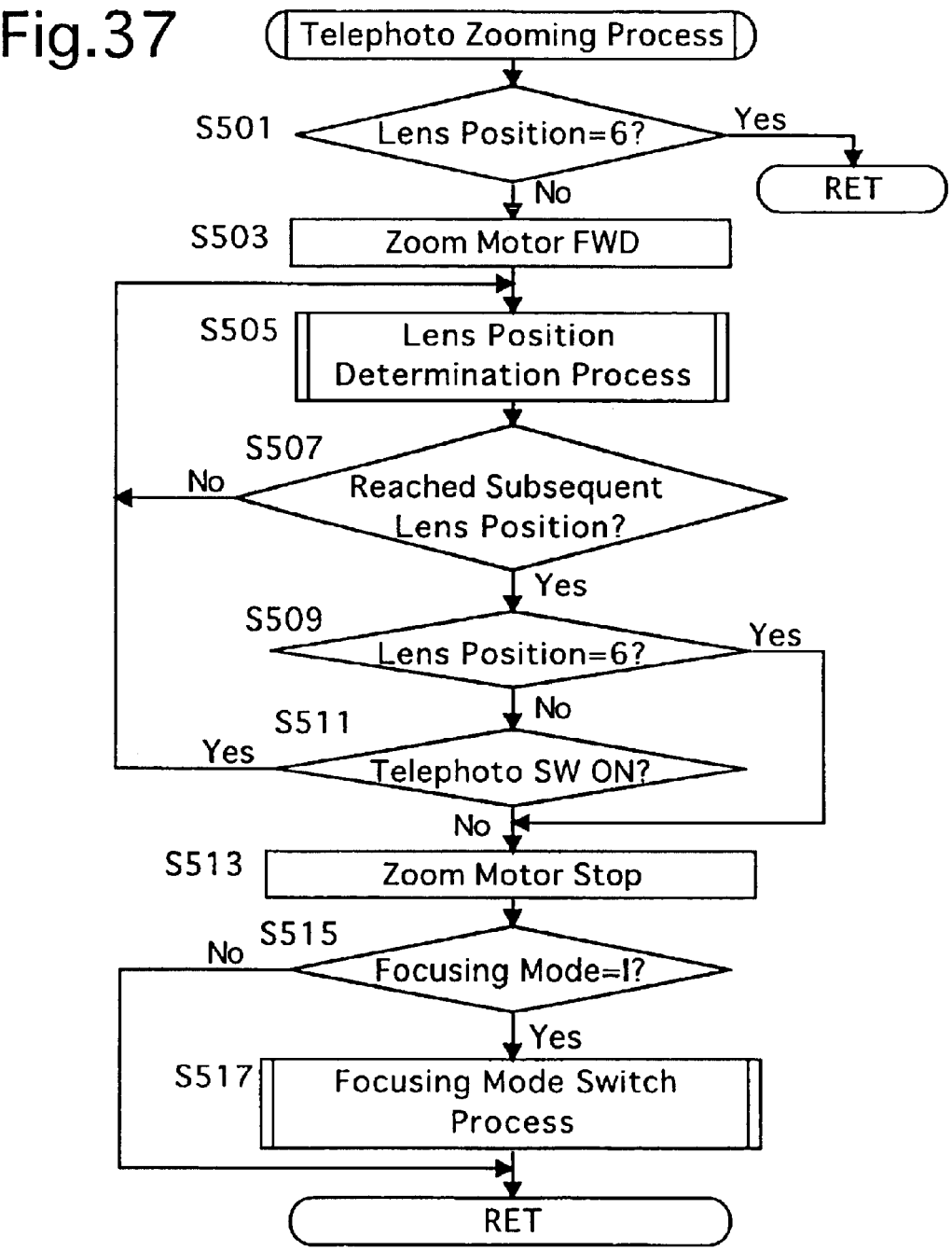
FIG. 37 is a flow chart showing the telephoto zooming process of the lens drive control apparatus shown in FIG. 32.

The telephoto zooming process performed at step S121 (of FIG. 33) will be described in detail with reference to a flow chart shown in FIG. 37.

In the telephoto zooming process, it is first determined whether or not the zoom lens is at lens position 6, i.e., the telephoto extremity (step S501). If it is determined at step S501 that the zoom lens is at lens position 6, this indicates the maximum zooming position at which further zooming in the telephoto direction cannot be performed, and therefore control is immediately returned. On the other hand, if it is determined at step S501 that the zoom lens is not at lens position 6, the zoom motor 46m is driven at step S503 in the forward direction (in the telephoto direction).

Thereafter, the lens position determination process is performed (step S505), and it is determined whether or not the zoom lens reaches a subsequent lens position (step S507). If it is determined at step S507 that the lens has not reached a subsequent lens position, control returns to step S505 and waits until the lens reaches a subsequent lens position. Upon the lens reaching a subsequent position, it is determined whether or not the current lens position is lens position 6 (step S509). If it is determined at step S509 that the current lens position is not lens position 6, it is subsequently determined whether or not the telephoto switch SWT is turned ON (step S511). If it is determined at step S511 that the telephoto switch SWT is turned ON, control returns to step S505.

If it is determined at step S509 that the subsequent lens position is lens position 6, the zoom motor 46m is stopped (step S513), and it is subsequently determined whether or not the current focusing mode is I (step S515). If it is determined at step S515 that the current focusing mode is I, the focusing mode switch process is performed (step S517), and control is returned. If it is determined at step S515 that the current focusing mode is not I, control is immediately returned.

On the other hand, if it is determined at step S509 that the subsequent lens position is not lens position 6, if it is subsequently determined at step S511 that the telephoto switch SWT is not turned ON, the zoom motor 46m is also stopped (step S513), and it is subsequently determined whether or not the current focusing mode is I (step S515). If it is determined at step S515 that the focusing mode I has been selected, the focusing mode switch process is performed (step S517), and control is returned. If it is determined at step S515 that the focusing mode I has not been selected, control is immediately returned.

Figure 38:
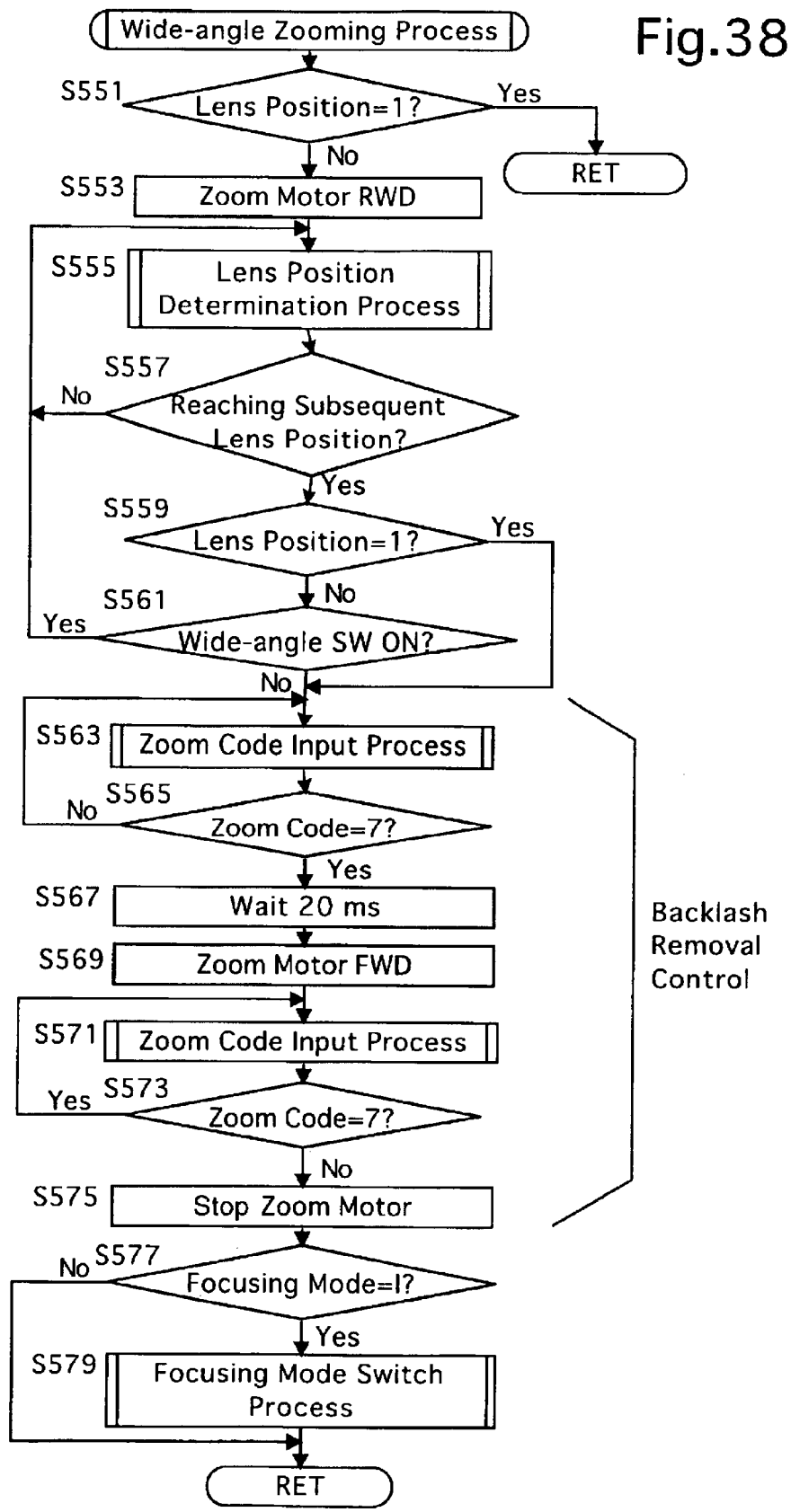
FIG. 38 is a flow chart showing the wide-angle zooming process of the lens drive control apparatus shown in FIG. 32.

The wide-angle zooming process performed at step S125 (of FIG. 33) will be described in detail with reference to a flow chart shown in FIG. 38.

In the wide-angle zooming process, it is first determined whether or not the zoom lens is at lens position 1, i.e., the wide-angle extremity (step S551). If it is determined at step S551 that the zoom lens is at lens position 1, this indicates that the zoom lens is at the wide-angle extremity position, and control is immediately returned. On the other hand, if it is determined at step S551 that the zoom lens is not at lens position 1, the zoom motor 46m is driven at step S553 in the reverse direction (in the wide-angle direction).

Thereafter, the lens position determination process is performed (step S555), and it is determined whether or not the lens reaches a subsequent lens position (step S557). If it is determined at step S557 that the zoom lens has not reached a subsequent lens position, control returns to step S555 and waits until the zoom lens reaches a subsequent lens position. Upon the lens reaching a subsequent position, it is determined whether or not the current lens position is lens position 1 (step S559). If it is determined at step S559 that the current lens position is not lens position 1, it is subsequently determined whether or not the wide-angle switch SWW is turned ON (step S561). If it is determined at step S561 that the wide-angle switch SWW is turned ON, control returns to step S555.

If it is determined at step S559 that the subsequent lens position is lens position 1, or even if it is determined at step S559 that the subsequent lens position is not lens position 1, as long as it is determined that the wide-angle switch SWW is turned ON (step S561), the zoom code input process is performed (step S563) and it is determined whether or not the zoom code is 7 (step S565). If it is determined at step S565 that the current zoom code is not 7, control returns to step S563 and waits until the zoom code becomes 7, i.e., until the zoom lens goes beyond one of the stop positions (detecting zones) between the wide-angle extremity position and the telephoto extremity position.

If it is determined at step S565 that the zoom code is 7, control waits for 20 ms (step S567) and subsequently drives the zoom motor 46m in the forward direction (step S569). Thereafter, the zoom code input process is performed (step S571) in which it is determined whether or not the zoom code is 7 (step S573). If it is determined at step S573 that the zoom code is 7, control returns to step S571 and waits until the zoom code becomes any number other than 7, i.e., any of the zoom codes 1 through 6. When it is determined at step S573 that the zoom code is not 7, the zoom motor 46m is stopped (step S575). In the zoomcode input process as above discussed, while the zoom motor 46m is driven in the telephoto direction like in the case of the telephoto zooming process, the zoom lens may be stopped upon any of the lens positions 1 through 6 being detected.

Upon the zoom motor 46m being stopped at step S575, it is determined whether or not the current focusing mode is I (step S577). If it is determined at step S577 that the current focusing mode is I, the focusing mode switch process is performed (step S579), and control is returned. On the other hand, if it is determined at step S577 that the current focusing mode is not I, control is immediately returned.

When the focusing mode I has been selected in the telephoto zooming process and the wide-angle zooming process as above discussed, the focusing lens group (sub lens groups S1 and S2) is set to the wide-angle focusing mode or the telephoto focusing mode corresponding to the lens position at the time of completion of zooming.

In the wide-angle zooming process, the zoom motor 46m is reversed so that the zoom lens is driven to the wide-angle side, and upon the zoom code being detected as '7', the zoom motor 46m is driven forwards after a lapse of a predetermined amount of time in order to eliminate backlash (occurring along the transmission path from the zoom motor 46m, via the pinion 47 and the cam ring 44, to the linear guide ring 48), and thereafter the zoom motor 46m is stopped.

Figure 39:
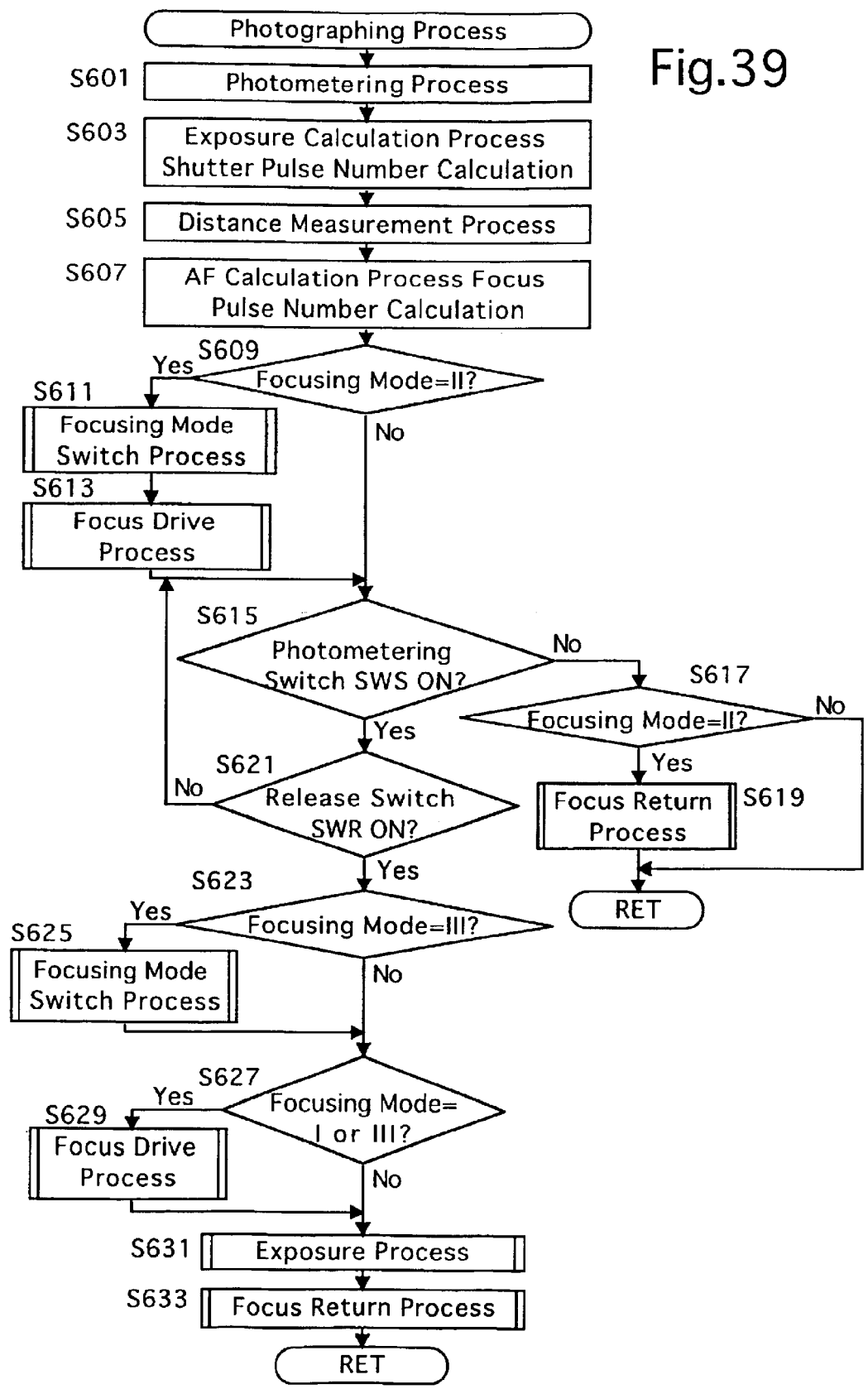
FIG. 39 is a flow chart showing the photographing process of the lens drive control apparatus shown in FIG. 32.

The photographing process performed at step S129 (of FIG. 33) will be described in detail with reference to a flow chart shown in FIG. 39. In the photographing process, there are three focusing modes I through III relating thereto, each of which will be described as follows.

In focusing mode I, the focusing mode is switched upon completion of a zooming process, and a focus drive process is performed upon the release switch SWR being turned ON.

In focusing mode II, the focusing mode is switched upon the photometering/distance measuring switch SWS being turned ON, and the focus drive process is performed.

In focusing mode III, the focusing mode is switched upon the release switch SWR being turned ON, and the focus drive process is performed.

In the photographing process, the photometering process is first performed in which the photometering value is input from the photometering circuit 69 (step S601). Thereafter, the exposure calculation is carried out based on the photometering value in order to obtain the diaphragm value and the number of shutter pulses (step S603). Thereafter, the distance measurement process is performed by inputting the object distance information from the distance measuring circuit 68 (step S605), and the focus pulse number is calculated based on the obtained object distance information (step S607).

Thereafter, it is determined whether or not the current focusing mode is focusing mode II (step S609). If it is determined at step S609 that the current focusing mode is focusing mode II, the focusing mode switch process is performed so that the focusing lens group (sub lens groups S1 and S2) is moved to the position corresponding to the current lens position (step S611), and the focus drive process is subsequently performed so that the focusing lens group (sub lens groups S1 and S2) is moved to the focused position corresponding to the focus pulse number obtained by the focus pulse number calculation at step S607 (step S613). Thereafter, it is determined whether or not the photometering/distance measuring switch SWS is turned ON (step S615).

On the other hand, if it is determined at step S609 that the current focusing mode is not focusing mode II, it is immediately determined whether or not the photometering/distance measuring switch SWS is turned ON (step S615), without carrying out the focusing mode switch process and the focus drive process of steps S611 and S613.

If it is determined at step S615 that the photometering/distance measuring switch SWS is not turned ON, it is subsequently determined whether or not the current focusing mode is focusing mode II (step S617). If it is determined at step S617 that the current focusing mode is focusing mode II, a focus return process is performed (step S619) in which the focusing lens group (sub lens groups S1 and S2), having been moved to a focused position, is moved to the initial position. Thereafter, control is returned. On the other hand, if it is determined at step S617 that the current focusing mode is not focusing mode II, control is immediately returned without carrying out the focus return process at step S619.

If it is determined at step S615 that the photometering/distance measuring switch SWS is turned ON, it is subsequently determined whether or not the release switch SWR is turned ON (step S621). If it is determined at step S621 that the release switch SWR is not turned ON, control returns to step S615 and repeatedly checks the ON state of the photometering/distance measuring switch SWS (step S615) and the release switch SWR (step S621).

If it is determined at step S621 that the release switch SWR is turned ON, it is subsequently determined whether or not the current focusing mode is focusing mode III (step S623) If it is determined at step S623 that the current focusing mode is III, the focusing mode switch process is performed in order to move the focusing lens group (sub lens groups S1 and S2) to the position corresponding to the current lens position (step S625). Thereafter, it is determined whether or not the current focusing mode is focusing mode I or III (step S627). On the other hand, if it is determined at step S623 that the current focusing mode is not focusing mode III, it is immediately determined whether or not the current focusing mode is focusing mode I or III at step S627 (i.e., control skips step S625).

If it is determined at step S627 that the current focusing mode is focusing mode I or III, the focus drive process is performed (step S629), and subsequently the exposure process is performed (step S631). On the other hand, if it is determined at step S627 that the current focusing mode is not focusing mode I or III, i.e., when the current focusing mode is focusing mode II, the exposure process is immediately performed (step S631) without carrying out the focus drive process at step S629.

In the exposure process at step S631, the shutter motor 57m is driven based on the shutter pulse number obtained by the shutter pulse number calculation at step S603 in order to carry out the exposure. Thereafter, the focus return process is performed (step S633), and control is returned.

Figure 40:
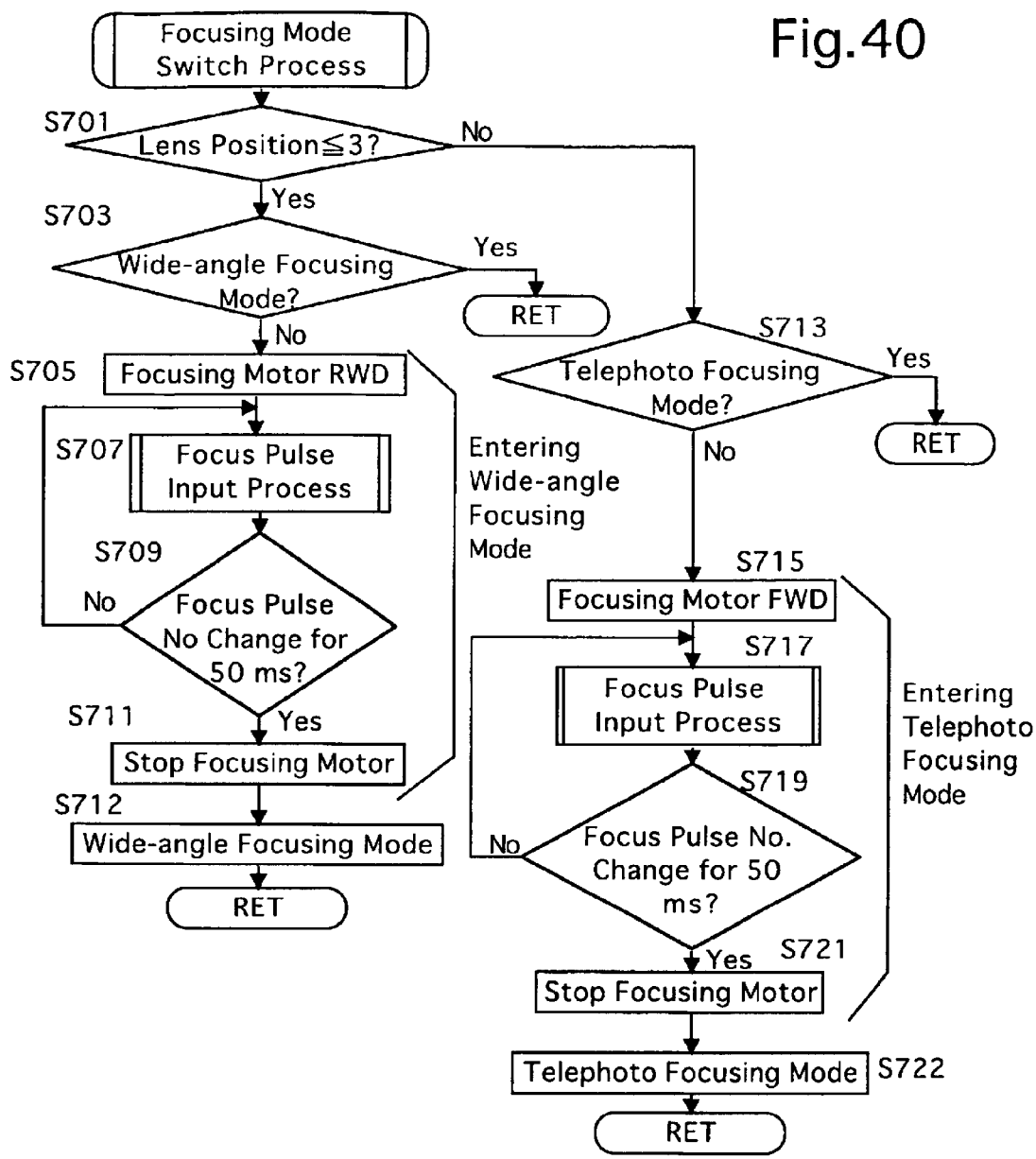
FIG. 40 is a flow chart showing the focusing mode switching process of the lens drive control apparatus shown in FIG. 32.

The focusing mode switch process will be described in detail with reference to a flow chart shown in FIG. 40. The focusing mode switch process is performed at step S517 in the telephoto zooming process, step S579 in the wide-angle zooming process, and steps S611 and S625 in the photographing process. According to the focusing mode switch process, the wide-angle focusing mode or the telephoto focusing mode is determined corresponding to the current focal length of the zoom lens (i.e. the current lens position), so that the focusing lens group (sub lens groups S1 and S2) is moved to the corresponding movement extremity position.

In the focusing mode switch process, it is first determined whether or not the current lens position is equal to or less than 3 (step S701). If it is determined at step S701 that the current lens position is equal to or less than 3, it is subsequently determined whether or not the wide-angle focusing mode has been set (step S703), and if it is determined at step S703 that the wide-angle focusing mode has already been set, control is immediately returned. On the other hand, if it is determined at step S703 that the wide-angle focusing mode has not been set, the focusing motor 64m is driven in the reverse direction in order to start moving the focusing lens group toward the movement extremity on the wide-angle side (step S705). Thereafter, the focus pulse input process is performed (step S707), in which the focus pulse is repeatedly checked until it is determined that the output level of focus pulse does not change for at least 50 ms (step S709). When it is determined at step S709 that there is no change of output level of focus pulse for at least 50 ms, which indicates that the focusing lens group has reached the movement extremity on the wide-angle side, the focusing motor 64m is stopped (step S711) Thereafter, the current focusing mode is set to the wide-angle focusing mode (step S712), and control is returned.

On the other hand, if it is determined at step S701 that the current lens position is larger than 3, i.e., the current lens position is 4 or more, it is subsequently determined whether or not the telephoto focusing mode has been set (step S713), and if it is determined at step S713 that the telephoto focusing mode has already been set, control is immediately returned. On the other hand, if it is determined at step S713 that the telephoto focusing mode has not been set, the focusing motor 64m is driven in the forward direction in order to start moving of the focusing lens group toward the movement extremity on the telephoto side (step S715). Thereafter, the focus pulse input process is performed (step S717), in which the focus pulse is repeatedly checked until it is determined that the output level of focus pulse does not change for at least 50 ms (step S719). When it is determined at step S719 that there is no change of output level of focus pulse for at least 50 ms, which indicates that the focusing lens group has reached the movement extremity on the telephoto side, the focusing motor 64m is stopped (step S721). Thereafter, the current focusing mode is set to the telephoto focusing mode (step S722), and control is returned.

In the focusing mode switch process as discussed above, when the zoom lens is in the wide-angle zone, the current focusing mode is switched to the wide-angle focusing mode in which the focusing lens group is positioned at the movement extremity on the wide-angle side, and when the zoom lens is in the telephoto zone, the current focusing mode is switched to the telephoto focusing mode in which the focusing lens group is positioned at the movement extremity on the telephoto side.

Figure 41:
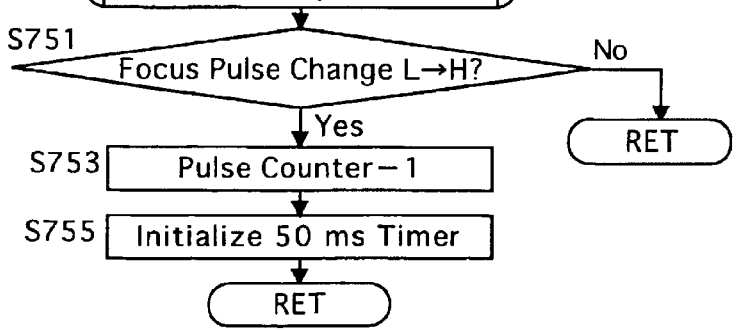
FIG. 41 is a flow chart showing the focus pulse input process of the lens drive control apparatus shown in FIG. 32.

The focus pulse input process will be described in detail with reference to a flow chart shown in FIG. 41. The focus pulse input process is performed in order to detect the focus pulse, i.e., the increase of the output level from the focus pulse output circuit 64e.

In the focus pulse input process, it is first checked whether there is a change of focus pulse level from low (L) to high (H) (step S751). If it is determined at step S751 that no change of focus pulse level has occurred, control is immediately returned. If a change of focus pulse level is detected at step S751, pulse counter is decremented by 1 (step S753), the 50 ms timer is initialized (step S755), and control is returned. The 50 ms timer is started upon the initialization thereof at step S755.

Figure 42:
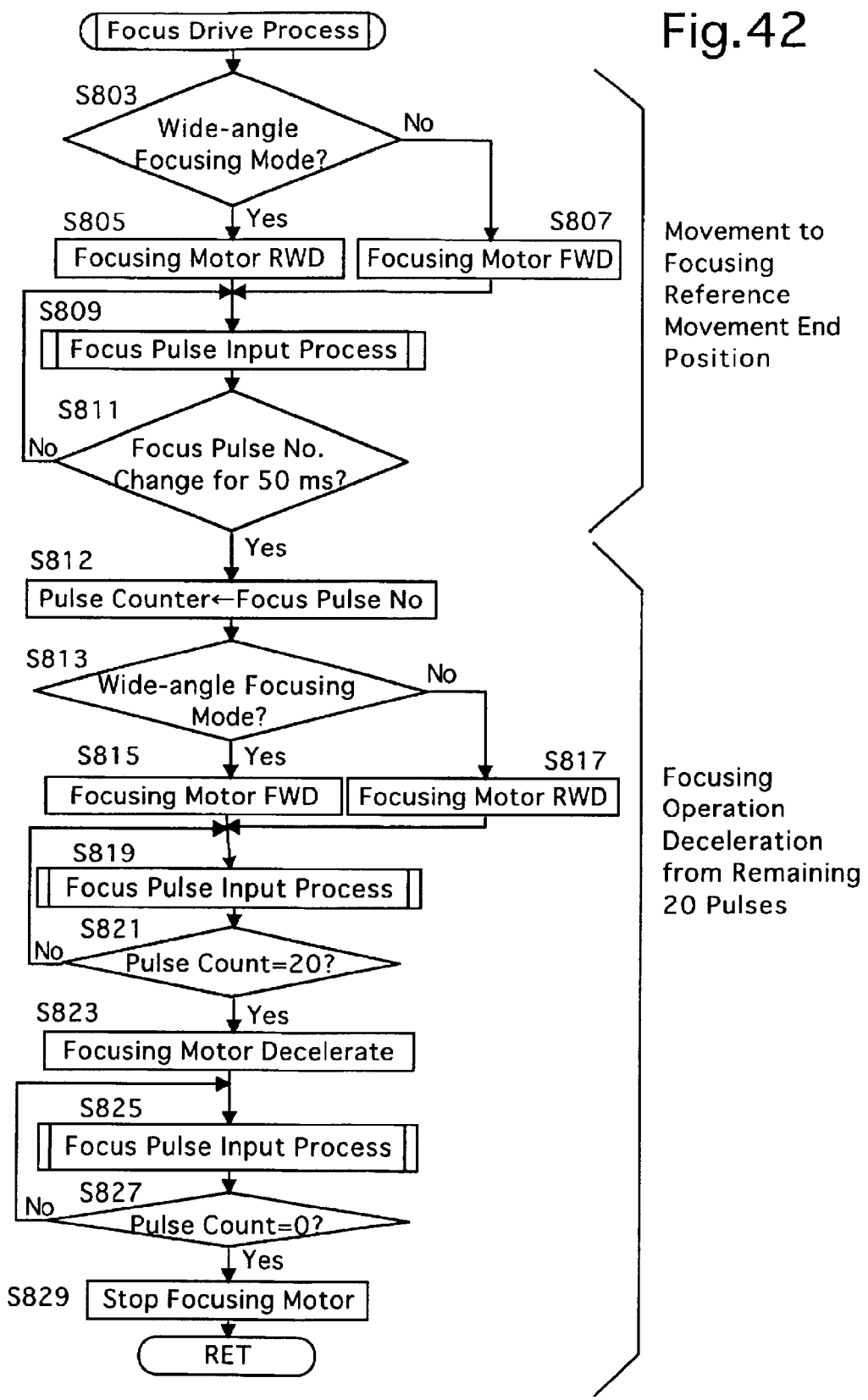
FIG. 42 is a flow chart showing the focus drive process of the lens drive control apparatus shown in FIG. 32.

The focus drive process will be described in detail with reference to a flow chart shown in FIG. 42.

In the focus drive process, it is first determined whether or not the current focusing mode is the wide-angle focusing mode (step S803). If it is determined at step S803 that the current focusing mode is the wide-angle focusing mode, the focusing motor 46m is driven in the reverse direction in order to move the focusing lens group toward the movement extremity on the wide-angle side (step S805). On the other hand, if it is determined at step S803 that the current focusing mode is not the wide-angle focusing mode, i.e., the telephoto focusing mode, the focusing motor 64m is driven in the forward direction in order to move the focusing lens group toward the movement extremity on the telephoto side (step S807). Thereafter, the focus pulse input process is performed (step S809), in which the focus pulse is repeatedly checked until it is determined that the output level of focus pulse does not change for at least 50 ms (step S811). During the focus pulse input process at steps S809 and S811, the focusing lens group is moved until reaching the initial position corresponding to the wide-angle focusing mode or telephoto focusing mode, depending on the current focusing mode which has already been set.

If it is determined at step S811 that there is no change of output level of the focus pulse for 50 ms, the focus pulse number obtained by focus pulse number calculation is set in the pulse counter (step S812). Thereafter, it is determined whether or not the current focusing mode is the wide-angle focusing mode (step S813). If it is determined at step S813 that the current focusing mode is the wide-angle focusing mode, the focusing motor 64m is driven in the forward direction (step S815). On the other hand, if it is determined at step S813 that the current focusing mode is not the wide-angle focusing mode, the focusing motor 64m is driven in the reverse direction (step S817). Thereafter, the focus pulse input process is performed (step S819) in which the pulse counter is in decremented until reaching the value '20' (step S821).

When the pulse counter is '20' at step S821, the rotation of the focusing motor 64m is decelerated (step S823). Thereafter, the focus pulse input process is performed (step S825), in which the focus pulse is input and the pulse counter is decremented until reaching the value '0' (step S827). When the pulse counter is '0' at step S827, the focusing motor 64m is stopped (step S829), and control is returned.

The deceleration of the focusing motor 64m can be performed by, for example, switching the driving source thereof from DC drive to PWM controlled drive. The focusing motor 64m can be stopped by, for example, supplying electric power in a reverse polarity to the input terminals, thereafter the input terminals are short-circuited, and released.

According to the focus drive process discussed above, it is possible to move the focusing lens group to the focused position.

Figure 43:
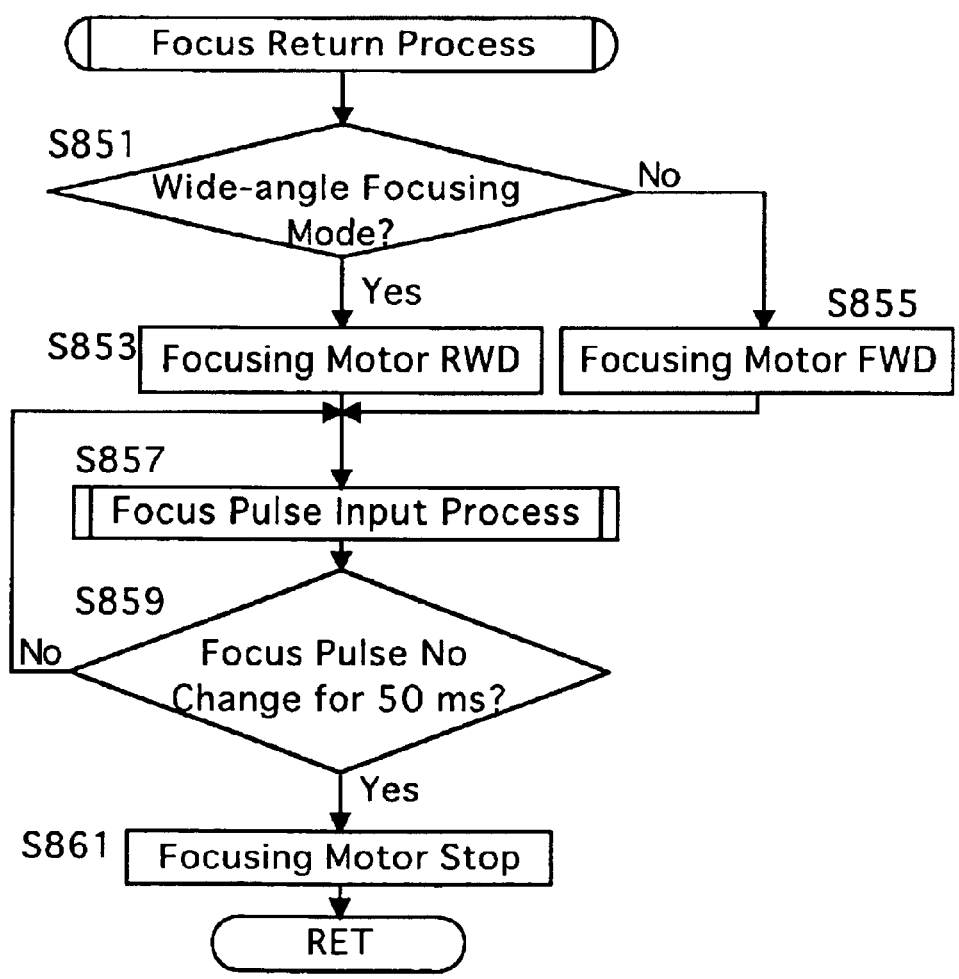
FIG. 43 is a flow chart showing the focus return process of the lens drive control apparatus shown in FIG. 32.

The focus return process will be described in detail with reference to a flow chart shown in FIG. 43. According to the focus return process, the focusing lens group which has once been moved by the focus drive process is returned to the initial position corresponding to the current wide-angle focusing mode or telephoto focusing mode.

In the focus return process, it is first determined whether or not the current focusing mode is the wide-angle focusing mode (step S851). If it is determined at step S851 that the current focusing mode is the wide-angle focusing mode, the focusing motor 64m is driven in the reverse direction (step S853). On the other hand, if it is determined at step S851 that the current focusing mode is not the wide-angle focusing mode, the focusing motor 64m is driven in the forward direction (step S855). Thereafter, the focus pulse input process is performed (step S857), in which the focus pulse is repeatedly checked until it is determined that the output level of focus pulse does not change for at least 50 ms (step S859). When it is determined at step S859 that there is no change of output level of focus pulse for 50 ms, the focusing motor 64m is stopped (step S861), and control is returned.

In the illustrated embodiment as discussed above, since in focusing mode I the focusing mode switch process is performed upon completion of the zooming, it is possible to shorten the subsequent time lag between the photometering/distance measuring switch SWS as well as the release switch SWR being turned ON, and the start of exposure, i.e., the start of rotation of shutter motor 57m in the forward direction.

In focusing modes II and III, since the focusing mode switch process is performed upon the photometering/distance measuring switch SWS being turned ON as well as the photometering and distance measurements being completed, or upon the release switch SWR being turned ON, the frequency of driving of the focusing motor 64m can be reduced, whereby the power of the battery 73 can be saved.

Furthermore, in focusing mode II, since focusing is performed immediately after completion of focus mode switch process, it is possible to shorten the subsequent time lag between the release switch SWR being turned ON and the start of forward rotation of the shutter motor 57m. This function may also be served as the focus lock mechanism.

Although the illustrated embodiment is applied to a zoom lens barrel as shown in FIG. 10 including the first variable lens group (switch lens group) 10 having a construction as shown in FIGS. 1, 8 or 9, and the second variable lens group 20, the illustrated embodiment can be applied to various types of zoom lens systems.

According to the above description, it is possible to move a movable sub lens group of the switching lens group so that the sub lens groups are mutually close to each other or mutually distant from each other, via the sub lens group drive device (drive ring 55), in a short focal length zooming zone from the short focal length extremity to an intermediate focal length position, and a long focal length zooming zone from the intermediate focal length to the long focal length extremity. Therefore, it is possible to achieve a miniaturized zoom lens system having power zooming and focusing functions, a high zoom ratio and a simple structure.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A lens drive control apparatus for a camera having a zoom lens provided with a plurality of movable variable lens groups for changing a focal length thereof, at least one of said variable lens groups comprising a switching lens group having two sub lens groups, wherein one of said two sub lens groups serves as a movable sub lens group selectively moving in the optical axis direction with respect to the other sub lens group, said lens drive control apparatus comprising:

a main drive device for moving said plurality of variable lens groups along an optical axis thereof in accordance with a predetermined movement path between a short focal length extremity and a long focal length extremity; and a sub lens group drive device for moving said movable sub lens group within said switching lens group so as to be positioned at one of a movement extremity on the object side and a movement extremity on the image side, with respect to said other sub lens group, in accordance with a corresponding zooming zone of a short focal length zooming zone from the short focal length extremity to an intermediate focal length position, and a long focal length zooming zone from said intermediate focal length to the long focal length extremity.

2. The lens drive control apparatus according to claim 1, wherein:

said sub lens group drive device moves said movable sub lens group to one of said movement extremity on the object side and said movement extremity on the image side in accordance with said corresponding zooming zone when said main drive device moves said variable lens groups along the optical axis.

3. The lens drive control apparatus according to claim 1, wherein:

said sub lens group drive device moves said movable sub lens group to one of said movement extremity on the object side and said movement extremity on the image side in accordance with said corresponding zooming zone when said main drive device is stopped.

4. The lens drive control apparatus according to claim 1, wherein:

said camera further comprises a photometering device and a distance measurement device; and said sub lens group drive device moves said movable sub lens group to one of said movement extremity on the object side and said movement extremity on the image side in accordance with said corresponding zooming zone after one of photometering and distance measurement is performed.

5. The lens drive control apparatus according to claim 1, wherein said camera further comprises a photometering device, a distance measurement device, a shutter device, a photometering/distance measuring switch for actuating said photometering device and said distance measurement device, and a release switch for actuating said shutter device; and wherein said sub lens group drive device moves said movable sub lens group to one of said movement extremity on the object side and said movement extremity on the image side in accordance with said corresponding zooming zone after one of photometering and said distance measurement is performed upon operation of said photometering/distance measuring switch regardless of whether said release switch has been operated.

6. The lens drive control apparatus according to claim 1, wherein said camera further comprises a photometering device, a distance measurement device, a shutter device, a photometering/distance measuring switch for actuating said photometering device and said distance measurement device, and a release switch for actuating said shutter device; and wherein said sub lens group drive device moves said movable sub lens group to one of said movement extremity on the object side and said movement extremity on the image side in accordance with said corresponding zooming zone after one of photometering and distance measurement is performed upon operation of said photometering/distance measuring switch, and before said shutter device is actuated upon operation of said release switch.

7. The lens drive control apparatus according to claim 1, wherein said camera further comprises a distance measurement device; and wherein said sub lens group drive device moves said movable sub lens group from said one of said movement extremity on the object side and said movement extremity on the image side, in accordance with said corresponding zooming zone, toward the other of said movement extremity on the object side and said movement extremity on the image side in order to carry out focusing based on a result of a distance measurement by said distance measurement device.

8. The lens drive control apparatus according to claim 4, wherein:

after said sub lens group drive device moves said movable sub lens group to said one of said movement extremity on the object side and said movement extremity on the image side in accordance with said corresponding zooming zone, said sub lens group drive device further moves said movable sub lens group toward the other of said movement extremity on the object side and said movement extremity on the image side in order to carry out focusing based on a result of a distance measurement by said distance measurement device.

9. The lens drive control apparatus according to claim 8, wherein said camera further comprises a photometering/distance measuring switch for actuating said photometering device and said distance measurement device, and said sub lens group drive device moves said movable sub lens group back to said one of said movement extremity on the object side and said movement extremity on the image side, upon an operation of said photometering/distance measuring switch being released.

10. The lens drive control apparatus according to claim 5, wherein:

after said sub lens group drive device moves said movable sub lens group to said one of said movement extremity on the object side and said movement extremity on the image side in accordance with said corresponding zooming zone, said sub lens group drive device further moves said movable sub lens group toward the other of said movement extremity on the object side and said movement extremity on the image side in order to carry out focusing based on a result of a distance measurement by said distance measurement device.

11. The lens drive control apparatus according to claim 10, wherein:

said sub lens group drive device moves said movable sub lens group back to said one of said movement extremity on the object side and said movement extremity on the image side, after said shutter device is actuated.

12. The lens drive control apparatus according to claim 7, wherein said sub lens group drive device comprises:

two sub lens barrels which support two sub lens groups of said switching lens group, and which guide said two sub lens groups so as to be relatively rotatable and to be movable between a mutually close position and a mutually distant position, with respect to the optical axis;

an actuator ring, which is engageable with one of said two sub lens barrels, including two engagement portions and cam surfaces formed between said two engagement portions, wherein said actuator ring rotates said one sub lens barrel of said two sub lens barrels between two rotational extremities thereof, and moves said one sub lens barrel in the optical axis direction;

a retaining ring including a guide portion which only allows linear movement in the optical axis direction of said one sub lens barrel at each said two rotational extremities, wherein the rotational movement range of said one sub lens barrel is restricted by said two rotational movement extremities; and a motor for rotating said actuator ring forwardly and reversely; wherein after said actuator ring is rotationally driven in a first direction by said motor so that a switching operation of said one sub lens barrel from one to the other of said two rotational movement extremities is performed, said motor is driven in a second direction so that said one sub lens barrel moves in the optical axis direction via said guide portion and said cam surfaces while rotating from said other of said two rotational movement extremities toward said one of said two rotational movement extremities to perform a focusing operation.

13. A lens drive control apparatus for a camera having a zoom lens provided with a plurality of movable variable lens groups for changing a focal length thereof, said lens drive control apparatus comprising:

a main drive device for moving said plurality of variable lens groups along an optical axis thereof in accordance with a predetermined movement path between a short focal length extremity and a long focal length extremity; and a sub lens group drive device for selectively moving a movable sub lens group, said movable sub lens group being one of two sub lens groups of a switching lens group of said variable lens groups, and being selectively movable in the optical axis direction with respect to the remaining sub lens group of the switching lens group, said sub lens group drive device moving said movable sub lens group within a range allowed within said switching lens group so as to be positioned at one or another of two movement extremities of said range, wherein, in a first zooming zone of said plurality of variable lens groups extending from the short focal length extremity to an intermediate focal length position, said sub lens group drive device selectively moves said movable sub-lens group to one of said movement extremities, and in a second zooming zone of said plurality of variable lens groups extending from an intermediate focal length position to a long focal length extremity, said sub lens group drive device selectively moves said movable sub-lens group to the other of said movement extremities.

* * * * *